(12) United States Patent
Wang et al.

(10) Patent No.: US 12,523,901 B2
(45) Date of Patent: Jan. 13, 2026

(54) DISPLAY DEVICE

(71) Applicant: HISENSE VISUAL TECHNOLOGY CO., LTD., Qingdao (CN)

(72) Inventors: Haiying Wang, Qingdao (CN); Chan Zhang, Qingdao (CN); Kuibao Li, Qingdao (CN); Hui Zhou, Qingdao (CN); Dengyin Zhang, Qingdao (CN); Jinlong Li, Qingdao (CN); Zhiqiang Xu, Qingdao (CN); Chao Wang, Qingdao (CN); Yingrui Wang, Qingdao (CN); Tianhua Wang, Qingdao (CN); Yuanen Jiang, Qingdao (CN); Xu Cheng, Qingdao (CN); Qingmei Gao, Qingdao (CN); Peili Lei, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 18/830,994

(22) Filed: Sep. 11, 2024

(65) Prior Publication Data

US 2025/0004329 A1    Jan. 2, 2025

Related U.S. Application Data

(63) Continuation of application No. PCT/CN2023/081856, filed on Mar. 16, 2023.

(30) Foreign Application Priority Data

Mar. 21, 2022  (CN) .......................... 202210279174.0
Mar. 21, 2022  (CN) .......................... 202210281470.4
(Continued)

(51) Int. Cl.
*G02F 1/13357*    (2006.01)
*G02F 1/1333*    (2006.01)
(Continued)

(52) U.S. Cl.
CPC .............. *G02F 1/133317* (2021.01); *G02F 1/133603* (2013.01); *G02F 1/133606* (2013.01);
(Continued)

(58) Field of Classification Search
CPC ......... G02F 1/133317; G02F 1/133603; G02F 1/133606; G02F 1/133608; G02F 1/1339;
(Continued)

(56) References Cited

U.S. PATENT DOCUMENTS 12,253,711 B2 * 3/2025 Wang ................ G02F 1/133308
12,253,713 B2 * 3/2025 Wang .................. G02B 6/0095
(Continued)

FOREIGN PATENT DOCUMENTS

CN      200980151 Y     11/2007
CN      107295447 A     10/2017
(Continued)

OTHER PUBLICATIONS

The World Intellectual Property Organization (WIPO) International Search Report for PCT/CN2023/081856 Jun. 16, 2023 6 Pages (including translation).
State Intellectual Property Office of China Notice of Registration Procedure, Notice of Grant of Invention Patent Right for Application No. 202210610400.9 Sep. 9, 2024 8 pages (including translation).
(Continued)

*Primary Examiner* — Tracie Y Green
(74) *Attorney, Agent, or Firm* — ANOVA LAW GROUP, PLLC

(57) ABSTRACT

Provided is a display apparatus. The display apparatus includes: a liquid crystal display panel and a backlight module, wherein a first sealed air cavity is formed inside the liquid crystal display panel, and the backlight module is
(Continued)

located on one side of the liquid crystal display panel and forms a second sealed air cavity with the liquid crystal display panel; and a sound production board and a sound production exciter, wherein the sound production board is fixed onto the surface of the backlight module away from the liquid crystal display panel, a vibration output terminal of the sound production exciter is fixed onto the surface of the sound production board away from the backlight module, and the sound production exciter is used for exciting, by means of the vibration output terminal, the sound production board to vibrate, so as to drive the backlight module to vibrate.

20 Claims, 38 Drawing Sheets

(30) Foreign Application Priority Data

May 31, 2022 (CN) .......................... 202210610400.9
May 31, 2022 (CN) .......................... 202210612392.1

(51) Int. Cl.
  *G02F 1/1339* (2006.01)
  *H04R 1/02* (2006.01)
  *H04R 1/28* (2006.01)
  *H04R 9/06* (2006.01)

(52) U.S. Cl.
  CPC ...... *G02F 1/133608* (2013.01); *G02F 1/1339* (2013.01); *H04R 1/025* (2013.01); *H04R 1/028* (2013.01); *H04R 1/2896* (2013.01); *H04R 9/06* (2013.01); *H04R 9/066* (2013.01); *H04R 2499/15* (2013.01)

(58) Field of Classification Search
  CPC .............. G02F 1/133394; H04R 1/025; H04R 1/028; H04R 1/2896; H04R 9/06; H04R 9/066; H04R 2499/15; H04R 1/20; H04R 17/005; H04N 5/00
  See application file for complete search history.

(56) References Cited

U.S. PATENT DOCUMENTS

| | | | | |
|---|---|---|---|---|
| 2018/0317000 A1* | 11/2018 | Ham | ...................... | H04R 1/025 |
| 2019/0037164 A1* | 1/2019 | Kim | ...................... | H04R 17/005 |
| 2020/0359120 A1 | 11/2020 | Heo et al. | | |
| 2021/0112331 A1* | 4/2021 | Shin | ...................... | G06F 1/1688 |

FOREIGN PATENT DOCUMENTS

| | | | |
|---|---|---|---|
| CN | 108958632 | A | 12/2018 |
| CN | 208273238 | U | 12/2018 |
| CN | 109326236 | A | 2/2019 |
| CN | 109581713 | A | 4/2019 |
| CN | 109946864 | A | 6/2019 |
| CN | 110109216 | A | 8/2019 |
| CN | 111192540 | A | 5/2020 |
| CN | 111586534 | A | 8/2020 |
| CN | 112700718 | A | 4/2021 |
| CN | 113453130 | A | 9/2021 |
| CN | 113572991 | A | 10/2021 |
| CN | 215453262 | U | 1/2022 |
| CN | 215956626 | U | 3/2022 |
| CN | 217443699 | U | 9/2022 |
| CN | 217467421 | U | 9/2022 |
| CN | 217718365 | U | 11/2022 |
| JP | 2005086490 | A | 3/2005 |
| JP | 2007189604 | A | 7/2007 |
| KR | 20170013696 | A | 2/2017 |
| KR | 20190018784 | A | 2/2019 |
| KR | 20190068936 | A | 6/2019 |
| KR | 20190080410 | A | 7/2019 |
| WO | 2019212089 | A1 | 11/2019 |

OTHER PUBLICATIONS

China National Intellectual Property Administration (CNIPA) Office Action 1 for Application No. 202210610400.9 Oct. 29, 2023 13 Pages (including translation).
China National Intellectual Property Administration (CNIPA) Office Action 1 for Application No. 202210612392.1 Feb. 26, 2025 23 Pages (including translation).

* cited by examiner $$L = N \times \frac{1}{2}\lambda$$

DISPLAY DEVICE

CROSS REFERENCE TO RELATED APPLICATION

The disclosure is a continuation of International Application No. PCT/CN2023/081856, filed on Mar. 16, 2023, which claims priorities of the Chinese patent application with application number 202210281470.4, filed on Mar. 21, 2022, the Chinese patent application with application number 202210279174.0, filed on Mar. 21, 2022, the Chinese patent application with application number 202210612392.1, filed on May 31, 2022, and the Chinese patent application with application number 202210610400.9, filed on May 31, 2022, all of which are incorporated into the disclosure by reference.

TECHNICAL FIELD

The disclosure relates to the field of display technology, in particular, to a display apparatus.

BACKGROUND

Speakers in display apparatuses, such as TVs, are generally small in size and are forced to produce sound via bottom portion or produce sound via rear portion due to limitations of ultra-thin appearance and installation location, the formed sound and image positions are separated from the formed image positions, which leads to bad perception and experience and cannot provide audio-visual experience of combining sound and image.

Theoretically, a flat-panel display apparatus can directly vibrate a display panel via a sound driver to produce sound waves, for example, an Organic Light-Emitting Diode (OLED) panel has realized self-vocalization technology, that is, the OLED panel has both display function and sound function of loudspeaker diaphragm to achieve audio-visual effect of combining sound and image. However, when the display panel is a Liquid Crystal Display (LCD) panel, the LCD panel has multiple independent and stacked layers, and the back of the LCD panel needs to be provided with a backlight source for uniform illumination, the backlight source cannot be shielded, thus a sound driver cannot be installed in the LCD panel, and the backlight source and the LCD panel has a large distance therebetween so that there is no path for efficient transmission of vibration to the LCD panel, these bottlenecks of which have resulted in no solution for sound generation in the LCD panel to date.

SUMMARY

The disclosure provides a display apparatus, including: a liquid crystal display panel and a backlight module. A first sealed air cavity is formed inside the liquid crystal display panel. The backlight module is located on a side of the liquid crystal display panel and forms a second sealed air cavity with the liquid crystal display panel. The display apparatus further includes a sound board and a sound driver. The sound board is fixed to a surface of the backlight module away from the liquid crystal display panel, and a vibration output terminal of the sound driver is fixed to a surface of the sound board away from the backlight module, and the sound driver is configured to drive the sound board to vibrate through the vibration output terminal to drive the backlight module to vibrate.

DETAILED DESCRIPTION

In order to make the purpose and implementation of the disclosure clearer, the exemplary embodiments of the disclosure will be clearly and completely described below in conjunction with the accompanying drawings in the exemplary embodiments of the disclosure. Obviously, the described exemplary embodiments are only part but not all of embodiments of the disclosure.

It should be noted that the brief description of terms in the disclosure is only to facilitate understanding of the embodiments described below, and is not intended to limit the embodiments of the disclosure. Unless otherwise stated, these terms should be understood according to their ordinary and usual meaning.

The terms "first", "second", "third", etc., in the description and claims of the disclosure and the above-mentioned drawings are configured to distinguish similar or same objects or entities, and do not necessarily mean to limit a specific order or a sequential order unless otherwise stated. It is understood that the terms are interchangeable under appropriate situations.

The terms "include" and "comprise" and any variations thereof are intended to cover but not exclusively include, for example, products or apparatuses that contain a series of components need not be limited to all of the components expressly listed, but can include other components that are not clearly listed or that are inherent to those products or apparatuses.

Figure 1:
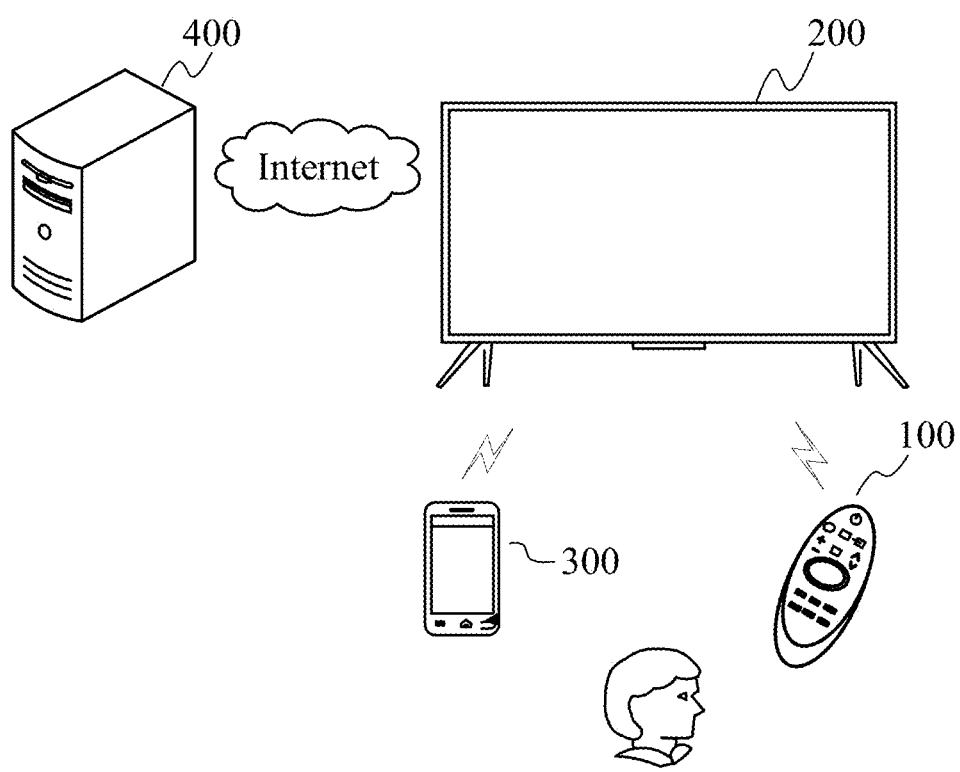
FIG. 1 is a schematic diagram of an operation scenario between a display apparatus and a control device according to embodiments of the disclosure.
Figure 2:
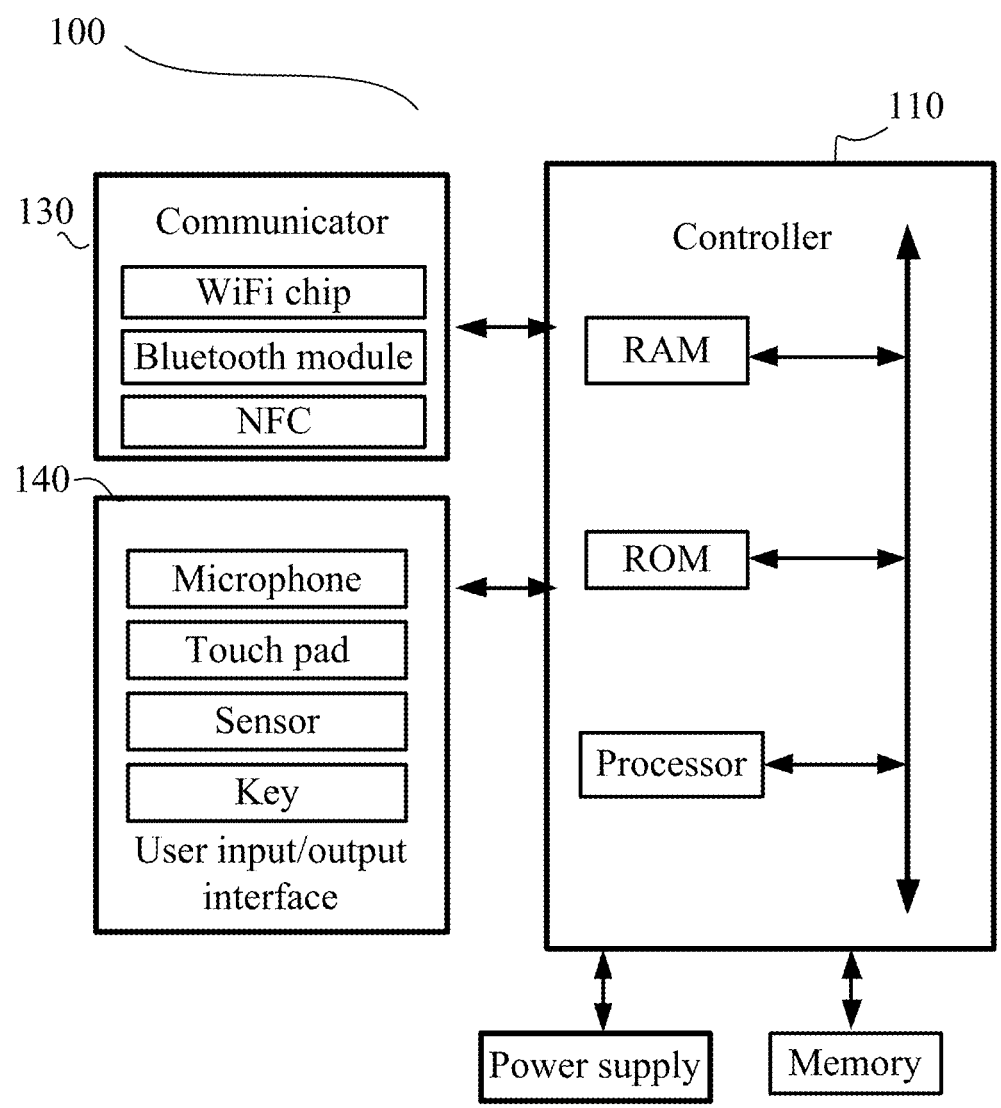
FIG. 2 is a configuration block diagram of a control device according to embodiments of the disclosure.

The display apparatus according to the embodiments of the disclosure can have a variety of implementations. For example, the display apparatus can be a TV, a smart TV, a monitor, an electronic bulletin board, an electronic table, etc. FIG. 1 and FIG. 2 illustrate a specific implementation of the display apparatus of the disclosure.

FIG. 1 is a schematic diagram of an operation scenario between a display apparatus and a control device according to embodiments of the disclosure. As shown in FIG. 1, the display apparatus 200 can be operated by users through a smart device 300 or a control device 100.

In some embodiments, the control device 100 can be a remote controller. The communication between the remote controller and the display apparatus 200 can include infrared protocol communication, Bluetooth protocol communication, and other short-distance communication, and the display apparatus 200 can be controlled via wireless or wired methods. The display apparatus 200 can be controlled by users by inputting user instructions through keys on the remote controller, voice input, control panel input, etc.

In some embodiments, the smart device 300 (such as a mobile terminal, a tablet, a computer, a laptop, etc.) can also be used to control the display apparatus 200. For example, the display apparatus 200 is controlled using applications running on the smart device.

In some embodiments, the display apparatus 200 can receive users' control instructions through touch or gestures instead of using the above-mentioned smart device or control device to receive instructions.

In some embodiments, the display apparatus 200 can also be controlled in a manner other than the control device 100 and the smart device 300. For example, the display apparatus 200 can be controlled by users' voice instructions received directly through a module inside the display apparatus 200 for obtaining the voice instructions, or the display apparatus 200 can be controlled by users' voice instructions received through a voice control device provided externally to the display apparatus 200.

In some embodiments, the display apparatus 200 is further in data communication with a server 400. The display apparatus 200 can be allowed to communicate with other networks via a Local Area Network (LAN), a Wireless Local Area Network (WLAN), etc. The server 400 can provide various content and interactions to the display apparatus 200. The server 400 can be a cluster or multiple clusters, and can include one or more types of servers.

FIG. 2 is a configuration block diagram of a control device according to embodiments of the disclosure. As shown in FIG. 2, the control device 100 includes a controller 110, a communicator 130, a user input/output interface 140, a memory, and a power supply. The control device 100 can receive operation instructions input from users. The communicator 130 is communicatively connected with the display apparatus. The control device 100 converts the operation instructions into instructions that the display apparatus 200 can recognize and respond to, thus serving as an interactive intermediary between the users and the display apparatus 200.

Figure 3:
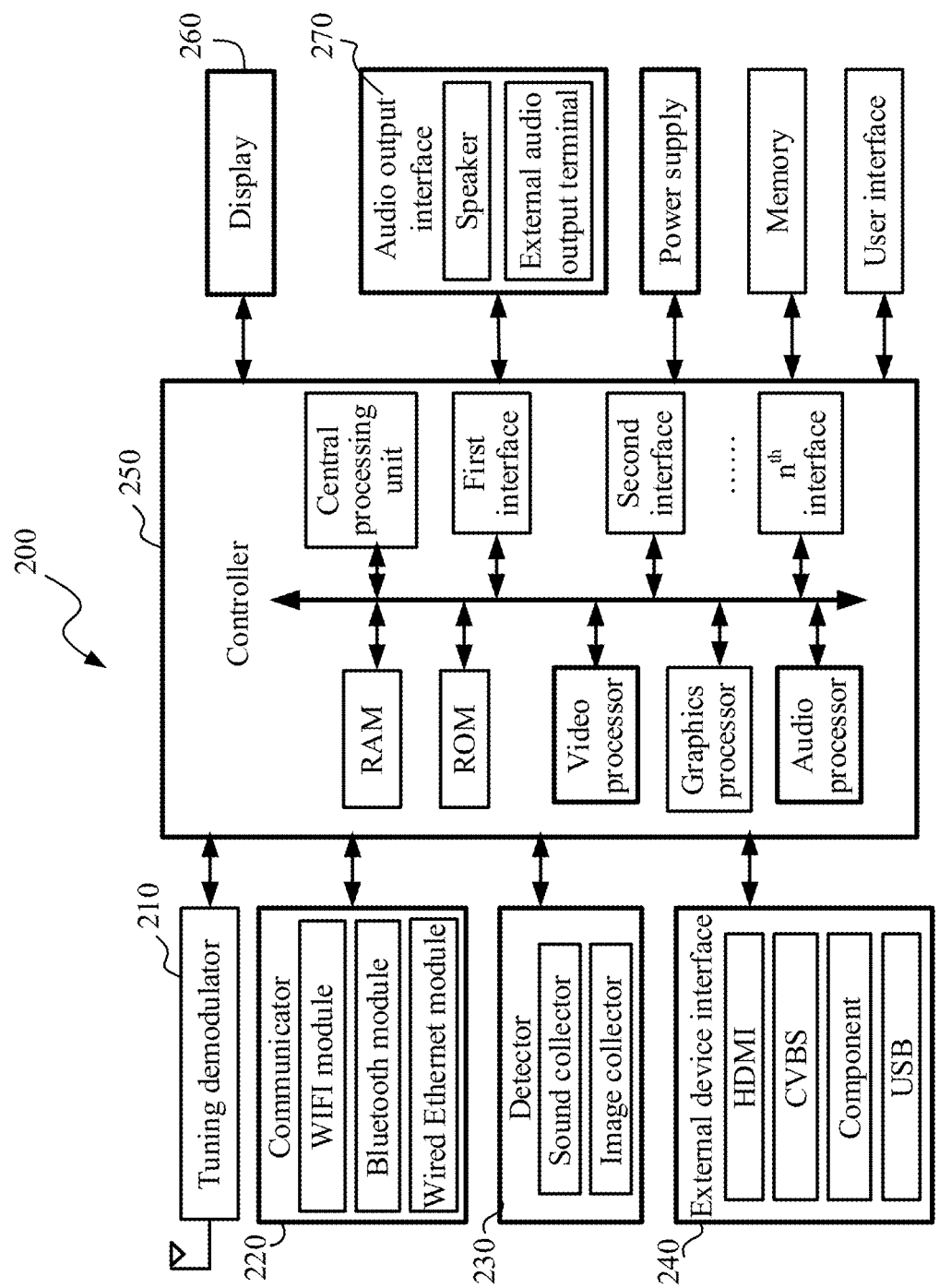
FIG. 3 is a configuration block diagram of a display apparatus according to embodiments of the disclosure.

FIG. 3 is a configuration block diagram of a display apparatus according to embodiments of the disclosure. As shown in FIG. 3, the display apparatus 200 includes at least one of a tuning demodulator 210, a communicator 220, a detector 230, an external device interface 240, a controller 250, a display 260, an audio output interface 270, a memory, a power supply, and a user interface.

In some embodiments, the controller 250 includes a processor, a video processor, an audio processor, a graphics processor, RAM, ROM, and first to $n^{th}$ interfaces for input/output.

The display 260 is used for displaying an interface, including a display screen component for presenting pictures, a driving component for driving image display, a component for receiving image signals output from the controller, displaying video content, image content, and menu control interface, and a UI interface for user control.

The communicator 220 is a component for communicating with external devices or servers according to various communication protocols. For example, the communicator can include at least one of a WiFi module, a Bluetooth module, a wired Ethernet module, other chips based on network communication protocols or chips based on near field communication protocols, or an infrared receiver. The display apparatus 200 can be communicatively connected with the control device 100 or the server 400 through the communicator 220, that is, to establish the sending and receiving of control signals and data signals.

The user interface can be configured to receive control signals from the control device 100 (such as an infrared remote controller, etc.).

The detector 230 is configured to collect signals from external environment or interactions with the outside. For example, the detector 230 includes a light receiver, a sensor configured to collect ambient light intensity; or the detector 230 includes an image collector, such as a camera, which can be configured to collect external environment scenes, user attributes or user interaction gestures, or, the detector 230 includes a sound collector, such as a microphone, etc., for receiving external sounds.

The external device interface 240 can include, but is not limited to, one or more of the following: a high-definition multimedia interface (HDMI), an analog or data high-definition component input interface (component), a composite video broadcast signal (CVBS) interface, a universal serial bus input interface (USB), an RGB port, etc. The external device interface 240 can also be a composite input/output interface formed by multiple interfaces mentioned above.

The tuning demodulator 210 receives broadcast television signals through wired or wireless reception methods, and demodulates audio and video signals, such as electrical program guide (EPG) data signals, from multiple wireless or wired broadcast television signals.

In some embodiments, the controller 250 and the tuning demodulator 210 can be located in different separate devices, that is, the tuning demodulator 210 can also be located in an external device of a main device where the controller 250 is located, such as an external set-top box, etc.

The controller 250 controls operations of the display apparatus and responds to user operations through various software control programs stored in the memory. The controller 250 controls the overall operations of the display apparatus 200. For example, in response to receiving a user command for selecting a UI object to be displayed on the display 260, the controller 250 can perform operations associated with the object selected by the user command.

In some embodiments, the controller 250 includes at least one of a central processing unit (CPU), a video processor, an audio processor, a graphics processing unit (GPU), a random access memory (RAM), a read only memory (ROM), a first to $n^{th}$ interfaces for input/output, a communication bus (Bus), etc.

User commands can be input by users into a graphical user interface (GUI) displayed on the display 260, and the user input interface receives the user commands input through the GUI. Alternatively, user commands can be input by users inputting specific sound or gestures, and the user input interface recognizes the sound or gestures through a sensor to receive the user commands.

The "user interface" is a media interface for interaction and information exchange between applications or operating systems and users, which realizes conversions between internal forms of information and forms acceptable to the users. The user interface is generally a graphic user interface (GUI), which refers to a user interface associated with computer operations and displayed graphically. The user interface can be an icon, window, control and other interface elements displayed on the display screen of the display apparatus. The control can include visual interface elements, such as icons, buttons, menus, tabs, text boxes, dialog boxes, status bars, navigation bars, widgets, etc.

Figure 4:
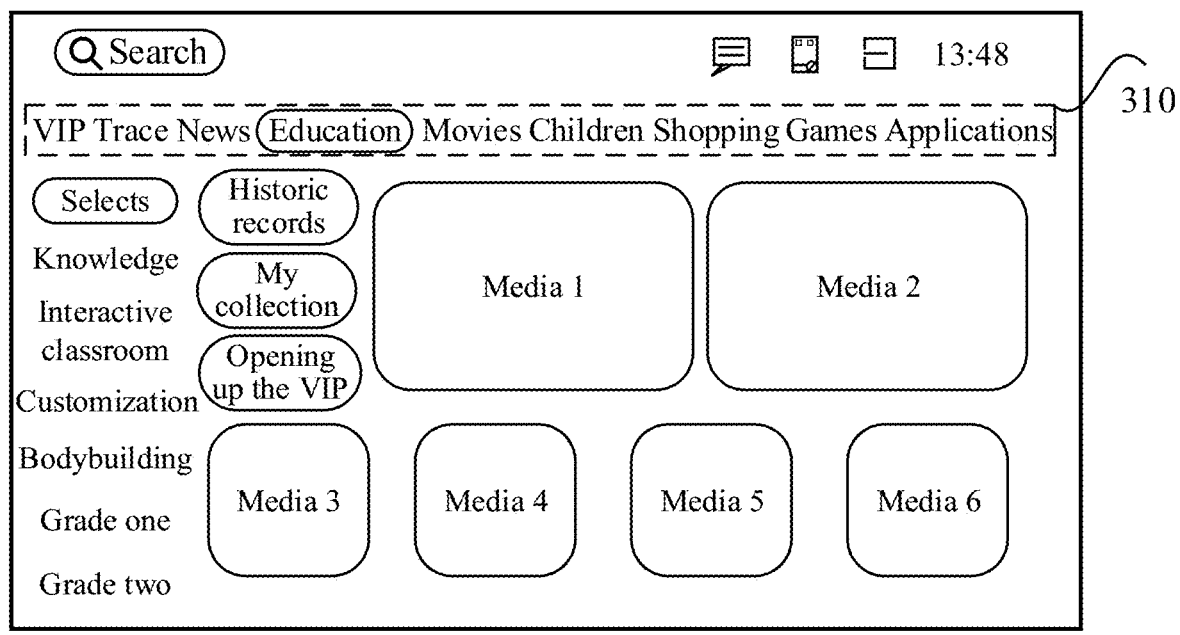
FIG. 4 is a schematic interface diagram of a video on demand program according to embodiments of the disclosure.

In some embodiments, after the display apparatus is started, the display apparatus can directly enter an interface of a preset video on demand program. The interface of the video on demand program refers to FIG. 4. The interface of the video on demand program includes at least a navigation bar 310 and a content display area below the navigation bar 310. Content in the content display area can change as the selected control in the navigation bar changes. An application in an application layer can be integrated into the video on demand program and displayed through a control in the navigation bar, and can be further displayed after the control of the application in the navigation bar is selected.

In some embodiments, after the display apparatus is started, the display apparatus can directly enter a display interface of the last selected signal source, or a signal source selection interface, where the signal source can be a preset video on demand program, or can be at least one of an HDMI interface or a live TV interface. After different signal sources are selected by users, applications in the display can display content obtained from the different signal sources.

Figure 5:
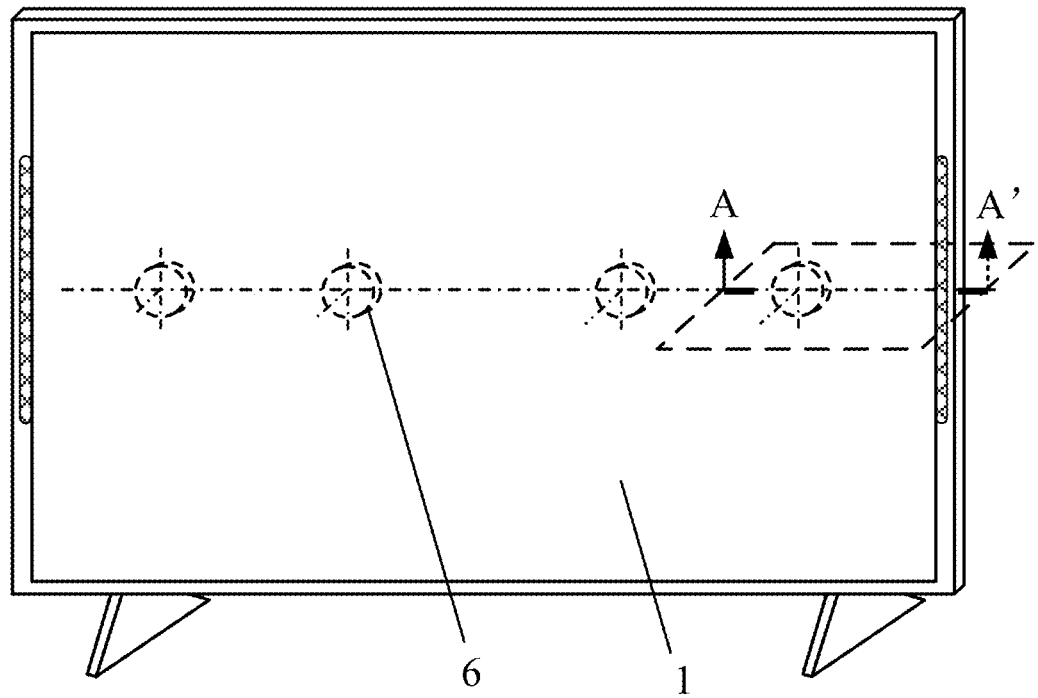
FIG. 5 is a schematic three-dimensional structural diagram of a display apparatus according to embodiments of the disclosure.
Figure 6:
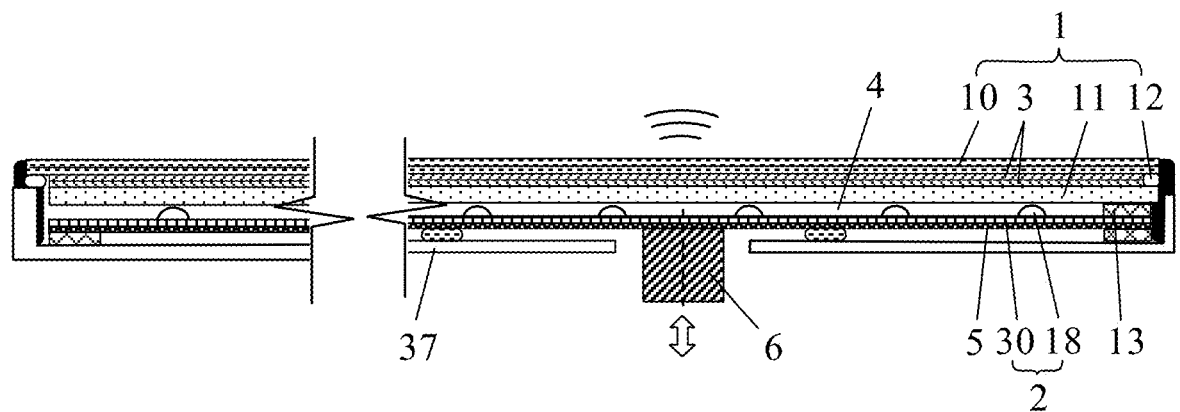
FIG. 6 is a schematic cross-sectional structural diagram along a direction AA' in FIG. 5 according to embodiments of the disclosure.

FIG. 5 is a schematic three-dimensional structural diagram of a display apparatus according to embodiments of the disclosure. FIG. 6 is a schematic cross-sectional structural diagram along a direction AA' in FIG. 5 according to embodiments of the disclosure. With reference to FIG. 5 and FIG. 6, the display apparatus includes a liquid crystal display panel 1 and a backlight module 2. A first sealed air cavity 3 is formed inside the liquid crystal display panel 1. The backlight module 2 is located on a side of the liquid crystal display panel 1 and forms a second sealed air cavity 4 with the liquid crystal display panel 1. The display apparatus further includes a sound board 5 and a sound driver 6. The sound board 5 is fixed to a surface of the backlight module 2 away from the liquid crystal display panel 1. A vibration output terminal of the sound driver 6 is fixed to a surface of the sound board 5 away from the backlight module 2. The sound driver 6 is configured to drive the sound board 5 to vibrate through the vibration output terminal to drive the backlight module 2 to vibrate.

Specifically, some embodiments of the disclosure provide a liquid crystal display apparatus with a self-sound-production screen, which relates to the field of multimedia technology that combines display apparatuses and electroacoustic. Referring to FIG. 5 and FIG. 6, the first sealed air cavity 3 is formed inside the liquid crystal display panel 1. The backlight module 2 is located on a side of the liquid crystal display panel 1 and forms the second sealed air cavity 4 with the liquid crystal display panel 1. The air in an air gap formed by the first sealed air cavity 3 and the second sealed air cavity 4 has viscosity, and kinematic viscosity of the air is many times higher than that of water, for example 15 times. The sealed air gap is equivalent to a damping spring between the liquid crystal display panel 1 and the backlight module 2, and is also equivalent to a damping spring inside the liquid crystal display panel 1. The sound driver 6 is configured to excite the sound board 5 to vibrate through the vibration output terminal to drive the backlight module 2 to vibrate. The sound driver 6 is further configured to use the equivalent damping spring to transmit a vibration force of a backlight plate 30 in the backlight module 2 vibrated by the sound driver 6 to a front panel of the liquid crystal display panel 1, so that the liquid crystal display panel 1 vibrates and produces sound. Since the sound driver 6 is located at the surface of the sound board 5 away from the backlight module 2, and the sound driver 6 does not affect the display of the display apparatus. In addition, the backlight module 2 includes a backlight plate 30 and a light-emitting structure 18 on the backlight plate 30. There is a certain distance between a lower surface of the liquid crystal display panel 1 and the light-emitting structure 18 on the backlight plate 30, such as top portions of lamp beads. A height of an air gap between the liquid crystal display panel 1 and the backlight plate 30 in the backlight module 2 can be the same as a height of the light-emitting structure 18 or slightly higher than a height of the light-emitting structure 18.

In some embodiments, the sound board 5 can be a honeycomb board or a carbon fiber board. When a screen size of the display apparatus is 65 inches and an aluminum honeycomb is used as the sound board 5, a thickness of the sound board 5 can be, for example, 1 mm to 4 mm. A core material of the sound board 5 includes but is not limited to paper, aramid, metal or other rigid foam materials. A skin material of the sound board 5 includes but is not limited to glass fiber, carbon fiber, glass-carbon hybrid fiber, plastic or lightweight aluminum, or other materials. In addition, the sound board 5 can also be used as a heat conduction board and a heat dissipation board for the backlight plate 30 in the backlight module 2.

Figure 7:
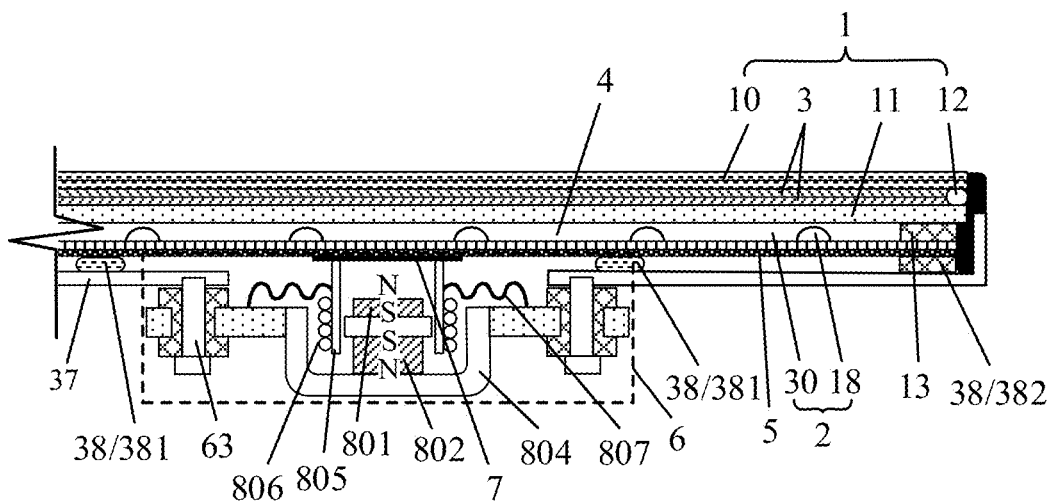
FIG. 7 is a schematic cross-sectional structural diagram of another display apparatus according to embodiments of the disclosure.
Figure 8:
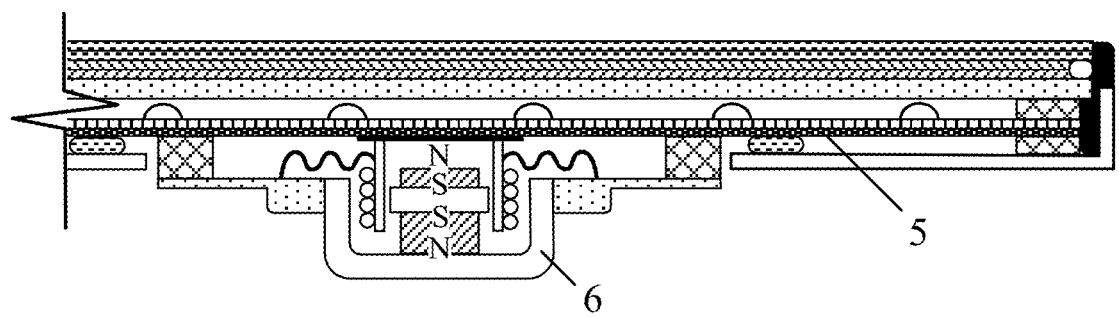
FIG. 8 is a schematic cross-sectional structural diagram of another display apparatus according to embodiments of the disclosure.

FIG. 7 is a schematic cross-sectional structural diagram of another display apparatus according to embodiments of the disclosure. FIG. 8 is a schematic cross-sectional structural diagram of another display apparatus according to embodiments of the disclosure. Referring to FIGS. 5 to 8, the sound driver 6 can be an electromagnetic vibration exciter, for example. The sound driver 6 includes coil tubes 805 and 806, magnetic field circuits 801 and 802 and 804, elastic waves 807 and buffer pads, etc. The sound driver 6 vibrates the sound board 5 in an inertial drive mode. The inertial drive includes the sound driver 6 and a stable structure supported by the sound driver 6. The inertial drive does not require additional support and fixation on a rear part of the sound driver 6. The sound driver 6 as a whole vibrates with the display apparatus.

In some embodiments, a vibration output terminal 7 of the sound driver 6 is directly connected with a side of the sound board 5, a central axis of the sound driver 6 is perpendicular to a plane of the sound board 5, and a vibration output direction is along the central axis of the sound driver 6 and perpendicular to a surface of the display apparatus, i.e., a vertical direction in FIG. 7. Under the action of the magnetic field, the electromagnetic force makes a coil tube with lighter mass produce a resonance with higher frequency, which directly vibrates the sound board 5 and the backlight module 2. The reaction force of the electromagnetic force makes a body of the sound driver 6 with larger mass produce a resonance with lower frequency, and vibrates the sound board 5 and the backlight module 2 through a buffer pad of a fulcrum. The body of the sound driver 6 has no fixed support, but vibrates with the vibration of the driven sound board 5 and the driven backlight module 2. This is also the biggest difference in an excitation method in which a body of a sound driver 6 in an OLED screen is fixed to a bracket.

Figure 9:
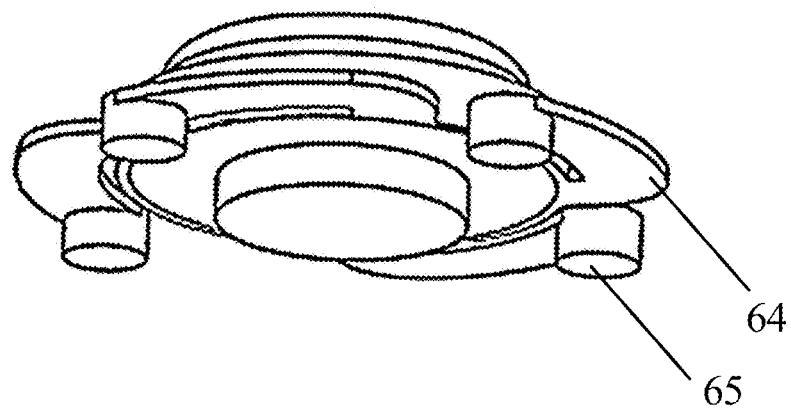
FIG. 9 is a schematic three-dimensional structural diagram of a sound driver according to embodiments of the disclosure.
Figure 10:
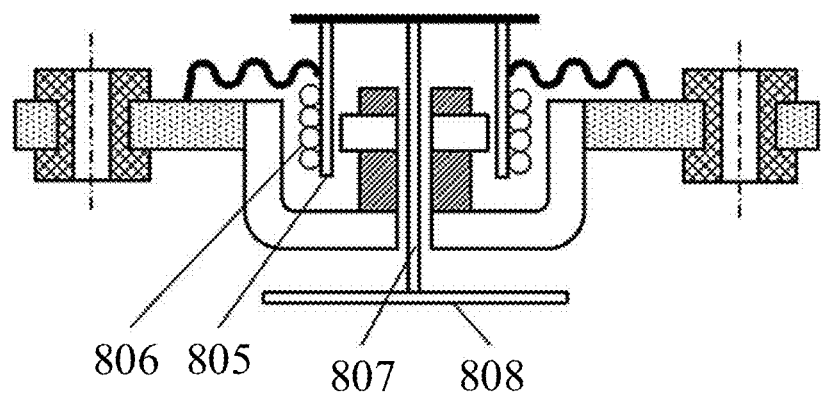
FIG. 10 is a schematic cross-sectional structural diagram of a sound driver according to embodiments of the disclosure.

As shown in FIG. 7, a fixing pin 63 is provided on a middle frame backplane 37, the sound driver 6 is connected with the fixing pin 63 through an I-shaped silicone isolation pad, so that the sound driver 6 can be supported and fixed in a floating manner with a certain forward and backward freedom of movement through the silicone isolation pad. Alternatively, as shown in FIG. 8, the sound driver 6 is directly fixed to the sound board 5. FIG. 9 is a schematic three-dimensional structural diagram of a sound driver according to embodiments of the disclosure. Referring to FIG. 8 and FIG. 9, the sound driver 6 has three or four sheet elastic legs 64 with low elastic coefficients and extending away from a center. The sheet elastic legs 64 extend convolutionally or radially away from the center. One end of the sheet elastic leg 64 away from the center is fixed to the sound board 5 through a damping block 65. The damping block 65 can be, for example, ethylene-vinyl acetate copolymer (EVA) with double-sided tape on the surface. FIG. 10 is a schematic cross-sectional structural diagram of a sound driver according to embodiments of the disclosure. As shown in FIG. 10, the sound driver 6 has a guide rod 807 and a diaphragm 808. The resonance with higher frequency on the coil tubes 805 and 806 is transmitted to a back diaphragm 808 through the guide rod 807, which can increase high-frequency sound wave radiation and enhance high-frequency response.

It should be noted that, in addition to the electromagnetic vibration exciter described in the above embodiments, the sound driver 6 can also use piezoelectric driving to achieve excitation vibration. Some embodiments of the disclosure do not limit the specific type of realization and specific structure of the sound driver 6. The specific working principle of the sound driver 6 is well known to those skilled in the art and will not be repeated herein. In addition, FIG. 5 only illustrates a distribution position of the sound driver 6 in the display apparatus. Some embodiments of the disclosure do not specifically limit the distribution position of the sound driver 6 in the display apparatus. The specific setting of the distribution position of the sound driver 6 can be determined according to sound generation requirements of the display apparatus.

Therefore, in some embodiments of the disclosure, the sound board 5 and two sealed air cavities in which internal air has viscosity, so that the sound driver 6 can transmit the vibration to a front panel of the liquid crystal display panel 1 through the sound board 5, the backlight module 2, the second sealed air cavity 4 and the first sealed air cavity 3 in sequence, causing the liquid crystal display panel 1 to vibrate and sound. Because the vibration output terminal 7 of the sound driver 6 is fixed to the surface of the sound board 5 away from the backlight module 2, the setting of the sound driver 6 does not affect the display of the display apparatus, making it possible for the screen of the traditional liquid crystal display apparatus to sound, giving the user an audio-visual experience where the sound comes from the images, and overcoming industry bottleneck problems that are difficult to achieve the sound coming from a liquid crystal display screen.

Figure 11:
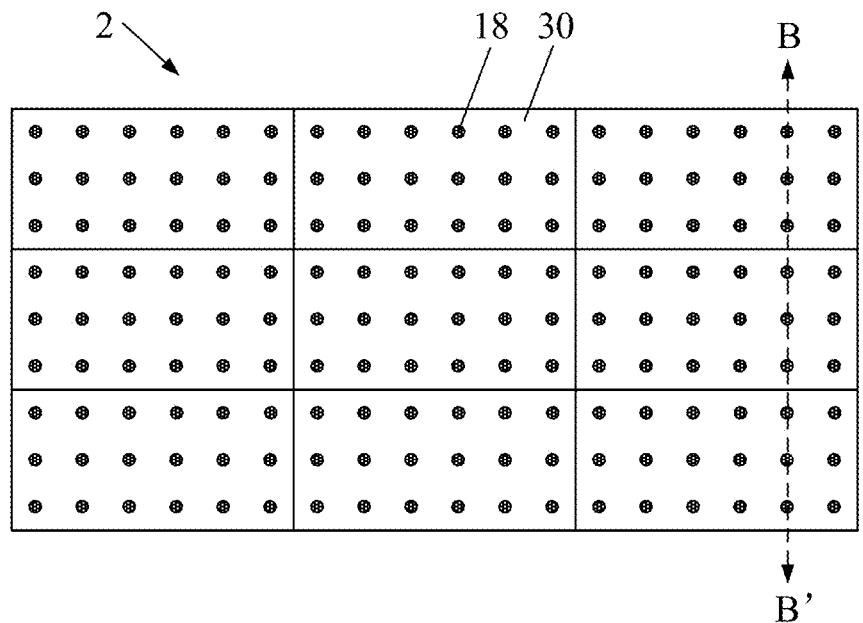
FIG. 11 is a schematic top-view structural diagram of a backlight module according to embodiments of the disclosure.
Figure 12:
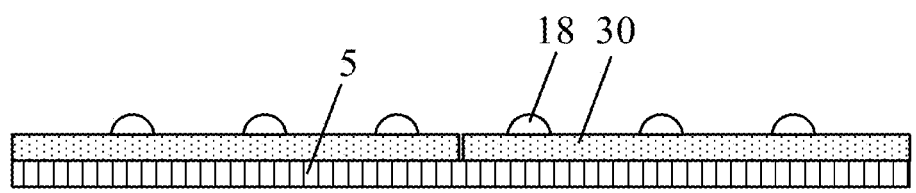
FIG. 12 is a schematic cross-sectional structural diagram along a BB' direction in FIG. 11 according to embodiments of the disclosure.

In some embodiments, FIG. 11 is a schematic top-view structural diagram of a backlight module according to embodiments of the disclosure. FIG. 12 is a schematic cross-sectional structural diagram along a BB' direction in FIG. 11 according to embodiments of the disclosure. With reference to FIGS. 6 to 8 and FIGS. 11 to 12, the sound board 5 is fixed to the backlight module 2 through a first adhesion buffer structure (not shown in FIG. 12).

In some embodiments, due to display apparatus processing yield and cost requirements, the backlight module 2 in the display apparatus can include a plurality of backlight plates 30, and the plurality of backlight plates 30 can be evenly arranged and spliced to form the backlight module 2. The sound board 5 and the backlight plate 30 are both rectangular flat plates. The first adhesion buffer structure can be double-sided tape. The backlight plate 30 backlight plates 30 are evenly distributed and attached to the sound board 5 through the first adhesion buffer structure. Adjacent backlight plates 30 are connected with each other through the sound board 5, so that all backlight plates 30 are connected into one entire panel, and a tight seam is formed between the adjacent backlight plates 30. In addition, the first adhesion buffer structure also plays a buffering role between the sound board 5 and the backlight module 2, avoiding a hard collision between the sound board 5 and the backlight module 2 during vibration to produce noise that affects the display effect of the display apparatus.

In some embodiments, in conjunction with FIG. 7 and FIG. 8, the vibration output terminal 7 is fixed to the sound board 5 through a second adhesion buffer structure (not shown in FIG. 7 and FIG. 8). In some embodiments, the vibration output terminal 7 can also be in direct contact with the sound board 5, which can also drive the sound board 5 to vibrate. However, when the sound driver 6 vibrates downward, the vibration output terminal 7 of the sound driver 6 will be separated from the sound board 5, which cannot drive the liquid crystal display panel 1 to produce sound; when the sound driver 6 vibrates upward, a hard collision will occur between the sound driver 6 and the sound board 5 to produce noise. In some embodiments of the disclosure, the vibration output terminal 7 is fixed to the sound board 5 through the second adhesion buffer structure. The second adhesion buffer structure can be, for example, double-sided tape. This solves the problems that when the sound driver 6 vibrates downward, the vibration output terminal 7 of the sound driver 6 will be separated from the sound board 5, which cannot drive the liquid crystal display panel 1 to produce sound; and when the sound driver 6 vibrates upward, a hard collision will occur between the sound driver 6 and the sound board 5 to produce noise.

Figure 13:
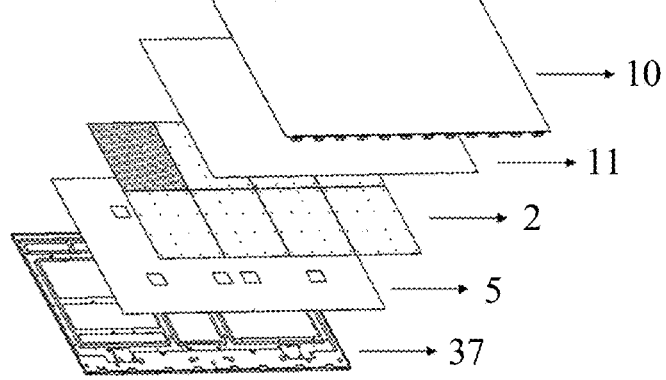
FIG. 13 is a schematic diagram of an explosion structure of a display apparatus according to embodiments of the disclosure.

In some embodiments, FIG. 13 is a schematic diagram of an explosion structure of a display apparatus according to embodiments of the disclosure. With reference to FIGS. 6 to 8 and 13, the liquid crystal display panel 1 includes a liquid crystal film layer 10 and an optical diffusion film layer 11. The liquid crystal film layer 10 is a display film layer. A frame position of the liquid crystal display panel 1 between the liquid crystal film layer 10 and the optical diffusion film layer 11 is provided with a first annular sealed structure 12, and the liquid crystal film layer 10 and the optical diffusion film layer 11 form the first sealed air cavity 12 through the first annular sealed structure 3.

Specifically, the first annular sealed structure 12 can be optical glue, for example. The first annular sealed structure 12 makes the air in an air gap of the first sealed air cavity 3 have viscosity. The sound driver 6 is configured to excite the sound board 5 to vibrate through the vibration output terminal 7 to drive the backlight module 2 to vibrate. The sound driver 6 is further configured to use an equivalent damping spring of a sealed air gap to transmit a vibration force of the backlight plate 30 in the backlight module 2 vibrated by the sound driver 6 to a front panel of the liquid crystal display panel 1, to cause the liquid crystal display panel 1 to vibrate and produce sound. Therefore, in some embodiments of the disclosure, the optical glue is used to achieve a fully bonded structure of the liquid crystal display panel 1. The optical diffusion film layer 11 can include an optical film and a diffusion plate. The display structure and corresponding working principle of the liquid crystal display panel 1 are known by those skilled in the art, and will not be repeated herein. The optical glue is used for bonding the liquid crystal film layer 10, the optical film and the diffusion plate, so that a multi-layer diaphragm structure becomes one component, which is equivalent to a single-layer screen, so that vibration produced by the sound driver 6 can be transmitted to the front of the liquid crystal display panel 1 through the liquid crystal display panel 1 with the fully bonded structure. Illustratively, the materials constituting the diffusion plate include, but are not limited to, glass, acrylic, polycarbonate and other lightweight transparent organic plates.

It should be noted that, the optical diffusion film layer 11 can include an optical film and a diffusion plate. The optical film is located on a side of the diffusion plate adjacent to the liquid crystal film layer 10. As shown in FIG. 6, an air cavity is formed between the optical film and the liquid crystal film layer 10, or an air cavity can also be formed between the optical film and the diffusion plate, or air cavities can also be formed both between the optical film and the liquid crystal film layer 10 and between the optical film and the diffusion plate. In addition, part of the frame position corresponding to the display apparatus can be set, and the optical film and the diffusion plate are both in contact with the middle frame backplane 37, for example, at the right frame position in FIG. 6, the optical film and the diffusion plate are both in contact with the middle frame backplane 37. At other frame positions, the optical film and the diffusion plate are in a floating state relative to the middle frame backplane 37, for example, at the left frame position in FIG. 6, the optical film and the diffusion plate are in a floating state relative to the middle frame backplane 37.

Therefore, the aforementioned air cavity is connected with the air cavity between the backlight plate 30 and the diffusion plate through a floating position, such as the left frame position in FIG. 6, to form a second sealed air cavity 4 between the backlight module 2 and the liquid crystal display panel 1, to realize the conduction of sound from the sound board to the front side of the display panel, thereby achieving sound produced on the screen. That is, the second sealed air cavity 4 includes the air cavity between the backlight plate 30 and the diffusion plate, and also includes the air cavity between the optical film and the liquid crystal film layer 10, or also includes the air cavity between the optical film and the diffusion plate.

Alternatively, no air cavity is formed between the optical film and the liquid crystal film layer 10, and no air cavity is formed between the optical film and the diffusion plate, that is, the optical film is in direct contact with the liquid crystal film layer 10, and the optical film is in direct contact with the diffusion plate. The second sealed air cavity 4 includes the air cavity between the backlight plate 30 and the diffusion plate, and also includes a floating position, such as the air gap at the left frame position in FIG. 6, and the air cavity is connected with the floating position to form a sealed air cavity.

Figure 14:
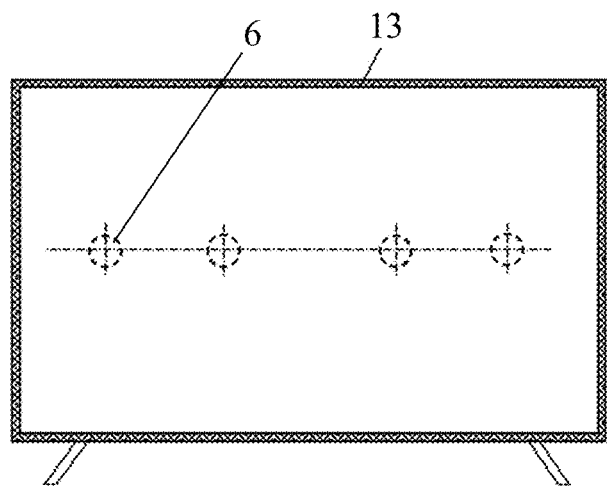
FIG. 14 is a schematic three-dimensional structural diagram of another display apparatus according to embodiments of the disclosure.

In some embodiments, FIG. 14 is a schematic three-dimensional structural diagram of another display apparatus according to embodiments of the disclosure. With reference to FIGS. 6 to 8 and FIGS. 13 and 14, a frame position of the liquid crystal display panel 1 between the backlight module 2 and the liquid crystal display panel 1 is provided with a second annular sealed structure 13, and the backlight module 2 and the liquid crystal display panel 1 form the second sealed air cavity 4 through the second annular sealed structure 13.

In some embodiments, the second annular sealed structure 13 can be, for example, optical glue. The second annular sealed structure 13 is arranged around the frame of the liquid crystal display panel 1 so that the air in an air gap of the second sealed air cavity 4 has viscosity. The sound driver 6 is configured to excite the sound board 5 to vibrate through the vibration output terminal 7 to drive the backlight module 2 to vibrate. The sound driver 6 is further configured to use an equivalent damping spring of a sealed air gap to transmit a vibration force of the backlight plate 30 in the backlight module 2 vibrated by the sound driver 6 to a front panel of the liquid crystal display panel 1, causing the liquid crystal display panel 1 to vibrate and produce sound. For example, a maximum height of an air gap formed by the second sealed air cavity 4 can be 10 mm, such as 1 mm. In addition, the first annular sealed structure 12 can also be arranged around the frame of the liquid crystal display panel 1, similar to the second annular sealed structure 13.

Therefore, circumventing the stacked structure of the display apparatus as described in some embodiments of the disclosure, especially circumventing the air sealed layer between the liquid crystal display panel 1 and the backlight module 2, will not achieve or seriously reduce the coupling of vibrations to the liquid crystal display panel 1 to achieve sound effects. Similarly, circumventing the fully bonded structure inside the liquid crystal display panel 1 will seriously reduce vibration transmission effects and affect full-band responses of the low-frequency, mid-frequency and high-frequency of the display apparatus.

Figure 15:
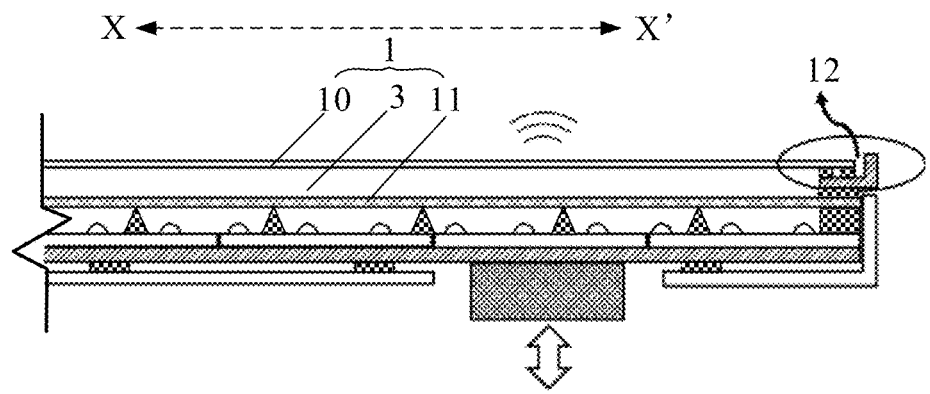
FIG. 15 is a schematic cross-sectional structural diagram of another display apparatus according to embodiments of the disclosure.
Figure 16:
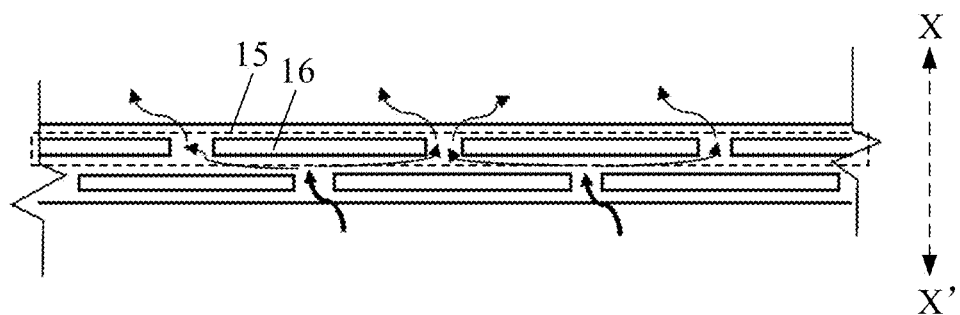
FIG. 16 is a schematic top-view structural diagram of a low-frequency airflow channel according to embodiments of the disclosure.

In some embodiments, FIG. 15 is a schematic cross-sectional structural diagram of another display apparatus according to embodiments of the disclosure. FIG. 16 is a schematic top-view structural diagram of a low-frequency airflow channel according to embodiments of the disclosure. Based on some of the above embodiments, with reference to FIG. 15 and FIG. 16, the first annular sealed structure 12 includes a plurality of low-frequency airflow channels. The arrows in FIG. 16 represent airflow directions in the low-frequency airflow channels. The low-frequency airflow channels are configured to connect the first sealed air cavity 3 and the external environment where the display apparatus is located.

Specifically, an air gap between the liquid crystal film layer 10 and the optical diffusion film layer 11 inside the liquid crystal display panel 1 uses the first annular sealed structure 12 to form the first sealed air cavity 3, and the vibration of the optical diffusion film layer 11 is transmitted to the liquid crystal film layer 10 and a glass cover and other structures in front of the liquid crystal display panel 1 through the first sealed air cavity 3, and the liquid crystal display panel 1 vibrates and produces sound. However, when low-frequency and large-amplitude vibrations are transmitted, the first sealed air cavity 3 is under great pressure and squeezes the liquid crystal film layer 10, causing the liquid crystal film layer 10 to be compressed and deformed, thereby causing display problems. If vibration energy is reduced or a thickness of the first sealed air cavity 3 is increased, transmission efficiency of the vibration energy will be reduced, which is not conducive to improving sound frequency.

In some embodiments of the disclosure, the first annular sealed structure 12 includes a plurality of low-frequency airflow channels. The low-frequency airflow channels are configured to connect the first sealed air cavity 3 with the external environment where the display apparatus is located. The first annular sealed structure 12 at an edge of the liquid crystal display panel 1 is provided with a plurality of low-frequency airflow channels, that is, a filter structure is provided. During low-frequency vibration, air pressure leaks outward from the low-frequency airflow channels, and low-frequency sound waves are radiated outward through the low-frequency airflow channels to avoid the problem that when the optical diffusion film layer 11 has a large amplitude, the liquid crystal film layer 10 is subject to a serious pressure to affect the display, so that low-frequency sound waves are directly output from the low-frequency airflow channels, improving the radiation efficiency of low-frequency transmission. During mid-frequency and high-frequency vibrations, due to the structure of the low-frequency airflow channels, the low-frequency airflow channels are invalid, but during high-frequency vibrations, the amplitude of the optical diffusion film layer 11 is smaller, and the liquid crystal film layer 10 will not cause display problems due to pressure.

In some embodiments, with reference to FIG. 15 and FIG. 16, along a plane parallel to the liquid crystal display panel 1, the first annular sealed structure 12 includes a plurality of rows of channel forming structures 15 arranged along a first direction XX', one row of channel forming structures 15 includes a plurality of barrier structures 16 arranged at intervals of a set distance, and the barrier structures 16 in different rows of channel forming structures 15 are staggered. The first direction XX' is perpendicular to an extension direction of a frame of the liquid crystal display panel 1.

Specifically, for example, an equivalent diameter three times of a cross-sectional area of a low-frequency airflow channel can be set to be less than or equal to a channel length. Under this design, the low-frequency airflow channel can be equivalent to an acoustic device tube. The air in the acoustic device tube vibrates to form a resonance of a certain frequency, which can be equivalent to a resonance of a compliant device and a mass device, that is, the resonance is equivalent to a resonance of air elasticity and air sealed mass, so that the plurality of low-frequency airflow channels have a high-frequency filtering effect, that is, high-frequency vibrations cannot be transmitted outward through the tubes. At high-frequency, it is equivalent to channel sealed to ensure enough support between the liquid crystal film layer 10 and the optical diffusion film layer 11. At low-frequency, the low-frequency airflow channel has no filtering effect, and when vibrating at low frequencies, it is equivalent to an open channel. As shown in FIG. 15 and FIG. 16, the first annular sealed structure 12 includes two rows of channel forming structures 15 arranged along the first direction XX'. In some embodiments of the disclosure, the number of rows of channel forming structures 15 arranged along the first direction XX' is not limited.

Figure 17:
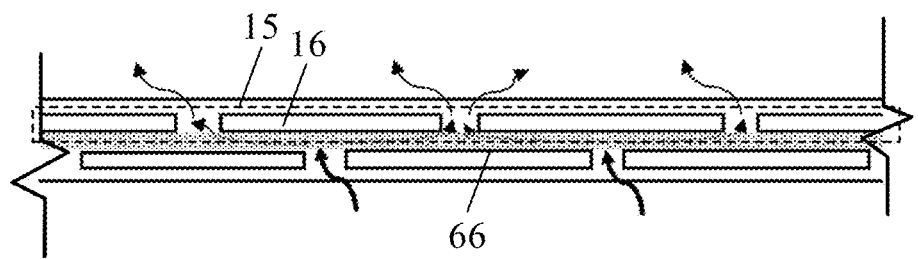
FIG. 17 is a schematic top-view structural diagram of another low-frequency airflow channel according to embodiments of the disclosure.

In some embodiments, FIG. 17 is a schematic top-view structural diagram of another low-frequency airflow channel according to embodiments of the disclosure. As shown in FIG. 16 and FIG. 17, in order to prevent external dust from entering the display apparatus through the low-frequency airflow channel, a porous damping material 66 is added inside the low-frequency airflow channel to further optimize the filtering performance of the low-frequency airflow channel and prevent foreign objects from entering. Alternatively, the double-layer tape, for example, as shown in FIGS. 15 to 17, that forms the low-frequency airflow channel, can be directly replaced with a micro-porous breathable tape to achieve a low-cost filtering solution and dust-proof effect.

In some embodiments, the backlight module 2 is a Mini-LED backlight module. Specifically, the MiniLED backlight module is small in size. The backlight module 2 is set to a MiniLED backlight module, which can effectively reduce the air gap between the liquid crystal display panel 1 and the backlight module 2, and use the sealing around the liquid crystal display panel 1 and the backlight module 2 to make the air in the air gap have viscosity. The sealed air gap is equivalent to a damping spring between the liquid crystal display panel 1 and the backlight module 2, and the equivalent damping spring transmits a vibration force of the backlight module 2 vibrated by the sound driver 6 to the liquid crystal display panel 1 for producing sound.

It should be noted that, the backlight module 2 can include a plurality of backlight plates 30, i.e., light panels, or can include a plurality of light bars, which are not specifically limited in some embodiments of the disclosure. The backlight module 2 is not limited to the MiniLED backlight module, and other self-luminous structures can also be used as the backlight module 2.

Figure 18:
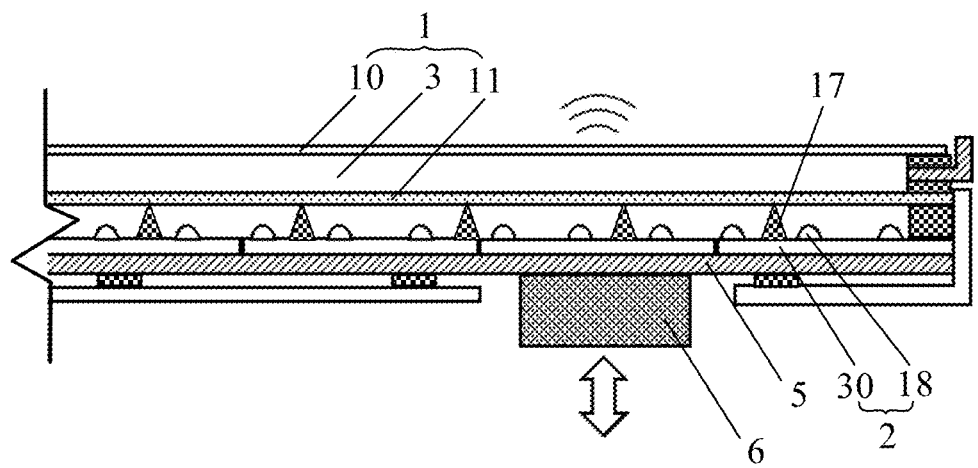
FIG. 18 is a schematic cross-sectional structural diagram of another display apparatus according to embodiments of the disclosure.
Figure 19:
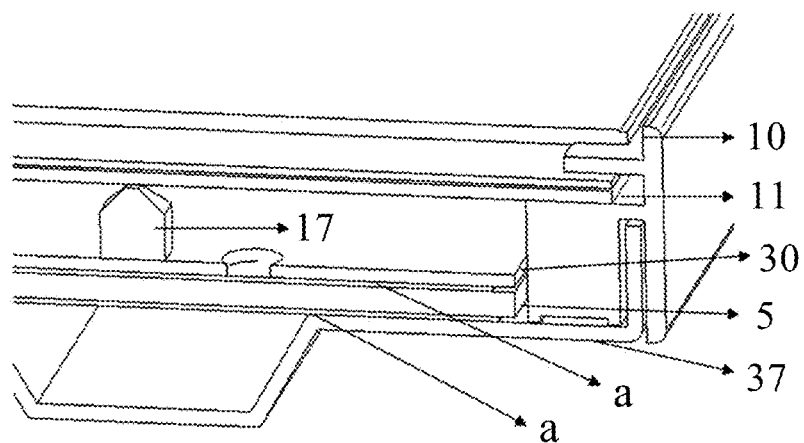
FIG. 19 is a schematic three-dimensional structural diagram of another display apparatus according to embodiments of the disclosure.

In some embodiments, FIG. 18 is a schematic cross-sectional structural diagram of another display apparatus according to embodiments of the disclosure. FIG. 19 is a schematic three-dimensional structural diagram of another display apparatus according to embodiments of the disclosure. Based on some of the above embodiments, with reference to FIG. 18 and FIG. 19, the display apparatus further includes a plurality of elastic supports 17. The elastic supports 17 are interferingly arranged between a first structure and the liquid crystal display panel 1. The first structure is the backlight module 2 or the sound board 5, for example, as shown in FIG. 15 and FIG. 16, the first structure is the backlight module 2, a side of the backlight module 2 adjacent to the liquid crystal display panel 1 includes a plurality of light-emitting structures 18, and one or more of the elastic supports 17 are located between any two of the light-emitting structures 18.

In some embodiments, there are problems in vibration transmission processes of the sound driver 6, i.e., a thickness of an air gap between the liquid crystal display panel 1 and the backlight module 2 changes greatly due to material tolerances, assembly process tolerances, and its own gravity, etc., as a result, the consistency of vibration transmission efficiency cannot be guaranteed, and the fit between the liquid crystal display panel 1 and the backlight module 2 causes vibration noise and abrasion. In order to avoid the above problems, in some embodiments of the disclosure, one or more elastic supports 17 are added between the liquid crystal display panel 1 and the backlight module 2. The elastic support 17 has the following characteristics: one side of the elastic support 17 is in contact with the liquid crystal display panel 1, and the other side of the elastic support 17 is in contact with the backlight module 2, and the one or both sides of the elastic support 17 are respectively fixed to the contact position through a mechanical structure or an adhesive; and the elastic support 17 can be made of, for example, a high resilience material or a combination of materials with a resilience function, such as silicone, etc. The elastic support 17 can ensure a stable size of the air gap between the liquid crystal display panel 1 and the backlight module 2 and avoid abnormal collision noise between the liquid crystal display panel 1 and the backlight module 2, and the solid elastic support 17 improves transmission efficiency of the vibration from the backlight module 2 to the liquid crystal display panel 1. In addition, the position a in FIG. 19 can be tape.

Figure 20:
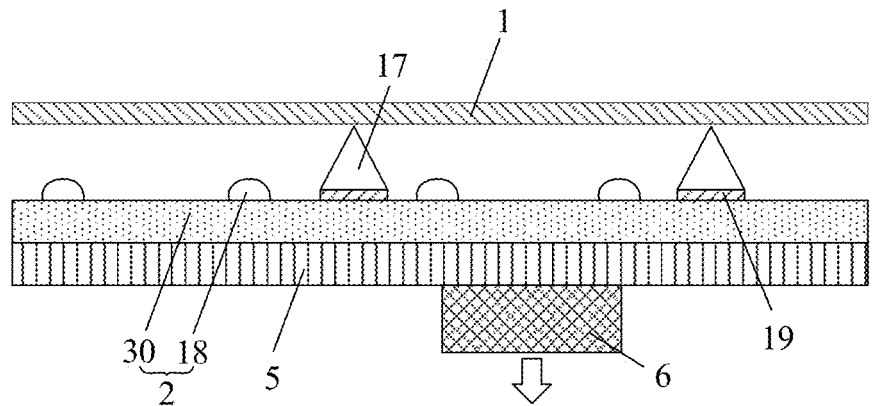
FIG. 20 is a schematic cross-sectional structural diagram of another display apparatus according to embodiments of the disclosure.
Figure 21:
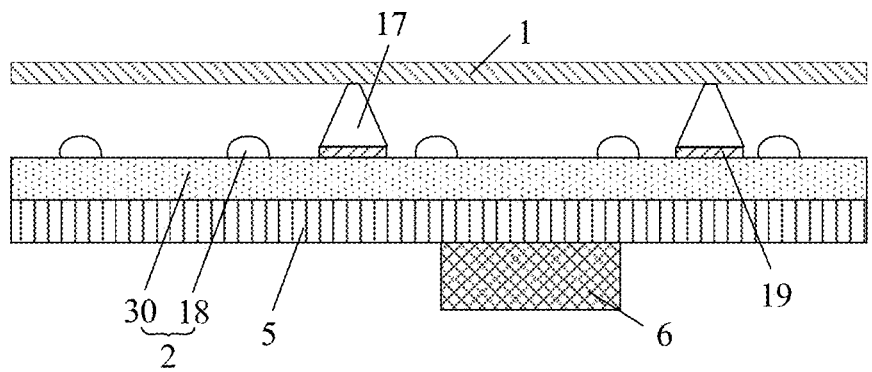
FIG. 21 is a schematic cross-sectional structural diagram of another display apparatus according to embodiments of the disclosure.
Figure 22:
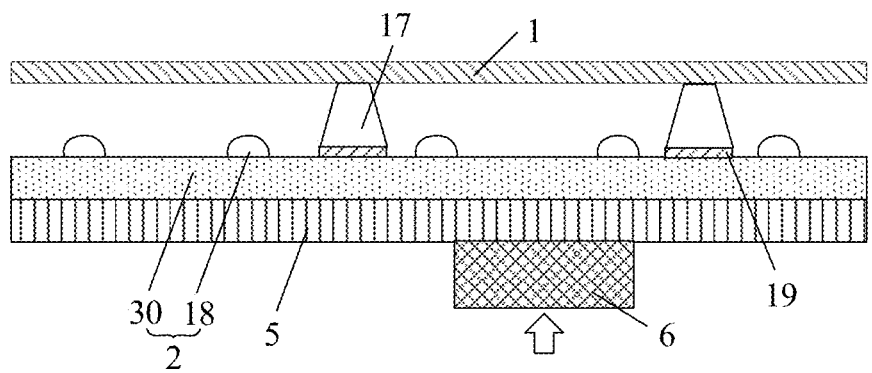
FIG. 22 is a schematic cross-sectional structural diagram of another display apparatus according to embodiments of the disclosure.

In some embodiments, the elastic support 17 is interferingly arranged between the backlight module 2 and the liquid crystal display panel 1. That is, the combination of one side of the elastic support 17 with the liquid crystal display panel 1 and the combination of the other side of the elastic support 17 with the backlight module 2 can use a cooperating design in a size interference manner. That is, a size of the elastic support 17 is larger than a height design size between the liquid crystal display panel 1 and the backlight module 2. FIG. 20 is a schematic cross-sectional structural diagram of another display apparatus according to embodiments of the disclosure. When a vibrator corresponding to the sound driver 6 vibrates backward, the elastic support 17 is in a free contact state. FIG. 21 is a schematic cross-sectional structural diagram of another display apparatus according to embodiments of the disclosure. When the sound driver 6 does not vibrate and the elastic support 17 is in a static state, the elastic support 17 is in an interference compression state due to the extrusion caused by the liquid crystal display panel 1 and the backlight module 2. FIG. 22 is a schematic cross-sectional structural diagram of another display apparatus according to embodiments of the disclosure. When the vibrator corresponding to the sound driver 6 is pushed forward, the elastic support 17 is in a further overpressure state. The size of the elastic support 17 can be, for example, a sum of a distance between the liquid crystal display panel 1 and the backlight module 2 and half of a vibration amplitude of the vibrator, ensuring that in a state as shown in FIG. 20, the elastic support 17 is in contact with the liquid crystal display panel 1 and the backlight module 2, thereby improving transmission efficiency of the vibration from the backlight module 2 to the liquid crystal display panel 1.

Figure 23:
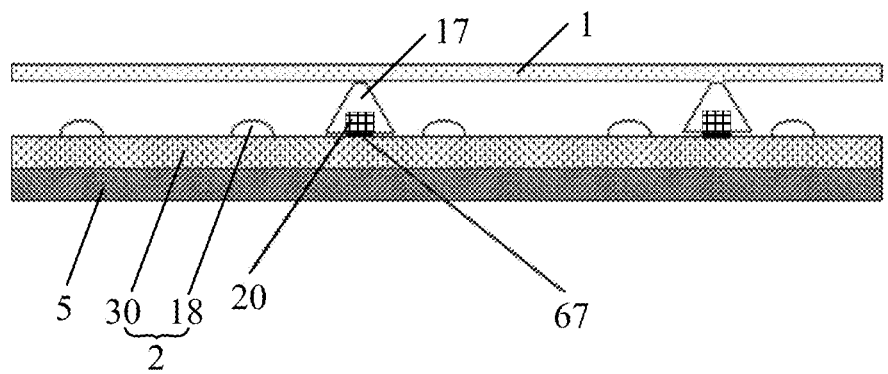
FIG. 23 is a schematic cross-sectional structural diagram of another display apparatus according to embodiments of the disclosure.

In some embodiments, with reference to FIGS. 20 to 22, the elastic support 17 can be fixed to the first structure, such as the backlight module 2, through a first adhesive structure 19, where the first adhesive structure 19 is, for example, double-sided tape. Alternatively, FIG. 23 is a schematic cross-sectional structural diagram of another display apparatus according to embodiments of the disclosure. As shown in FIG. 23, the elastic support 17 can also be provided adjacent to the first structure. For example, a side of the backlight module 2 is provided with a welding structure 20, the elastic support 17 is welded and fixed to the first structure, such as a position 67 where the backlight module 2 is located, through the welding structure 20. In some embodiments, the elastic support 17 can be injection molded, mechanically matched, or bonded with a metal weldable material structure, and the welding structure 20 is fixedly connected with the backlight plate 30 of the backlight module 2 through welding, thereby achieving the fixing of the elastic support 17. This method can enable the elastic support 17 to be mounted firmly and facilitate batch automatic assembly.

In addition, materials of the elastic support 17 can be, for example, elastic materials such as silicone rubber. However, the elastic materials have a problem of hardness change due to the temperature. Changes in the internal temperature when the display apparatus is working will cause the hardness of the elastic support 17 to change, thus affecting the support and vibration transmission optimization of the elastic support 17. As shown in FIG. 23, the optimization can be made through a two-material composite method. The elastic materials ensure vibration buffering effects, and inelastic materials, that is, the welding structure 20, ensure that the vibration transmission effect does not change with temperature changes.

Figure 24:
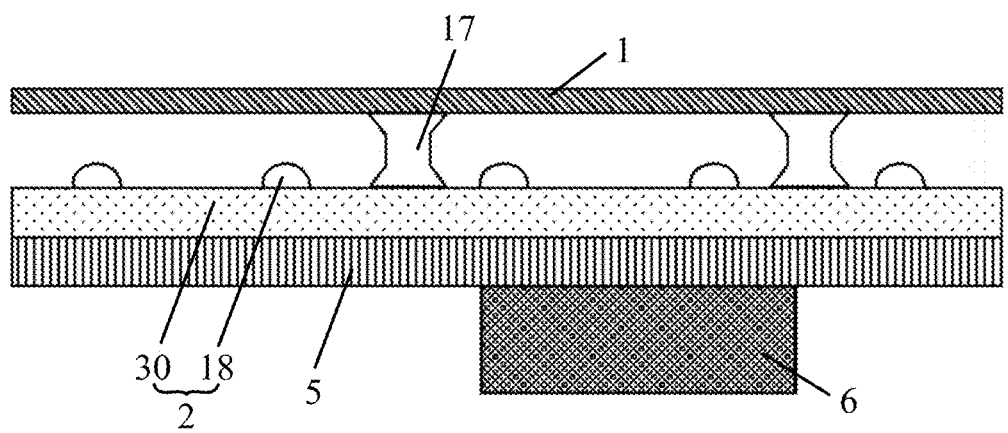
FIG. 24 is a schematic cross-sectional structural diagram of another display apparatus according to embodiments of the disclosure.
Figure 25:
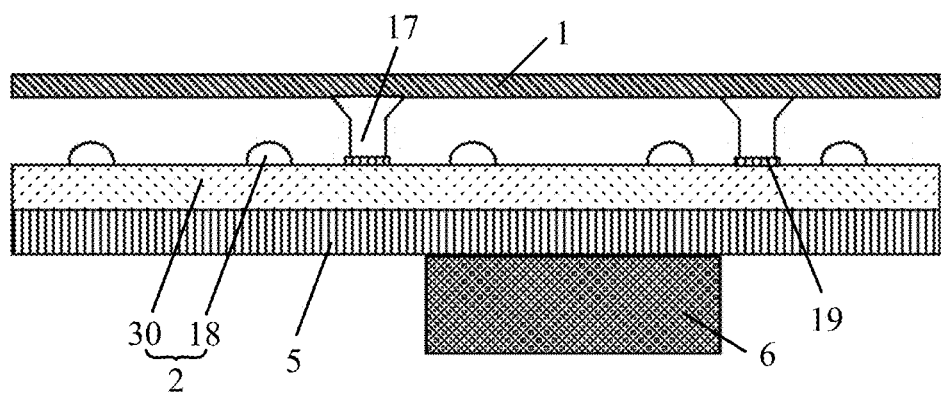
FIG. 25 is a schematic cross-sectional structural diagram of another display apparatus according to embodiments of the disclosure.

In some embodiments, FIG. 24 is a schematic cross-sectional structural diagram of another display apparatus according to embodiments of the disclosure. As shown in FIG. 24, both ends of the elastic support 17 are provided with suction cup structures. The elastic support 17 is respectively fixed to the first structure, such as the backlight module 2 and the liquid crystal display panel 1, through the suction cup structures at both ends. FIG. 25 is a schematic cross-sectional structural diagram of another display apparatus according to embodiments of the disclosure. As shown in FIG. 25, one end of the elastic support 17 can also be fixed to the first structure, such as the backlight module 2, through the first adhesive structure 19, such as double-sided tape, and the other end of the elastic support 17 is provided with a suction cup structure, and the elastic support 17 is fixed to the liquid crystal display panel 1 through the suction cup structure. Therefore, the elastic support 17 can be fixed by double-sided bonding or mechanical structure fixation, thereby realizing vibration linkage between the backlight module 2 and the liquid crystal display panel 1 and improving vibration transmission efficiency. However, the double-sided bonding or mechanical structure fixation has the disadvantage of complicated process implementation. The suction cup adsorption solution can improve the achievability of the solution.

Figure 26:
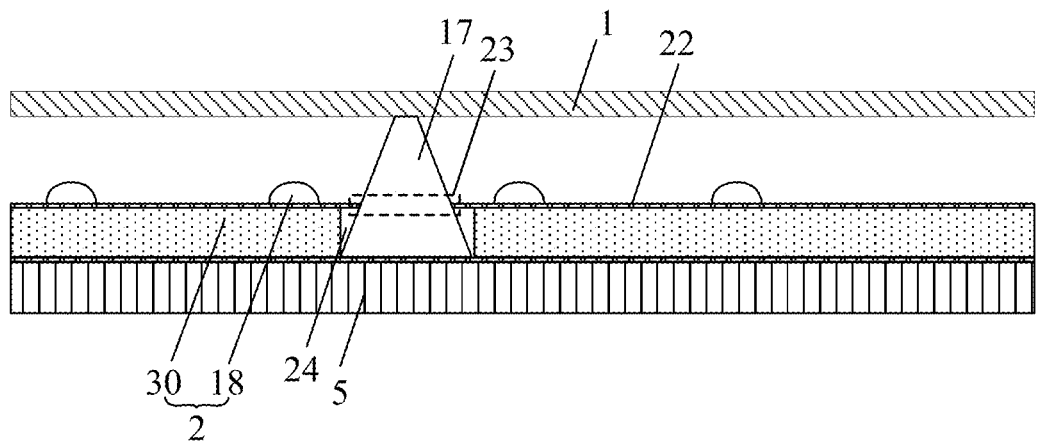
FIG. 26 is a schematic cross-sectional structural diagram of another display apparatus according to embodiments of the disclosure.
Figure 27:
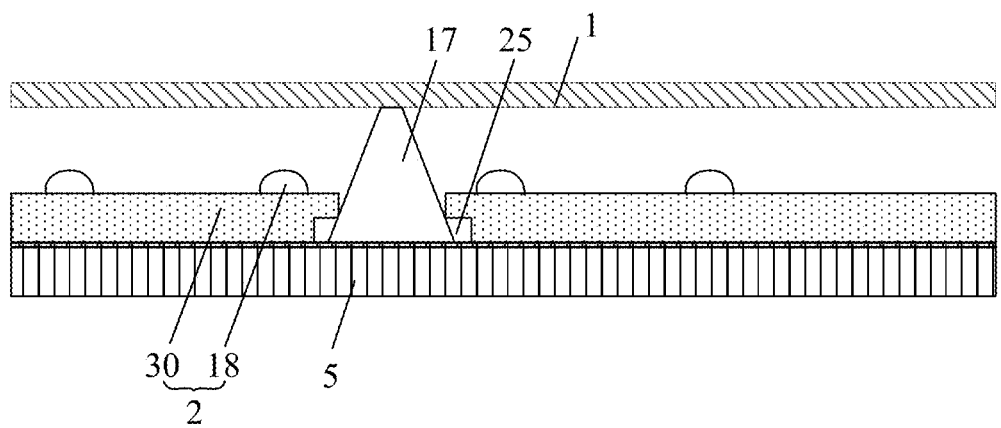
FIG. 27 is a schematic cross-sectional structural diagram of another display apparatus according to embodiments of the disclosure.

In some embodiments, FIG. 26 is a schematic cross-sectional structural diagram of another display apparatus according to embodiments of the disclosure. FIG. 27 is a schematic cross-sectional structural diagram of another display apparatus according to embodiments of the disclosure. With reference to FIG. 26 and FIG. 27, the first structure can also be the sound board 5, the elastic support 17 is interferingly arranged between the sound board 5 and the liquid crystal display panel 1, and a side of the backlight module 2 adjacent to the liquid crystal display panel 1 includes a plurality of light-emitting structures 18, and one or more elastic supports 17 are located between any two of the light-emitting structures 18.

In some embodiments, as shown in FIG. 26, the side of the backlight module 2 adjacent to the liquid crystal display panel 1 is provided with a fixing plate 22. The fixing plate 22 is provided with a plurality of clamping holes 23. The backlight module 2 is provided with a plurality of penetration installation holes 24, and the clamping holes 23 are configured to fix the elastic supports 17 in the penetration installation holes 24 and on the sound board 5. Alternatively, as shown in FIG. 27, the backlight module 2 includes a plurality of counterbores 25, the counterbore 25 is configured to fix the elastic support 17 on the sound board 5.

In some embodiments, an adhesive layer between the elastic support 17 and the backlight module 2 is prone to falling off after long-term vibration, and the assembly process is cumbersome. In some embodiments of the disclosure, as shown in FIG. 26, the backlight module 2 is provided with the penetration installation holes 24 corresponding to installation positions of the elastic supports 17. A bottom of the backlight module 2 and a surface of the sound board 5 are provided with a glue layer. A bottom surface of the elastic support 17 is bonded to the glue layer. The fixing plate 22 is provided on a surface of the backlight module 2. The fixing plate 22 is provided with an opening to make the top of the elastic support 17 protrude. A cross-sectional area of a bottom surface of the elastic support 17 is larger than a cross-sectional area of the top surface of the elastic support 17. A size of the opening of the fixing plate 22 is smaller than the cross-sectional area of the bottom surface of the elastic support 17. Therefore, the elastic support 17 is fixed to the backlight module 2 through this structure to prevent the elastic support 17 from falling off. Alternatively, as shown in FIG. 27, the backlight module 2 is provided with the counterbores 25 corresponding to the installation positions of the elastic supports 17 to fix the elastic supports 17 more easily. It should be noted that, the structures similar to the structures as shown in FIG. 26 and FIG. 27 and used for fixing the elastic support 17 can also be used, which does not specifically limited in some embodiments of the disclosure. It should be noted that when the first structure is the sound board 5, the method for fixing the elastic support 17 to the sound board 5 and the liquid crystal display panel 1 on both sides of the elastic support 17 can also refer to the fixing methods of FIGS. 20 to 25, which will not be repeated herein.

In some embodiments, with reference to FIGS. 18 to 27, the elastic support 17 can be, for example, conical or cylindrical, or can be configured in a shape similar to that shown in FIG. 19. For example, a cross-sectional area of a portion of the elastic support 17 adjacent to the liquid crystal display panel 1 is smaller than a cross-sectional area of a portion of the elastic support 17 adjacent to the backlight module 2.

In addition, the elastic support 17 is disposed within an illumination range of the light-emitting structure 18 on the backlight module 2. The design of the shape of the elastic support 17 needs to consider the problem of local bright spots or dark spots caused by the refraction of light when the light-emitting structure 18 emits light. In order to avoid local display problems caused by refraction of the light, the elastic support 17, for example, can be provided at equal intervals with four light-emitting structures 18 surrounding the elastic support 17, and adopt a conical or cone tetrahedron design. When the elastic support 17 adopts the cone tetrahedron design, an off-axis angle between each surface of the elastic support 17 and a corresponding light-emitting structure 18 can be the same, for example.

Figure 28:
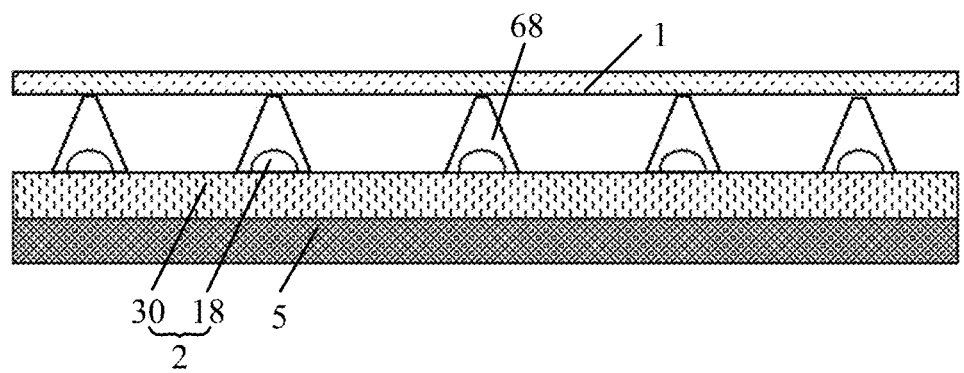
FIG. 28 is a schematic cross-sectional structural diagram of another display apparatus according to embodiments of the disclosure.

In some embodiments, FIG. 28 is a schematic cross-sectional structural diagram of another display apparatus according to embodiments of the disclosure. As shown in FIG. 28, the side of the backlight module 2 adjacent to the liquid crystal display panel 1 includes a plurality of light-emitting structures 18. The light-emitting structures 18 can also be covered with elastic supports 17, and the elastic supports 17 are light-guiding elastic supports 68. The first structure is the backlight module 2. The light-guiding elastic support 68 is arranged interferingly between the backlight module 2 and the liquid crystal display panel 1. Specifically, the light-emitting structure 18 is, for example, a MiniLED, and the light-guiding elastic support 68 can be implemented by arranging a light-guiding part or a light-guiding glue dot at a position of the light-emitting structure 18, so that the light-guiding elastic support 68 can be installed on the backlight module 2 based on the welding of the light-emitting structure 18 and the backlight plate 30 in the backlight module 2, which is beneficial to improving assembly efficiency. In addition, the interference design of the light-guiding elastic support 68 and the working principle for support and sound transmission can be referred to the previous embodiments of the disclosure, and will not be repeated herein. Referring to the above embodiments of the disclosure, in some embodiments of the disclosure, the elastic supports 17 with light-guiding properties are used to avoid abnormal collision noise in the liquid crystal display apparatus without affecting the luminous efficiency of the light-emitting structure 18, and improve vibration transmission efficiency of an area between the sound board 5 and the liquid crystal display panel 1.

Figure 29A:
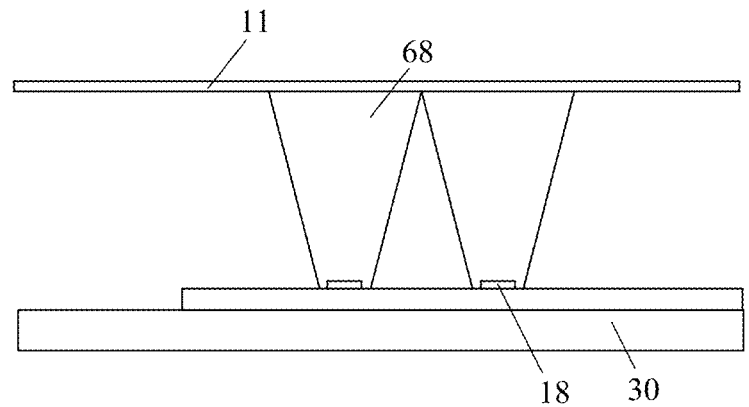
FIG. 29A is a schematic cross-sectional structural diagram of another display apparatus according to embodiments of the disclosure.

FIG. 29A is a schematic cross-sectional structural diagram of another display apparatus according to embodiments of the disclosure. As shown in FIG. 29A, the light-guiding elastic support 68 can be set as a multifunctional elastic diffusion plate bracket. That is, the light-guiding elastic support 68 can replaces the lens and diffusion plate bracket in the backlight. The light-guiding elastic support 68 can effectively support the liquid crystal display panel 1 by contacting the diffusion plate in the optical diffusion film layer 11, and a cross-sectional area of the light-guiding elastic support 68 parallel to the liquid crystal display panel 1 increases is in a direction away from the backlight plate 30, that is, the cross-sectional area of the light-guiding elastic support 68 gradually increases, so that the light-guiding elastic support 68 has a uniform light effect on the light emitted from the light-emitting structure 18, and can evenly distribute uneven light intensity of the light-emitting structure 18.

Figure 29B:
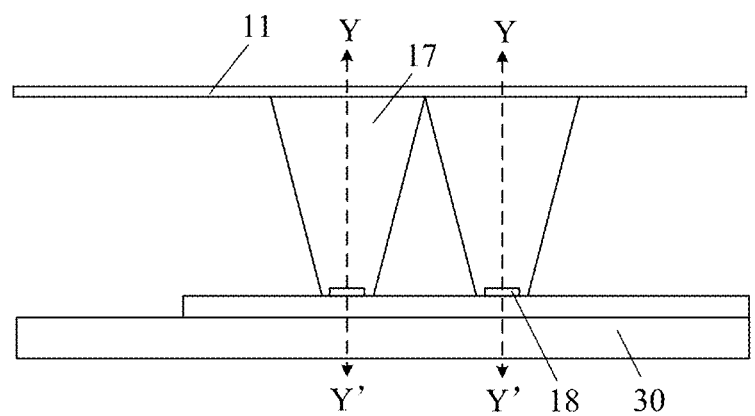
FIG. 29B is a schematic cross-sectional structural diagram of another display apparatus according to embodiments of the disclosure.

In some embodiments, FIG. 29B is a schematic cross-sectional structural diagram of another display apparatus according to embodiments of the disclosure. As shown in FIG. 29B, the elastic support 17 is provided with a plurality of bubble structures inside, and a distribution density of the bubble structures decreases in a direction away from a first central axis YY'; and/or the elastic support 17 is filled with a plurality of light-guiding particles, and a distribution density of the light-guiding particles decreases in a direction away from a first central axis YY'. The first central axis YY' is a longitudinal central axis of the elastic support 17 perpendicular to the liquid crystal display panel 1. That is, the plurality of bubble structures can be formed inside the elastic support 17, and the distribution density of the bubble structures decreases in the direction away from the first central axis YY', or the elastic support 17 is filled with the plurality of light-guiding particles, and the distribution density of the light-guiding particles decreases in the direction away from the first central axis YY', or the elastic support 17 is provided with the plurality of bubble structures and the plurality of light-guiding particles inside, and distribution densities of the bubble structures and the light-guiding particles decrease in the direction away from the first central axis YY'.

In some embodiments, the light-guiding elastic support 68 can be made of a silicone material with a set transparency. For example, the light-guiding elastic support 68 is provided with a plurality of bubbles or light-guiding particles such as silica particles inside, to realize light uniformity function of the light-guiding elastic support 68. A distribution density of the bubbles or the silica particles gradually decreases along a direction away from a longitudinal central axis of the light-guiding elastic support 68. The bubbles or the silica particles with the above distribution cooperate with the shape of the light-guiding elastic support 68, so that the light-guiding elastic support 68 has a uniform light effect on the light emitted by the light-emitting structure 18, and can evenly distribute an uneven light intensity of the light-emitting structure 18, which is beneficial to optimizing display effect of the display apparatus.

In some embodiments, a surface of the light-guiding elastic support 68 is covered with a reflective film layer or is coated with a reflective material. In addition, the light-guiding elastic support 68 also has a light control effect. In a local dimming display mode, the light-guiding elastic support 68 can reduce the impact on other light control areas. For example, the surface of the light-guiding elastic support 68 is covered with a reflective film layer or is coated with a reflective material, so that the light emitted from different light control areas is reflected on the surface of the light-guiding elastic support 68 in other control areas, reducing mutual influence of light among different light control areas, thereby avoiding light interference among different local dimming display areas. In some embodiments, the backlight module in the structure as shown in FIG. 29A and FIG. 29B can be a light panel or a light bar, which is not limited in some embodiments of the disclosure.

Figure 30:
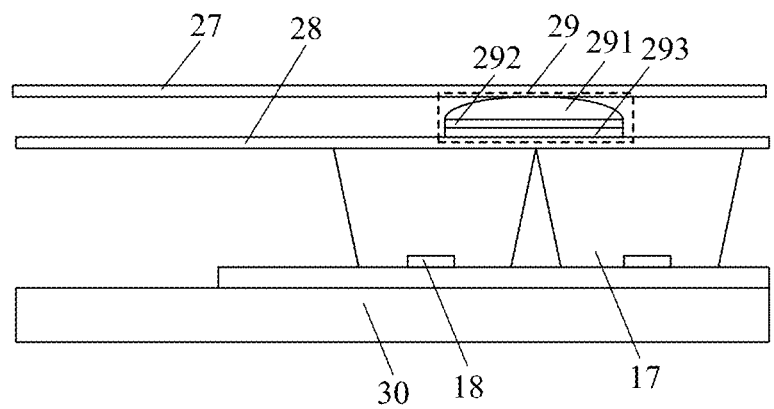
FIG. 30 is a schematic cross-sectional structural diagram of another display apparatus according to embodiments of the disclosure.

In some embodiments, FIG. 30 is a schematic cross-sectional structural diagram of another display apparatus according to embodiments of the disclosure. Referring to FIG. 6 and FIG. 30, the liquid crystal display panel 1 includes a liquid crystal film layer 10 and an optical diffusion film layer 11. The liquid crystal film layer 10 is located on a side of the optical diffusion film layer 11 away from the backlight module 30. The optical diffusion film layer 11 includes an optical film 27 and a diffusion plate 28. The diffusion plate 28 is located on a side of the optical film 27 away from the liquid crystal film layer 10. Between the optical film 27 and the diffusion plate 28 has a multifunctional optical glue structure 29. The multifunctional optical glue structure 29 is provided corresponding to the light-emitting structure 18. The multifunctional optical glue structure 29 includes a protrusion structure and/or a large-angle reflective film. In some embodiments, if the diffusion plate 28 is in direct contact with the optical film 27, it will cause wear problems between the optical film 27 and the diffusion plate 28, affecting normal functions of the optical film 27 and the diffusion plate 28, and thus affecting the display effect of the display apparatus. In the disclosure, one or more multifunctional optical glue structures 29 are provided between an optical film 27 and a diffusion plate 28. For example, a plurality of multifunctional optical glue structures are evenly arranged in multiple local areas between the optical film 27 and the diffusion plate 28, which can effectively avoid wear problems between the optical film 27 and the diffusion plate 28.

In some embodiments, as shown in FIG. 30, the multifunctional optical glue structure 29 can include a protrusion structure 291 protruding in a direction away from the backlight plate 30, such as a convex lens structure, that is, the protrusion structure 291 protrudes in a direction away from the diffusion plate 28. In some embodiments, after the optical film 27 and the diffusion plate 28 are bonded, the light emitted from the liquid crystal display panel 1 is dispersed, resulting in a larger viewing angle of the display apparatus, thereby reducing luminous brightness of the light-emitting structure 18 and affecting the display effect. In the disclosure, the protrusion structure 291 is configured to converge the light emitted from the light-emitting structure 18. The protrusion structure 291 has an effect of viewing angle, which effectively solves the problem that the luminous brightness of the light-emitting structure 18 is reduced due to the larger viewing angle after the optical film 27 and the diffusion plate 28 are bonded, optimizing the display effect of the display apparatus, and by providing multifunctional optical adhesive layers 29 in multiple local areas between the optical film 27 and the diffusion plate 28, the wear problems between the optical film 27 and the diffusion plate 28 can be effectively prevented.

In addition, as shown in FIG. 30, the multifunctional optical glue structure 29 can also include a large-angle reflective film 292, i.e., a large-angle filter film. The large-angle reflective film 292 is located on a side of the protrusion structure 291 adjacent to the diffusion plate 28. The large-angle reflective film 292 is configured to filter out first light rays from the light-emitting structure 18 to the large-angle reflective film 292. An incident angle of the first light ray with respect to the large-angle reflective film 292 is greater than a preset angle. In some embodiments, when light rays with an incident angle greater than a preset angle relative to the large-angle reflective film 292 irradiates the large-angle reflective film 292, the light rays will be reflected back to the light-emitting structure 18 at the large-angle reflective film 292, that is, these light rays will not emit on the display side, that is, the light rays with a large angle incident on the multifunctional optical glue structure 29 will be reflected, thereby forming an optical barrier between the optical film 27 and the diffusion plate 28 and reducing impacts between local dimming dynamic regions. In some embodiments, the large-angle reflective film 292 can be attached to the diffusion plate 28 through a glue layer 293. In some embodiments, one local dimming dynamic area corresponds to one multifunctional optical glue structure 29, one multifunctional optical glue structure 29 corresponds to one light-emitting structure 18 or multiple light-emitting structures 18, etc. It should be noted that, in some embodiments of the disclosure, the specific angle value of the preset angle is not limited, and the specific angle value of the preset angle can be set according to specific distribution of the local dimming dynamic areas.

Figure 31:
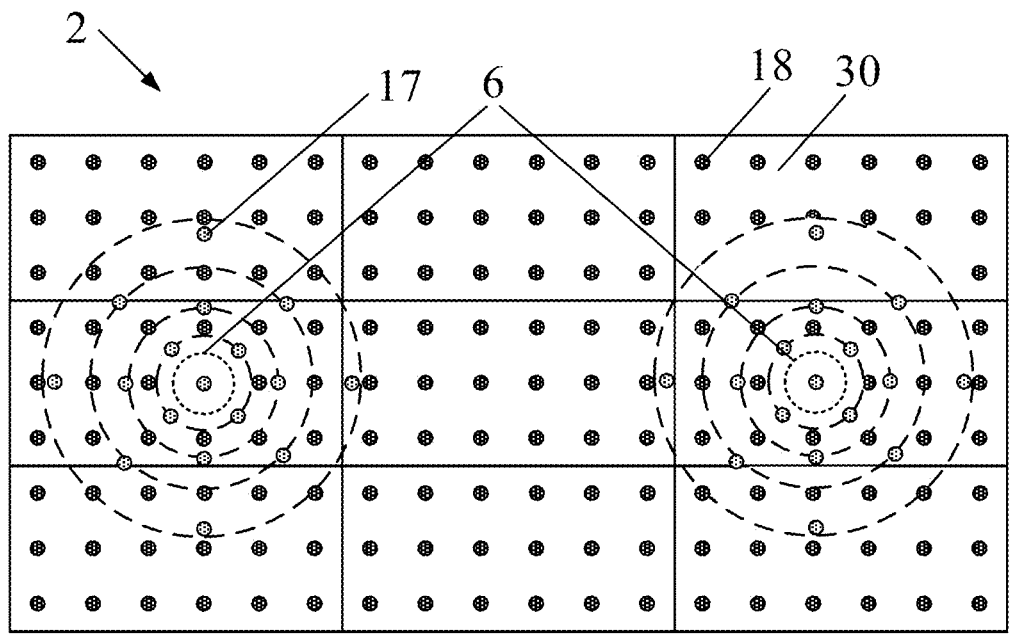
FIG. 31 is a schematic top-view structural diagram of another display apparatus according to embodiments of the disclosure.

In some embodiments, FIG. 31 is a schematic top-view structural diagram of another display apparatus according to embodiments of the disclosure. As shown in FIG. 31, the elastic supports 17 are distributed in multiple circles with the sound driver 6 as the center. In the direction away from the sound driver 6, the distribution density of the elastic supports 17 decreases, thereby ensuring that vibration buffering and vibration transmission effects of a region where the entire display apparatus is located are relatively uniform, and the number of elastic supports 17 is optimized, which is beneficial to reducing implementation cost and process assembly difficulty of the display apparatus.

Specifically, a large number of elastic supports 17 are installed, which affects the process assembly. In view of this, in some embodiments of the disclosure, a solution to optimize the number of elastic supports 17 under the premise of ensuring the vibration buffering and vibration transmission effects is proposed. The elastic supports 17 are arranged non-uniformly according to a distance from the elastic supports 17 to the sound driver 6. Here, the position of the sound driver 6 vibrates the most violently and an arrangement density of the elastic supports 17 is the largest, while the position far away from the sound driver 6 has a small vibration amplitude and an arrangement density of the elastic supports 17 is reduced, to ensure that the vibration buffering and vibration transmission effects of the entire display apparatus area are relatively uniform, and the number of elastic supports 17 is optimized, which is beneficial to reducing implementation cost and process assembly difficulty of the display apparatus.

Figure 32:
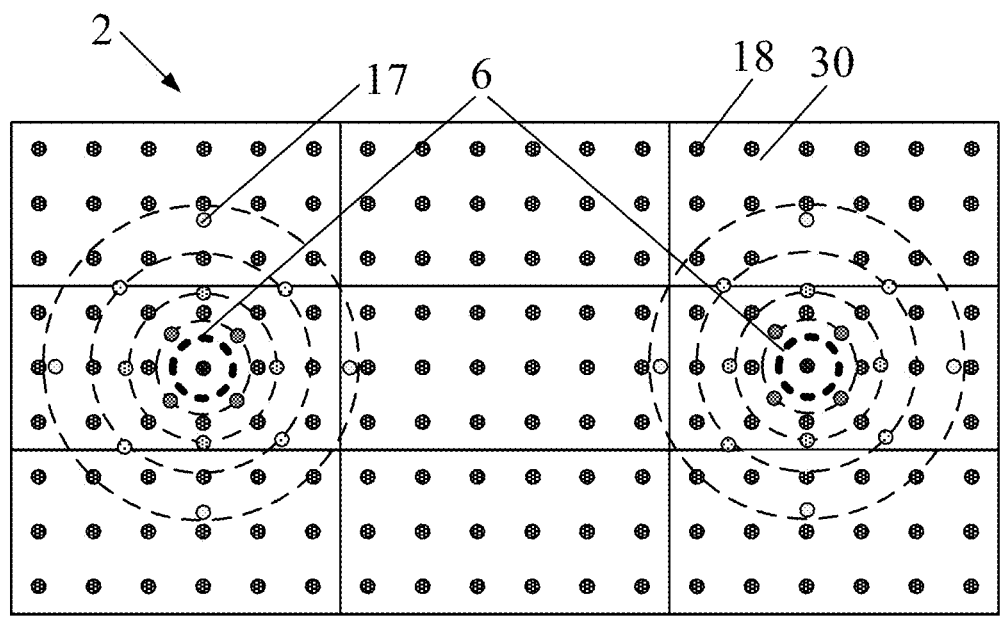
FIG. 32 is a schematic top-view structural diagram of another display apparatus according to embodiments of the disclosure.

In some embodiments, FIG. 32 is a schematic top-view structural diagram of another display apparatus according to embodiments of the disclosure. As shown in FIG. 32, in the direction away from the sound driver 6, a support strength of the elastic support 17 decreases; and/or in the direction away from the sound driver 6, a height of the elastic support 17 decreases. In FIG. 32, different degrees of grayscale represent a difference between support strengths of the elastic support 17 or a difference between heights of the elastic support 17. The greater the grayscale is (i.e., the darker a corresponding filling color is), the greater the support strength or height of the elastic support 17 is; the smaller the grayscale is (i.e., the lighter a corresponding filling color is), the smaller the support strength or height of the elastic support 17 is. For example, the above settings can be performed only for the support strength of the elastic support 17, or the above settings can be performed only for the height of the elastic support 17, or the above settings can be performed for both the support strength and the height of the elastic support 17. This realizes the corresponding arrangement of the elastic supports 17 according to vibration amplitudes, further optimizing the uniformity of vibration buffering and vibration transmission effects in the area where the entire display apparatus is located.

In some embodiments, elastic supports 17 with different hardnesses or sizes are provided according to a distance between the elastic supports 17 and an installation area of the sound driver 6, so as to achieve the effect that the support strength of the elastic support 17 is inversely proportional to a distance between the elastic support 17 and the sound driver 6, that is, the closer to the sound driver 6 the elastic support is, the greater the support strength of the elastic support 17 is, and the farther away from the sound driver 6 the elastic support is, the smaller the support strength of the elastic support 17 is, thereby achieving the corresponding arrangement of the elastic supports 17 according to vibration amplitudes, further optimizing the uniformity of vibration buffering and vibration transmission effects in the area where the entire display apparatus is located. On the other hand, a degree of interference fit of the elastic support 17 can also be adjusted according to a position of the elastic support 7 relative to the sound driver 6, that is, a height of the elastic support 17 close to the sound driver 6 is larger than a height of the elastic support 17 far away from the sound driver 6, so that the vibration transmission efficiency is the highest at the position of the elastic support 17 close to the sound driver 6, and to avoid assembly tolerance of the elastic support 17 at the position far away from the sound driver 6, resulting in a non-interference fit of the elastic support 17 at the position close to the sound driver 6, that is, ensuring that the upper and lower surfaces of the elastic supports 17 at various positions in an area where the corresponding display apparatus is located are not separated from the liquid crystal display panel 1 and the backlight module 2 when vibrating, thereby optimizing the vibration transmission efficiency of the elastic supports 17 at each position.

Figure 33:
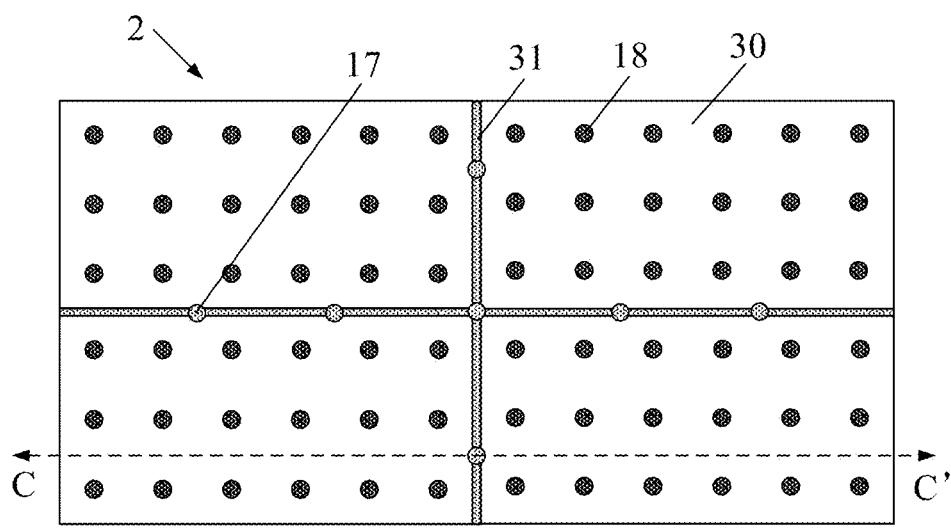
FIG. 33 is a schematic top-view structural diagram of another display apparatus according to embodiments of the disclosure.
Figure 34:
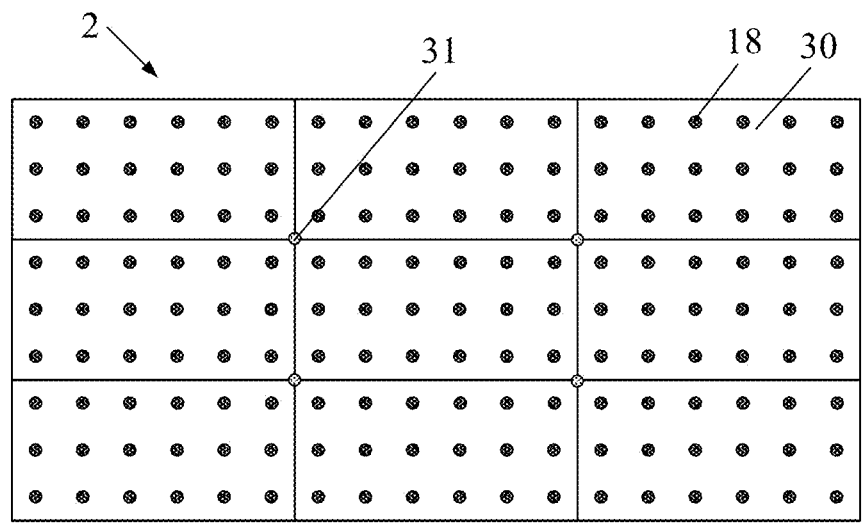
FIG. 34 is a schematic top-view structural diagram of another display apparatus according to embodiments of the disclosure.
Figure 35:
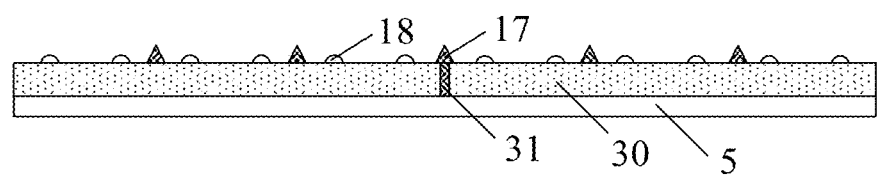
FIG. 35 is a schematic cross-sectional structural diagram along a CC' direction in FIG. 33 according to embodiments of the disclosure.

In some embodiments, FIG. 33 is a schematic top-view structural diagram of another display apparatus according to embodiments of the disclosure. FIG. 34 is a schematic top-view structural diagram of another display apparatus according to embodiments of the disclosure. FIG. 35 is a schematic cross-sectional structural diagram along a CC' direction in FIG. 33 according to embodiments of the disclosure. With reference to FIGS. 33 to 35, the backlight module 2 includes a plurality of backlight plates 30, and a first buffer structure 31 is provided between adjacent backlight plates 30. The first buffer structure 31 is located on the sound board 5 and is configured to separate adjacent backlight plates 30, to increase vibration buffering between edges of the backlight plates 30 to avoid abnormal vibration.

Specifically, when the plurality of backlight plates 30 are assembled, edges of adjacent backlight plates 30 can overlap, which can easily lead to abnormal vibration noise during vibration. As shown in FIG. 33, in some embodiments of the disclosure, a first buffer structure 31 is provided between adjacent backlight plates 30. The first buffer structure 31 is located on the sound board 5 and is configured to separate adjacent backlight plates 30. The first buffer structure 31 is, for example, an elastic colloid structure. The first buffer structure 31 can be installed, for example, in a gap between various backlight plates 30, so as to increase vibration buffer between the edges of the backlight plates 30 and avoid abnormal vibration. In addition, as shown in FIG. 34, a connection position of four adjacent backlight plates 30 is also prone to vibration noise due to overlapping areas of the backlight plates 30. For example, the first buffer structure 31 can be provided at the connection position of the four adjacent backlight plates 30, to increase the vibration buffering of the connection position of the backlight plates 30 and avoid abnormal vibration.

In some embodiments, with reference to FIG. 33 and FIG. 35, the first buffer structure 31 can be in a strip shape. The first buffer structure 31 is configured to connect the plurality of elastic supports 17 into one body, that is, the first buffer structure 31 and the plurality of elastic supports 17 are formed integrally, which effectively reduces installation difficulty of the elastic support 17. Specifically, a large number of elastic supports 17 are installed, leading to a problem of complicated process. In order to optimize this problem, in some embodiments of the disclosure, the elastic support 17 is connected into one body through the first buffer structure 31. For example, the first buffer structure 31 and the corresponding elastic support 17 are formed integrally, which effectively reduces the installation difficulty of the elastic support 17. In some embodiments, when the first structure is the backlight module 2, the setting of the first buffer structure 31 and the elastic support 17 is as shown in FIG. 35. When the first structure is the sound board 5, the first buffer structure 31 and the elastic support 17 are both disposed on the sound board 5, and the first buffer structure 31 and the elastic support 17 are formed integrally.

Figure 36A:
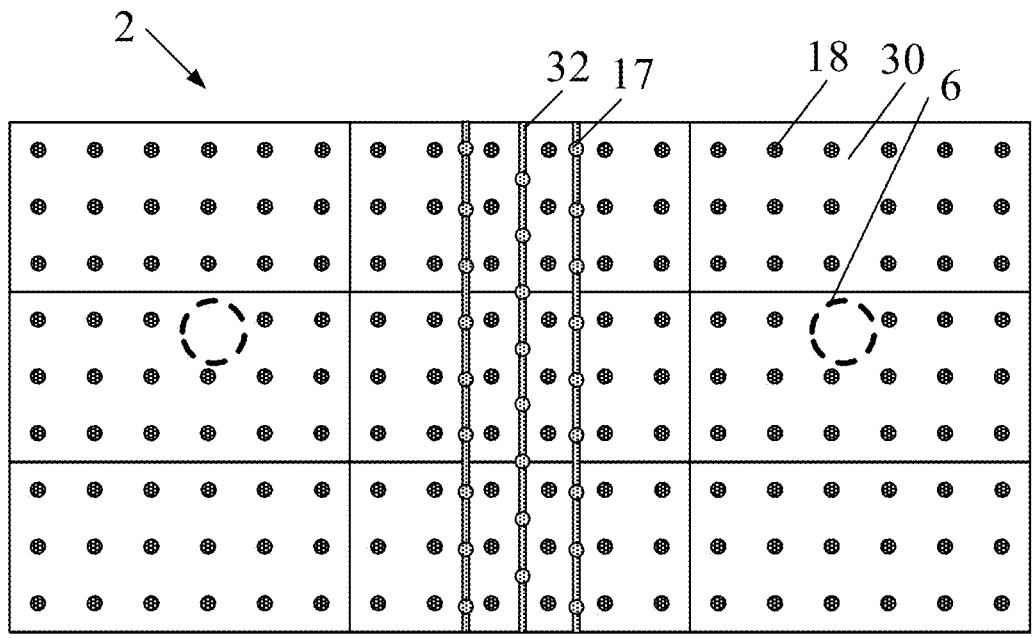
FIG. 36A is a schematic top-view structural diagram of another display apparatus according to embodiments of the disclosure.
Figure 37A:
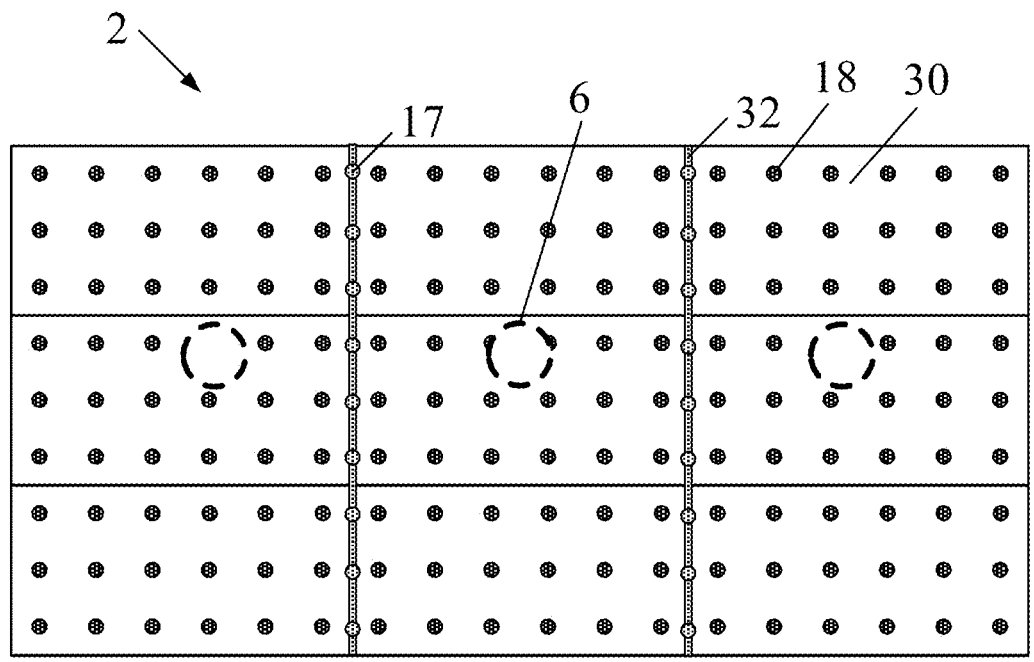
FIG. 37A is a schematic top-view structural diagram of another display apparatus according to embodiments of the disclosure.

In some embodiments, FIG. 36A is a schematic top-view structural diagram of another display apparatus according to embodiments of the disclosure. FIG. 37A is a schematic top-view structural diagram of another display apparatus according to embodiments of the disclosure. Referring to FIG. 36A and FIG. 37A, with reference to the above embodiments, on the basis of FIGS. 18 to 27, the display apparatus further includes a sound channel isolation structure 32. The sound channel isolation structure 32 is disposed on the backlight module 2 and configured to separate adjacent sound drivers 6. Specifically, the sound channel isolation structure 32 is, for example, an elastic colloid structure. The sound channel isolation structure 32 is disposed in the areas where different sound drivers 6 are located, that is, between sound channel vibration areas, thereby improving voice isolation between various vocal channels, reducing vibration influence between various sound channel vibration areas and optimizing sound effect of the display apparatus. In FIG. 36A, the sound channel isolation structure 32 is configured to separate the two left and right sound drivers 6. In FIG. 37A, three sound channel isolation structures 32 are provided to separate the areas where the three sound drivers 6 are located. Some embodiments of the disclosure can be extended to enhance isolation of more sound channel vibration areas. In some embodiments, the sound channel isolation structure 32 can also be implemented using the first buffer structure 31 described in the above embodiments.

In some embodiments, as shown in FIG. 36A, a plurality of sound channel isolation structures 32 are provided between adjacent sound drivers 6, and the sound channel isolation structure 32 is configured to connect multiple elastic supports 17 into one body, that is, the sound channel isolation structure 32 and the multiple elastic supports 17 are integrally formed. The elastic supports 17 on different sound channel isolation structures 32 are staggered, which effectively reduces the installation difficulty of the elastic supports 17 and makes the vibration in the sound channel isolation structures 32 attenuate effectively, thereby optimizing the voice isolation between various channels, reducing the vibration impact between various sound channel vibration areas, and optimizing the sound effect of the display apparatus. Specifically, a large number of elastic supports 17 are installed, resulting in a problem of complicated process. In order to optimize this problem, in some embodiments of the disclosure, the elastic supports 17 are connected into one body through the sound channel isolation structure 32. For example, the sound channel isolation structure 32 and the corresponding elastic support 17 are integrally formed, which effectively reduces the installation difficulty of the elastic support 17. In addition, in FIG. 36A, three sound channel isolation structures 32 are provided between adjacent sound drivers 6, and the elastic supports 17 on the three sound channel isolation structures 32 are staggered, so that the vibration in the sound channel isolation structures 32 attenuates effectively, thereby optimizing the voice isolation between various channels, reducing the vibration impact between various sound channel vibration areas, and optimizing the sound effect of the display apparatus. In some embodiments, when the first structure is the backlight module 2, the sound channel isolation structure 32 and the elastic support 17 are both disposed on the backlight module 2, and the sound channel isolation structure 32 and the elastic support 17 are integrally formed. When the first structure is the sound board 5, the first buffer structure 31 on the backlight module 2 is integrally formed with the elastic support 17 by connecting the top of the elastic support 17.

Figure 36B:
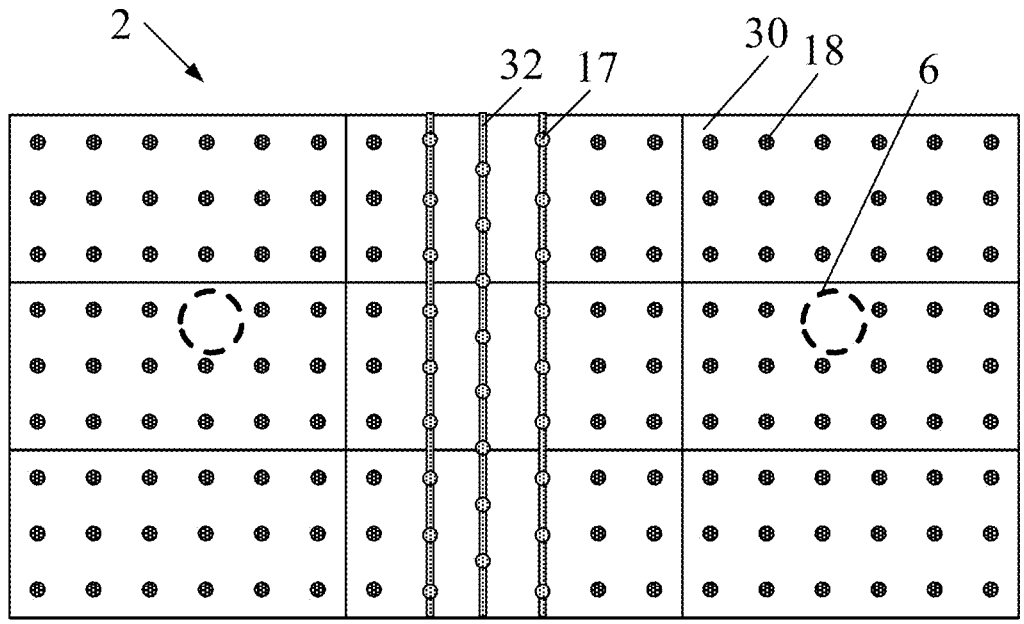
FIG. 36B is a schematic top-view structural diagram of another display apparatus according to embodiments of the disclosure.
Figure 37B:
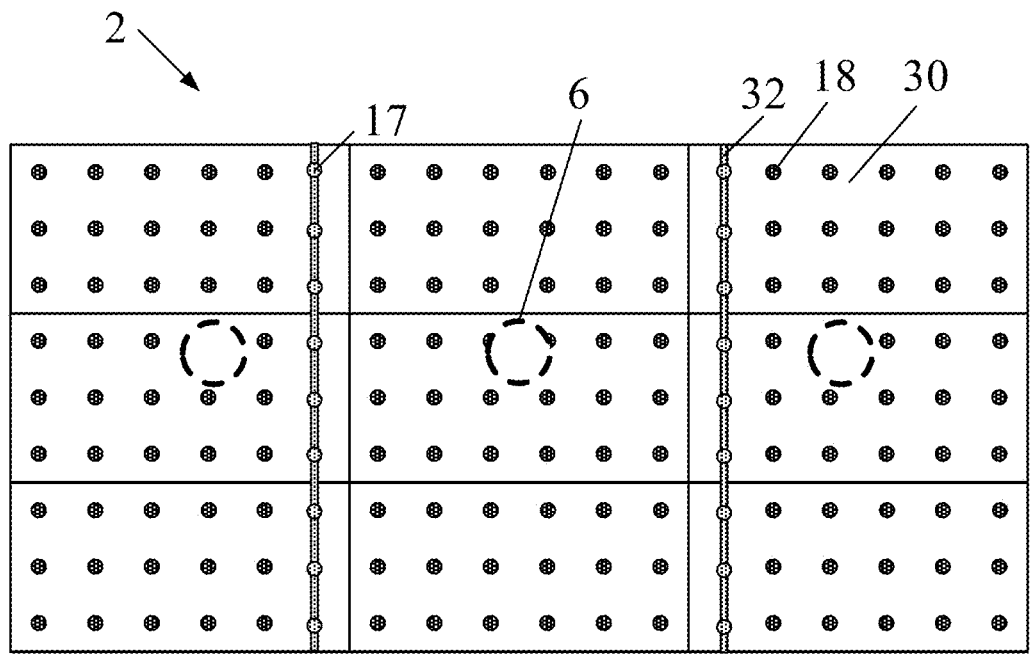
FIG. 37B is a schematic top-view structural diagram of another display apparatus according to embodiments of the disclosure.

In some embodiments, FIG. 36B is a schematic top-view structural diagram of another display apparatus according to embodiments of the disclosure. FIG. 37B is a schematic top-view structural diagram of another display apparatus according to embodiments of the disclosure. Referring to FIG. 36B and FIG. 37B, with reference to the above embodiments, on the basis of FIGS. 28 to 30, the display apparatus further includes a sound channel isolation structure 32. The sound channel isolation structure 32 is disposed on the backlight module 2 and configured to separate adjacent sound drivers 6. The specific working principles of the sound channel isolation structure 32 can refer to the description of FIG. 36A and FIG. 37A in the above embodiments, and will not be repeated herein.

Figure 38:
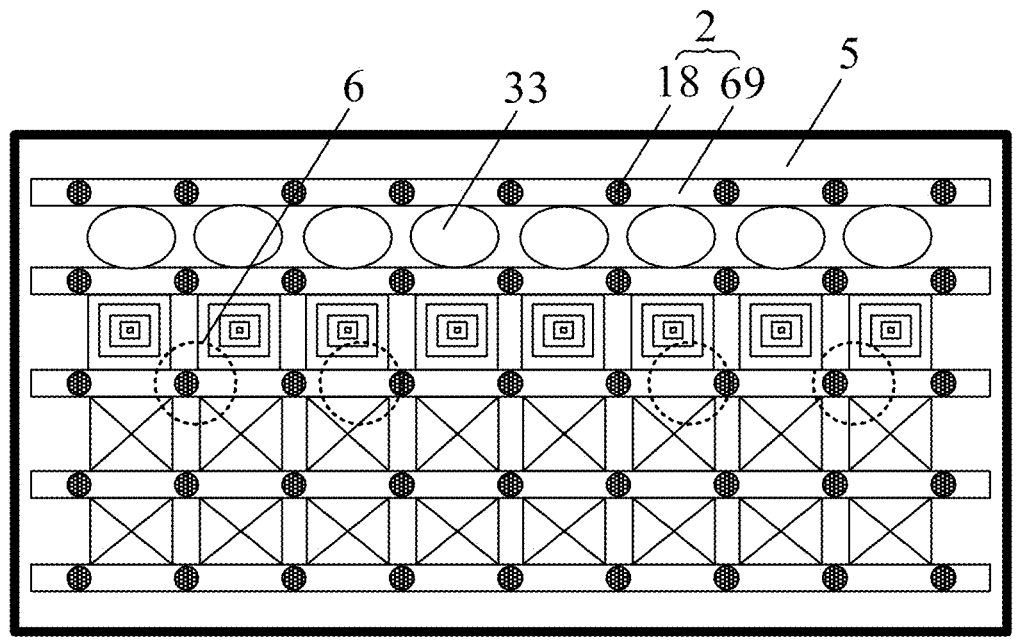
FIG. 38 is a schematic top-view structural diagram of another display apparatus according to embodiments of the disclosure.
Figure 39:
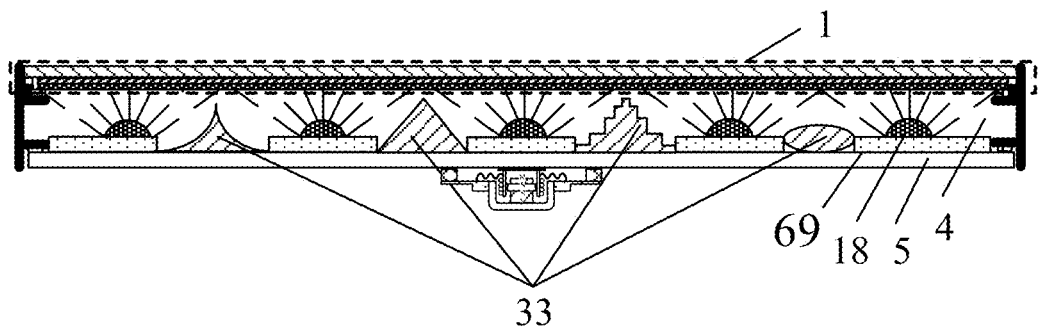
FIG. 39 is a schematic cross-sectional structural diagram of another display apparatus according to embodiments of the disclosure.

In some embodiments, FIG. 38 is a schematic top-view structural diagram of another display apparatus according to embodiments of the disclosure. FIG. 39 is a schematic cross-sectional structural view of another display apparatus according to embodiments of the disclosure. As shown in FIG. 38 and FIG. 39, the backlight module 2 is a direct-type backlight module or a side-type backlight module. A plurality of filling structures 33 are provided in the second sealed air cavity 4. A side of the sound board 5 adjacent to the liquid crystal display panel 1 is provided with a plurality of light-emitting structures 18, and the filling structures 33 are disposed on the sound board 5 and located between the light-emitting structures 18.

Specifically, the backlight module 2 can include, for example, a plurality of light bars 69. The light bars 69 are fixed on the sound board 5. The sound board 5 and the liquid crystal display panel 1 form the second sealed air cavity 4. When the sound driver 6 drives the sound board 5 to vibrate, an air gap of the second sealing air cavity drives the liquid crystal display panel 1 to produce sound. The larger the second sealed air cavity 4 is, the lower an air pressure change sensitivity of the backlight module 2 caused by vibration deformation is. The direct-type backlight module or the side-type backlight module both use about 100 light-emitting structures 18, such as lamp beads, which require a large light mixing distance, such as 10 mm, while a backlight distance of a MiniLED is only about 3 mm.

Suitable for models with a large light mixing distance, in order to reduce the air volume in the second sealed air cavity, in some embodiments of the disclosure, a filling structure 33 is used to reduce the size of the second sealed air cavity 4. FIG. 38 shows several filling schemes. A filling structure 33 with a certain shape is attached in a space between the backlight module 2 and the liquid crystal display panel 1 and in an area that avoids a direct light path of a lamp. A surface of the filling structure 33 can be cone, trapezoid, triangle or circle. In order to reduce the weight of the sound board 5 as much as possible, the filling structure 33, for example, can be made of a lightweight high-density foam material, such as melamine material. At the same time, in order to reduce the impact of the filling structure 33 on the light path, a diffuse reflection film layer can be attached to the surface of the filling structure 33. For example, a diffuse reflection material layer is attached to the surface of the filling structure 33 through spraying, adhering or other processes, thereby reducing absorption of light by the filling structure 33.

Figure 40:
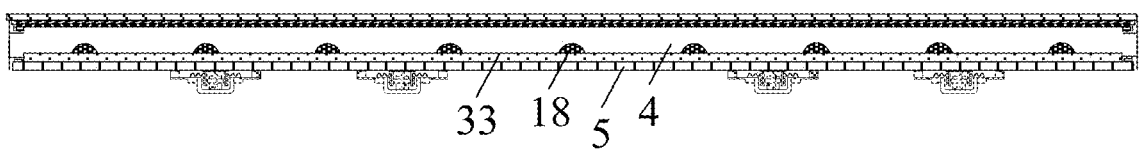
FIG. 40 is a schematic cross-sectional structural diagram of another display apparatus according to embodiments of the disclosure.

FIG. 40 is a schematic cross-sectional structural diagram of another display apparatus according to embodiments of the disclosure. Referring to FIGS. 38 to 40, the light bar 69 in the backlight module 2 can be a bar horizontally attached when arranged horizontally, or the light bar 69 in the backlight module 2 can be a bar vertically attached when arranged vertically. At this time, an area of the filling structure 33 can also be made to be the same as an area of the sound board 5, i.e., all the filling structures 33 are integrally formed to simplify the manufacturing process. Only through holes for placing the light bars 69 are formed in the integrally formed filling structure 33. The filling structure 33 still has a raised portion as shown in FIG. 38 to reduce the volume of the second sealed air cavity 4 and optimize the sound transmission effect of the display apparatus.

In some embodiments, the filling structure 33 can be provided as the elastic support 17 and interferingly arranged between the sound board 5 and the liquid crystal display panel 1. Specifically, the filling structure 33 not only can reduce the air volume in the second sealed air cavity 4, but also can be used as the elastic support 17 described in the above embodiments. The filling structure 33 can also be fixed on the sound board 5 in a glue or welding manner. The supporting function and the vibration efficiency enhancing function of the filling structure 33 can be referred to the above embodiments, and will not be repeated herein.

Figure 41:
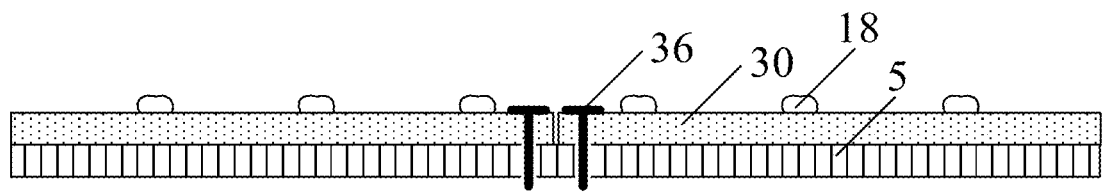
FIG. 41 is a schematic cross-sectional structural diagram of another display apparatus according to embodiments of the disclosure.
Figure 42:
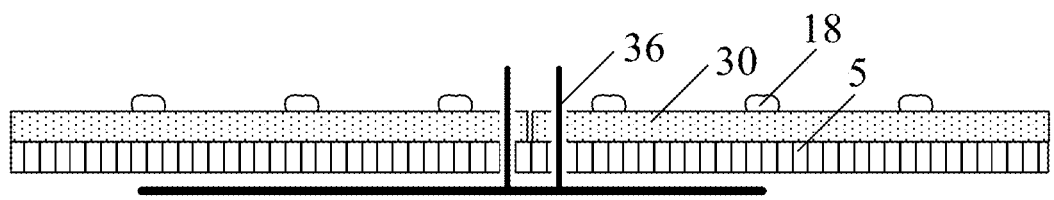
FIG. 42 is a schematic cross-sectional structural diagram of another display apparatus according to embodiments of the disclosure.
Figure 43:
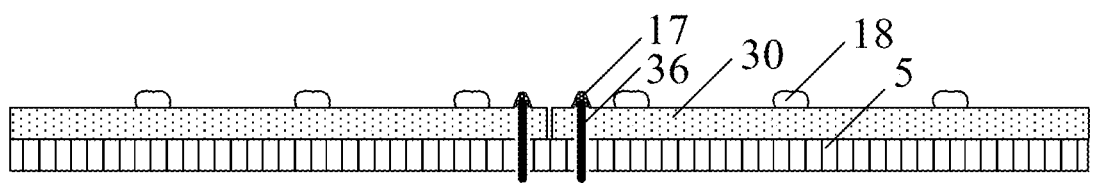
FIG. 43 is a schematic cross-sectional structural diagram of another display apparatus according to embodiments of the disclosure.

In some embodiments, FIG. 41 is a schematic cross-sectional structural diagram of another display apparatus according to embodiments of the disclosure. FIG. 42 is a schematic cross-sectional structural diagram of another display apparatus according to embodiments of the disclosure. FIG. 43 is a schematic cross-sectional structural diagram of another display apparatus according to embodiments of the disclosure. With reference to FIGS. 41 to 43, the backlight module includes a plurality of backlight plates 30. The backlight plates 30 are fixed to the sound board 5 through a first adhesion buffer structure (not shown in FIGS. 41 to 43). The backlight plate 30 and the sound board 5 are provided with installation positioning holes. A pre-positioned columnar structure 36 is inserted into an installation positioning hole of the backlight plate 30 and an installation positioning hole of the sound board 5 to position the backlight plate 30 and the sound board 5.

Specifically, due to processing yield and cost requirements, in Mini LED backlight module display apparatuses, the backlight module is spliced and composed of multiple backlight plates 30. As shown in FIG. 11 and FIG. 12, the backlight plates 30 are evenly arranged and attached on the sound board 5. It is worth noting that the bonding accuracy of the backlight plates 30 is strictly limited. If the backlight plates 30 are bonded too tightly, there will be hard contact between two backlight plates 30 and noise will be generated when vibrating. If the size of the edge of the backlight plate 30 is reduced and the spacing between the backlight plates 30 is enlarged, although the above problem can be solved, the backlight plate 30 and the gap together with the sound board 5 constitute a vibration system, and the gap between the backlight plates 30 will cause segmented vibration of the vibration surface. This segmented vibration will cause sound resonance at a frequency with a wavelength similar to the length and width of the backlight plate 30, resulting in peaks or valleys in the frequency response. For example, when a length of the backlight plate 30 is 0.3 meters, it will resonate with the frequency of 1133 Hz. This resonance will cause abnormal peaks at this frequency, and 566 Hz will produce both peaks and valleys at this length, resulting in the cancellation of sound waves and producing a valley value.

In order to avoid the above problems, the fixing accuracy of the backlight plate 30 and the sound board 5 needs to be strictly controlled. In the non-screen sound Mini LED display apparatus, the backlight plate 30 is locked on a metal plate with screws, and the positioning accuracy is higher. No glue is set between the backlight plate 30 and the metal backplane, so the requirements for installation and positioning operations are not high, but this method cannot be applied to the screen to produce sound, because the sound board 5 is made of honeycomb aluminum plate and other materials, which is soft and hollow, and cannot form a screw mouth. The backlight plate 30 and the sound board 5 are fully fitted and need to be accurately positioned and successfully operated in one time. Moreover, the backlight plate 30 and the sound board 5 are always in a vibration state. If a screw structure is used, the screws can easily fall off after long-term use, causing noise and other problems.

In addition, an automated high-precision manipulator can also be used to strictly control the installation accuracy of the backlight plate 30 and attach the backlight plate 30 to the sound board 5. However, the technical modification requirements for the product line are relatively higher, and manual attachment cannot be achieved. Referring to FIGS. 41 to 43, in some embodiments of the disclosure, several ways are proposed to achieve high-precision positioning of the backlight plate 30. The first adhesion buffer structure is, for example, double-sided tape. As shown in FIG. 41, the pre-positioned columnar structure 36 can be a positioning pin with a surface mounted technology (SMT) T-shape. Of course, glue bonding or manual welding, etc., can also be used for fixing. The positioning pin passes through the installation positioning hole of the backlight plate 30, and the sound board 5 has an installation positioning hole in the corresponding part. When assembling the backlight plate 30, the nail tip of the positioning pin first passes through the installation positioning hole of the sound board 5 to achieve pre-positioning, and then is pressed and fitted to the backlight plate 30 and the sound board 5 to improve the operation efficiency and accuracy. Alternatively, as shown in FIG. 42, the pre-positioned columnar structure 36 can use a pre-positioning tooling with an ejector pin, the sound board 5 is first placed on the pre-positioning tooling, the ejector pin of the pre-positioning tooling passes through the installation positioning hole of the sound board 5, and then the backlight plate 30 passes through the ejector pin of the pre-positioning tooling, and then the backlight plate 30 and the sound board 5 are pressed and fitted together.

In some embodiments, as shown in FIG. 43, the pre-positioned columnar structure 36 and the elastic support 17 are fixedly arranged. The elastic support 17 is fixed to the backlight plate 30 through the pre-positioned columnar structure 36. The elastic support 17 is provided between the backlight plate 30 and the liquid crystal display panel 1 in an interference manner. Specifically, the pre-positioned columnar structure 36 and the elastic support 17 are combined together, for example, through two-color injection molding or other processes. During assembly, the pre-positioned columnar structure 36 passes through the installation positioning hole of the backlight plate 30 to a bottom surface of the elastic support 17 and a surface of the backlight plate 30 bond firmly, and then the pre-positioned columnar structure 36 passes through the installation positioning hole of the sound board 5 to press and fit the backlight plate 30 and the sound board 5. The advantages of this method are obvious. Firstly, the customized device does not use SMT, which reduces the difficulty of processing. Secondly, after the assembly is completed, the backlight plate 30 and the sound board 5 play a fixed role in the elastic support 17 to avoid long-term aging of the elastic support 17, or to avoid the problem that the elastic support 17 that is only glued will fall off in the case of high heat.

Figure 44:
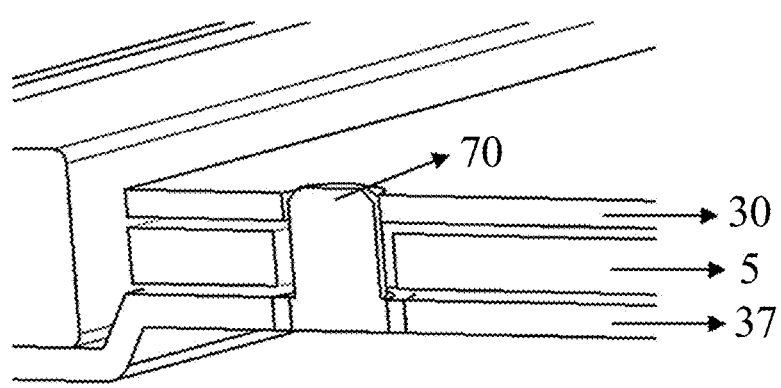
FIG. 44 is a schematic cross-sectional structural diagram of another display apparatus according to embodiments of the disclosure.

FIG. 44 is a schematic cross-sectional structural diagram of another display apparatus according to embodiments of the disclosure. Alternatively, as shown in FIG. 44, positioning rivets 70 on the middle frame backplane 37 can be configured to fix the backlight plate 30 and the sound board 5.

Figure 45:
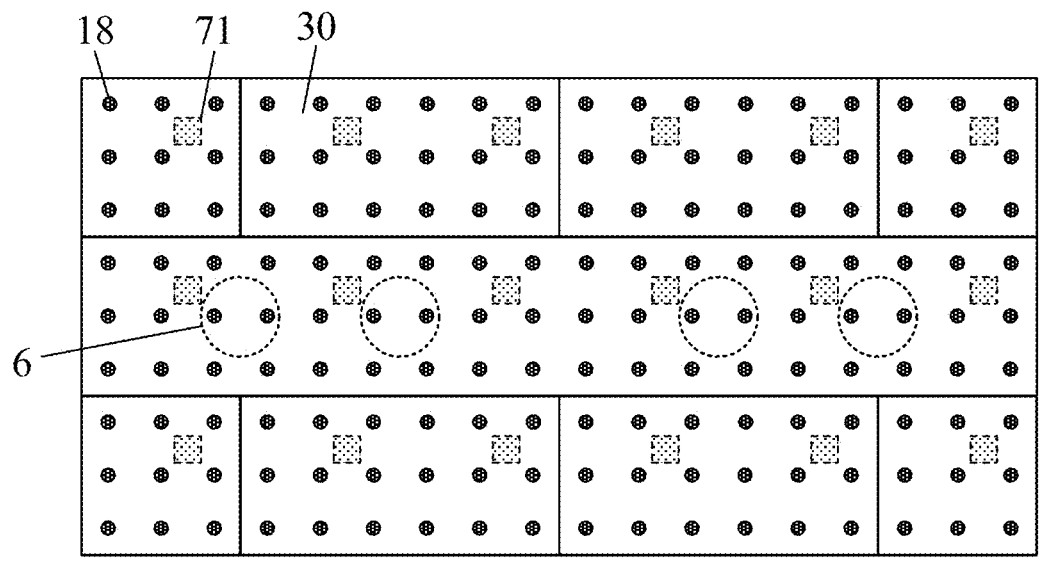
FIG. 45 is a schematic top-view structural diagram of another display apparatus according to embodiments of the disclosure.

In some embodiments, FIG. 45 is a schematic top-view structural diagram of another display apparatus according to embodiments of the disclosure. As shown in FIG. 45, the backlight module includes a plurality of backlight plates 30. The plurality of backlight plates 30 are distributed in non-equal areas.

Specifically, the sound driver 6 is configured to excite the modal resonance of a sound body to produce sound. The richer the modes, the more frequency points that can resonate, the richer the sound, and the better the sound quality. The sound board 5 is divided to multiple areas through the backlight board 30, which can cause the concentration of modes. For example, a backlight plate 30 with 0.3 meter will resonate at 1133 Hz. In order to eliminate this resonance as much as possible and ensure the richness of modes, in some embodiments of the disclosure, multiple backlight plates 30 are distributed in non-equal areas, as shown in FIG. 45. In an area where the sound driver 6 is located, a backlight plate 30 of equal length to a sound board 5 is used, so that a continuous and complete vibration surface in a transverse axis direction is provided, which facilitates the excitation of low-frequency modes, while in other areas, small-area backlight plates 30 that are gradually divided are used to excite the modes of other frequencies. This arrangement of the backlight plates 30 in non-equal areas ensures that the backlight plate 30 will not be excited into only one mode.

In some embodiments, as shown in FIG. 45, a side of the backlight plate 30 adjacent to the liquid crystal display panel 1 includes a plurality of light-emitting structures 18. The number of the light-emitting structures 18 on the backlight plate 30 is an integer multiple of N. N is an integer greater than 1.

Specifically, the backlight module is a MiniLED backlight module. The brightness of the MiniLED backlight module changes according to the brightness of an image displayed in a liquid crystal area corresponding to the MiniLED backlight module. Therefore, during use, a backlight driving algorithm is required to be linked to the current displayed image, and the light-emitting structure 18 is driven through a backlight module drive chip 71. The backlight module drive chip 71 has multiple outputs, that is, one backlight module drive chip 71 drives multiple light-emitting structures 18. As shown in FIG. 45, the number of backlight module drive chips 71 on each backlight plate 30 is not consistent because the area of each backlight plate 30 is different and the number of light-emitting structures 18 is also different. For this purpose, the greatest common denominator of the area of the backlight plate 30 can be determined, for example, in the upper left corner, nine light-emitting structures 18 are included and a backlight module drive chip 71 drives the nine light-emitting structures 18, at this time, N is equal to 9, and the number of light-emitting structures 18 on other backlight plates 30 is equal to an integer multiple of the number of light-emitting structures 18 on the backlight plate 30 in the upper left corner. For example, the integer multiple corresponding to the second backlight plate 30 on the upper left is two times; the integer multiple corresponding to the backlight plates 30 in the middle row is six times; and the number of corresponding backlight module drive chips 71 is two or six per backlight plate 30. In this way, when a back surface of the backlight plate 30 is connected with various backlight plates 30 through FPC, i.e., a flexible circuit board, there is no need to consider the area and position to the backlight plate 30. When designing the backlight driving algorithm of the light-emitting structure 18, it can also be based on nine lights per chip, which greatly reduces the need for universal driving algorithms and backlight module drive chips 71 for different areas of the backlight plate 30.

Figure 46:
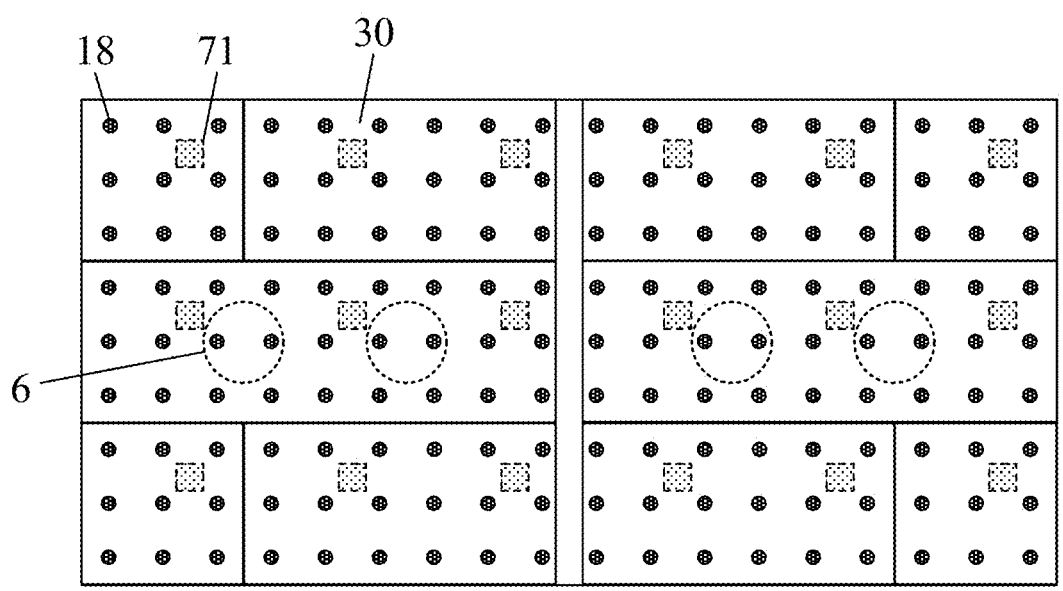
FIG. 46 is a schematic top-view structural diagram of another display apparatus according to embodiments of the disclosure.
Figure 47:
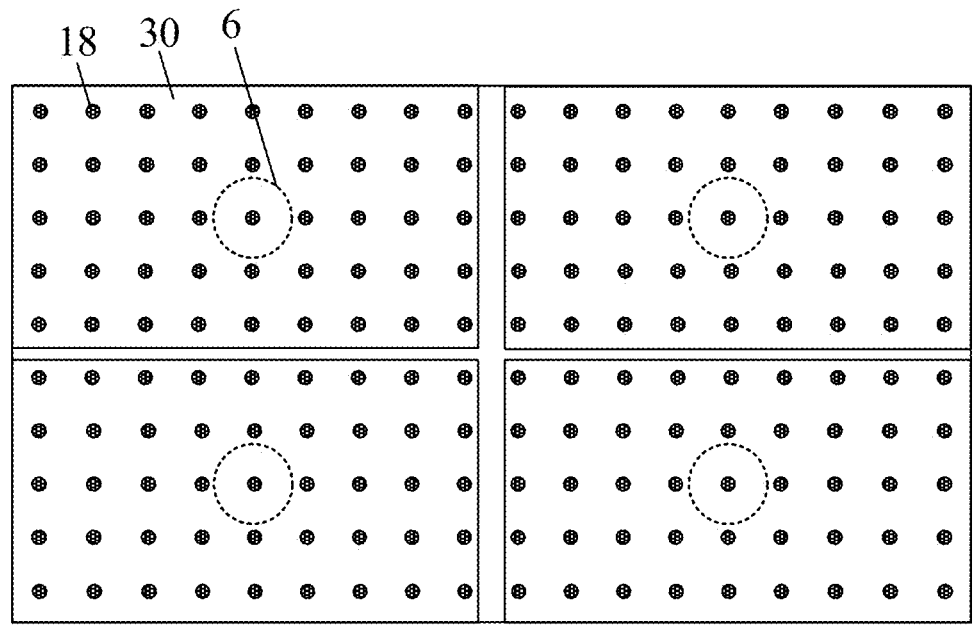
FIG. 47 is a schematic top-view structural diagram of another display apparatus according to embodiments of the disclosure.

In some embodiments, FIG. 46 is a schematic top-view structural diagram of another display apparatus according to embodiments of the disclosure. FIG. 47 is a schematic top-view structural diagram of another display apparatus according to embodiments of the disclosure. With reference to FIG. 46 and FIG. 47, the backlight module includes a plurality of backlight plates 30, with adjacent first backlight plates spaced at a set distance. The first backlight plate is the backlight plate 30 provided corresponding to the area where the sound driver 6 is located.

Specifically, as shown in FIG. 46, a distance between the backlight plates 30 in a middle area is expanded, the hardness of the area with the backlight plate 30 is higher, and the hardness of the area without the backlight plate 30 is lower, and during horizontal transmission of vibration ability, there will be a large attenuation of the horizontal transmission in a region of weaker hardness. Because in a joint part of the backlight plate 30 and the sound board 5, the density of the material through which vibration propagates is relatively uniform, but in a gap between the backlight plates 30, the density of a transmission medium changes greatly, the transmission of vibration is destroyed, the vibration mode generates a boundary condition, which can effectively prevent vibrations of left and right half areas from transmitting to each other, and can effectively control crosstalk of vibrations in left and right areas. Therefore, the vibration of the sound driver 6 at the left side mainly causes the vibration of an area at the left side; and the vibration of the sound driver 6 at the right side mainly causes the vibration of an area at the right side. As shown in FIG. 47, corresponding to four areas, a distance between the backlight plates 30 of adjacent areas is relatively far, so that the amount of vibration transmitted to the adjacent areas from an area where each sound driver 6 is located becomes smaller. Four sound drivers 6 correspond to the sound of different channels, which can enhance localization sense of the sound. For example, when a person in a picture is speaking in the upper left corner, only an area in the upper left corner is vibrating and producing sound, thus improving the picture quality of the sound. For example, it can be used in video teleconference. In some embodiments, a buffer structure such as a rubber strip can also be provided between adjacent first backlight plates to reduce noise.

Figure 48:
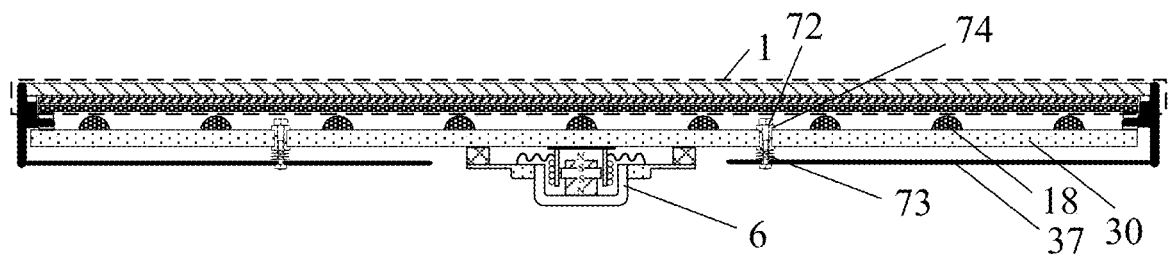
FIG. 48 is a schematic cross-sectional structural diagram of another display apparatus according to embodiments of the disclosure.

In some embodiments, FIG. 48 is a schematic cross-sectional structural diagram of another display apparatus according to embodiments of the disclosure. Specifically, when the backlight module is a complete PCB board, such as for a small-sized Mini LED display apparatus, the backlight module can be attached to the sound board, and a sound driver can be arranged on the back of the sound board, or the sound board can be directly attached to the back of the backlight module and drives the screen to vibrate and produce sound by driving the backlight module and an airtight layer between the backlight module and the liquid crystal display panel, as shown in FIG. 48. Because the PCB board is made of uniform material and has a single vibration mode, and the material is soft, flat and has poor support, the PCB board needs to be fixed through other fixed structures. In FIG. 48, a core fixing structure is a locking screw 72. The nut is fixed on the backlight plate 30, or a nut thread is processed directly on the backlight plate 30. The locking screw passes through the backlight plate 30 from a side of the light-emitting structure 18 and is then fixed on the middle frame backplane 37. The locking screw 72 and the backlight plate 30 are fixed by a soft rubber pad, and a spring structure 73 is provided between the soft rubber pad 74 and the middle frame backplane 37. In actual use, the spring structure 73 is compressed by the screw and is in a taut state, pressure is applied to the liquid crystal display panel 1 and the soft rubber pad 74 and the backlight plate 30 are squeezed at the same time, so that the backlight plate 30 is fixed on the top of the locking screw 72 under the action of stress. When the sound driver 6 drives the backlight plate 30 to vibrate, the soft rubber pad 74 slightly deforms to adapt to the vibration of the backlight plate 30. The locking screw 72 plays a positioning role, and the soft rubber pad 74 can buffer tiny vibrations caused by medium and high frequencies. In addition, in order to ensure the flatness of the backlight plate 30, multiple core fixing structures shown in FIG. 48 are required. The core fixing structures can be arranged in a rectangular manner, a circular manner, etc., for example.

Figure 49:
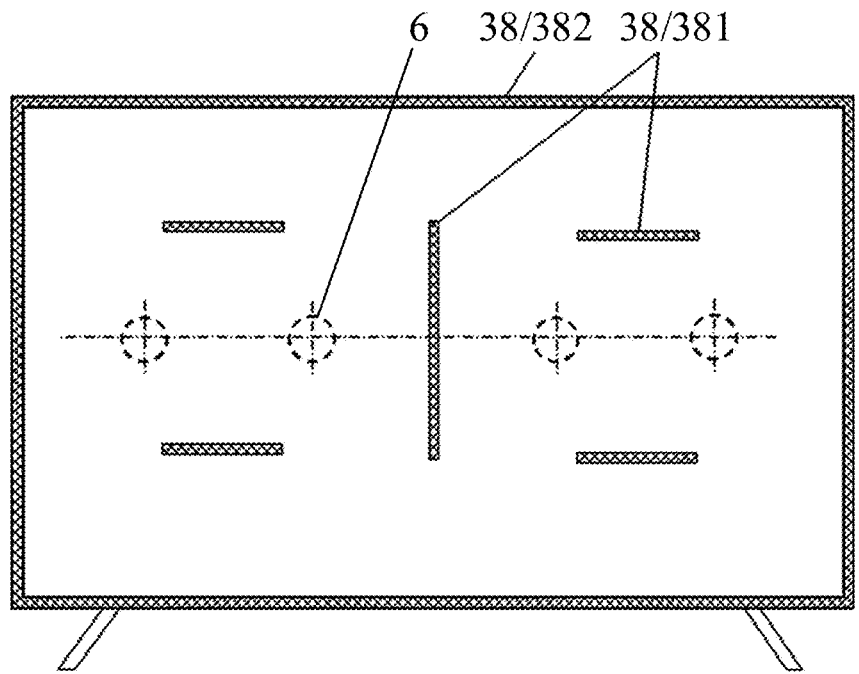
FIG. 49 is a schematic front-view structural diagram of another display apparatus according to embodiments of the disclosure.

In some embodiments, FIG. 49 is a schematic front-view structural diagram of another display apparatus according to embodiments of the disclosure. With reference to FIG. 6, FIG. 19 and FIG. 49, the display apparatus further includes a middle frame backplane 37. The middle frame backplane 37 is located on a side of the sound board 5 away from the backlight module 2. A second buffer structure 38 is provided between the middle frame backplane 37 and the sound board 5.

In some embodiments, second buffer structures 382 are provided on frames of the liquid crystal display panel 1 and between the middle frame backplane 37 and the sound board 5, such as double-sided tape. Second buffer structures 381 are provided near the sound driver 6, such as double-sided tape. The second buffer structure 381 can be set to be softer than the second buffer structure 382, to adapt to the larger amplitude of an area where the sound driver 6 is located. Relevant circuit boards, brackets, shells and other structures are installed on the middle frame backplane 37. The second buffer structure 38 can realize buffering between the sound board 5 and the middle frame backplane 37 to prevent vibration from being transmitted to the middle frame backplane 37 through the sound board 5 to affect the structure on the middle frame backplane 37. In addition, with reference to FIG. 13 and FIG. 19, an opening in the middle of the sound board 5 can be provided for the outlet of the backlight module 2.

Figure 50:
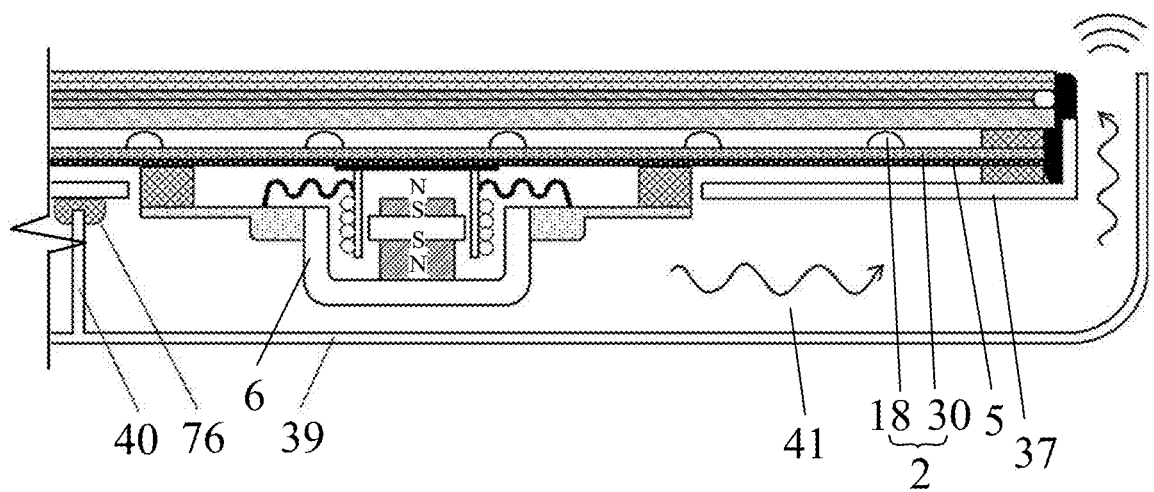
FIG. 50 is a schematic cross-sectional structural diagram of another display apparatus according to embodiments of the disclosure.

FIG. 50 is a schematic cross-sectional structural diagram of another display apparatus according to embodiments of the disclosure. As shown in FIG. 50, based on the above embodiments, the display apparatus further includes a rear shell 39. The display apparatus includes a middle frame backplane 37 located on a side of the sound board 5 away from the backlight module 2. The rear shell 39 is located on the middle frame backplane 37 and a side of the sound driver 6 away from the sound board 5. In some embodiments, the rear shell 39 is an exterior case of a display apparatus. For example, the display apparatus can be but is not limited to a television.

Figure 51:
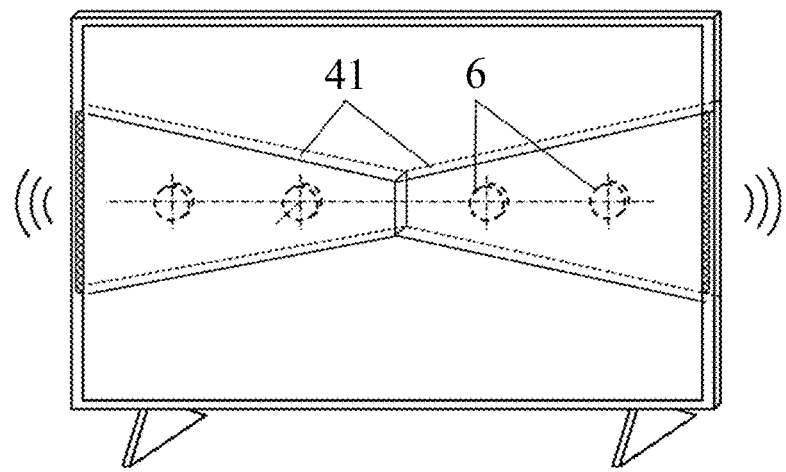
FIG. 51 is a schematic front-view structural diagram of another display apparatus according to embodiments of the disclosure.

In some embodiments, FIG. 51 is a schematic front-view structural diagram of another display apparatus according to embodiments of the disclosure. With reference to FIG. 50 and FIG. 51, a dividing wall 40 is provided between the middle frame backplane 37 and the rear shell 39. The dividing wall 40, the rear shell 39 and the middle frame backplane 37 form a back radiation superposition cavity 41. The back radiation superposition cavity 41 has a sound emission opening facing the front of the display apparatus.

Specifically, unlike traditional piston speakers, the display apparatus of the disclosure produces sound in the form of distribution mode loudspeaker (DML) multi-mode resonant bending waves. The sound waves have superposition enhancement properties. In some embodiments of the disclosure, the display apparatus has back-facing high-frequency enhanced design. A dividing wall 40 is provided between the rear shell 39 of the display apparatus and the middle frame backplane 37. A contact surface between the dividing wall 40 and the middle frame backplane 37 is provided with a soundproof sponge 76. The dividing wall 40, the rear shell 39 and the middle frame backplane 37 form a back radiation superposition cavity 41 of a desired shape. The back radiation superposition cavity 41 has a sound emission opening, and the sound emission opening faces the front of the screen of the display apparatus as shown in FIG. 50 and FIG. 51. Therefore, the back radiation superposition cavity 41 is configured to form a sound resonance cavity, and back vibration multi-mode high-frequency vibration bending waves are directed to the front of the screen for producing sound, or to the side of the screen for producing sound, which can improve the response at a resonant frequency to compensate for the loss of high frequencies when the display apparatus produces sound.

Figure 52:
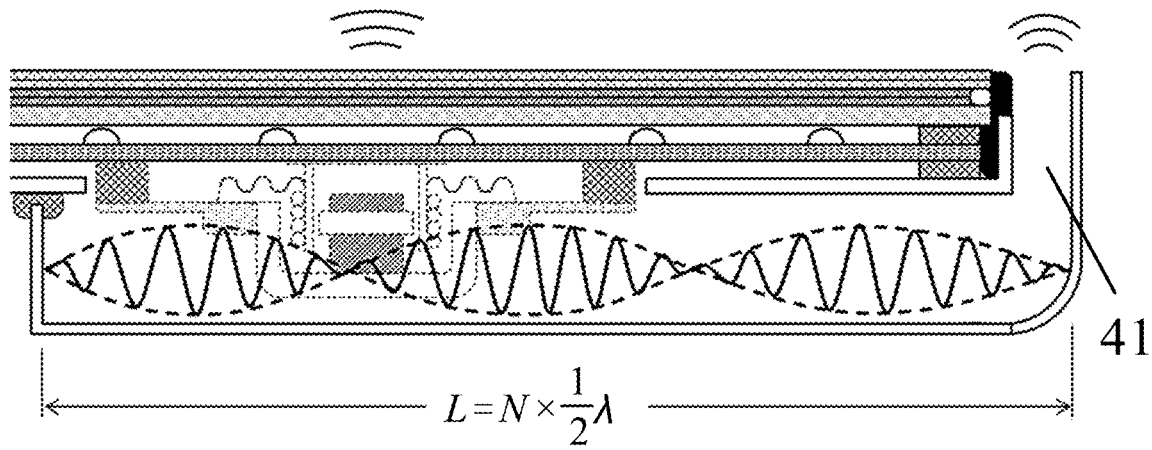
FIG. 52 is a schematic cross-sectional structural diagram of another display apparatus according to embodiments of the disclosure.
Figure 53:
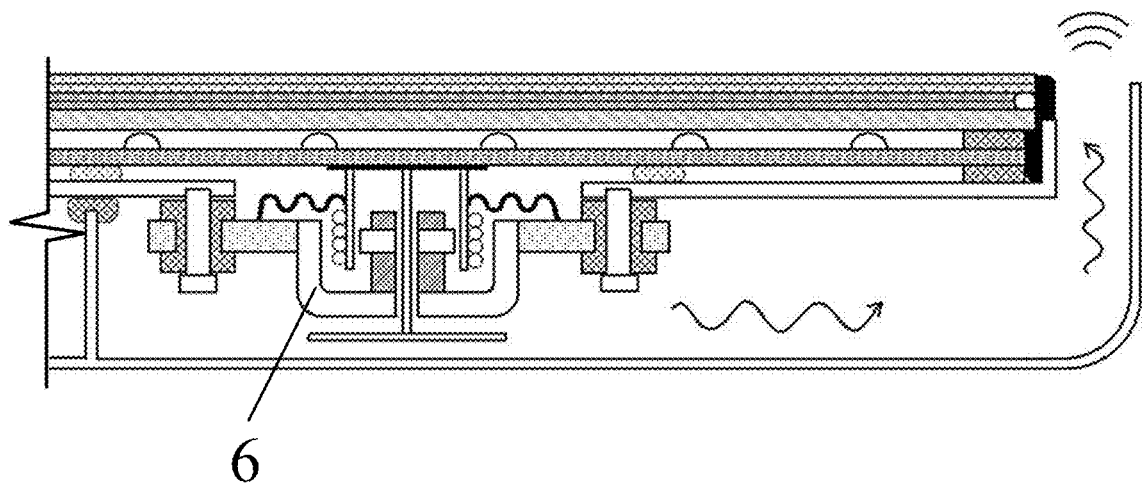
FIG. 53 is a schematic cross-sectional structural diagram of another display apparatus according to embodiments of the disclosure.

FIG. 52 is a schematic cross-sectional structural diagram of another display apparatus according to embodiments of the disclosure. With reference to FIGS. 50 to 52, a length L on a sound path of the back radiation superposition cavity 41 can be set to a length of N half sound wavelengths. A sound frequency of the wavelength is the lowest resonant frequency of the compensation band. A position of the sound emission opening can be near any antinode of one-half sound wavelength. In addition, FIG. 53 is a schematic cross-sectional structural diagram of another display apparatus according to embodiments of the disclosure. As shown in FIG. 53, the sound driver 6 can uses the sound driver 6 with the structure shown in FIG. 10. The back-facing diaphragm of the sound driver 6 can radiate additional high-frequency sound waves, further improving the high-frequency response of the display apparatus.

Figure 54:
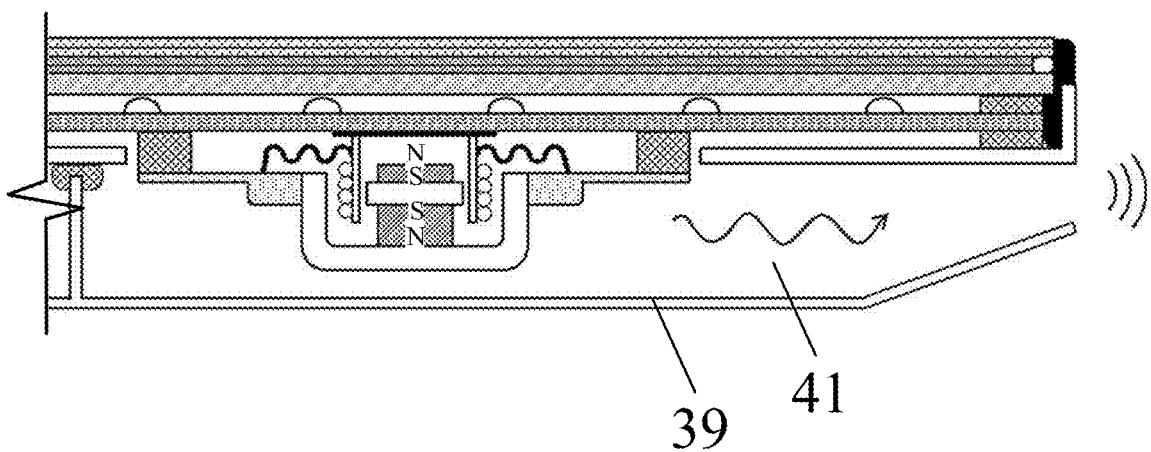
FIG. 54 is a schematic cross-sectional structural diagram of another display apparatus according to embodiments of the disclosure.
Figure 55:
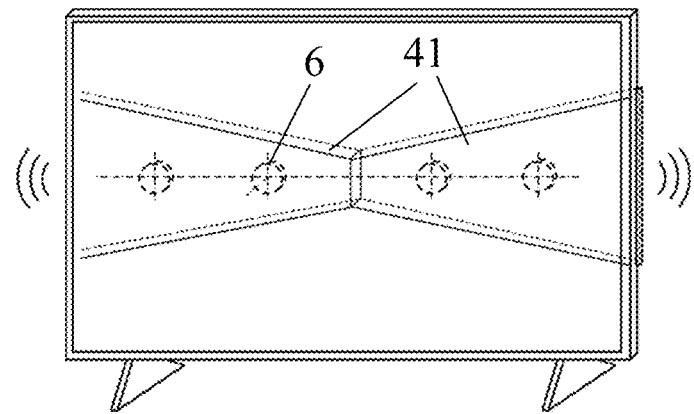
FIG. 55 is a schematic front-view structural diagram of another display apparatus according to embodiments of the disclosure.

In some embodiments, FIG. 54 is a schematic cross-sectional structural diagram of another display apparatus according to embodiments of the disclosure. FIG. 55 is a schematic front-view structural diagram of another display apparatus according to embodiments of the disclosure. With reference to FIG. 54 and FIG. 55, by setting the shape of the rear shell 39, the back radiation superposition cavity 41 can also be provided with a sound emission opening facing the side of the display apparatus. In addition, the wavy arrows in FIG. 50, FIG. 53, and FIG. 54 indicate a propagation direction of sound.

Figure 56:
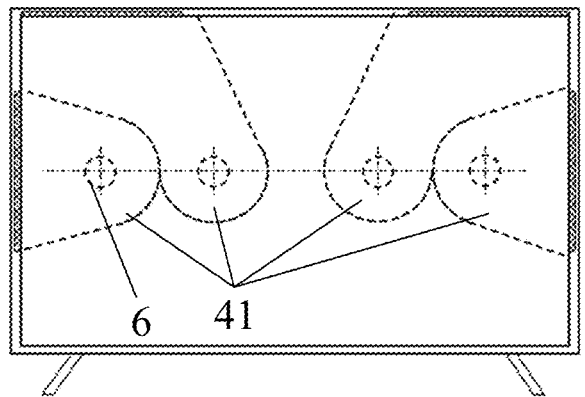
FIG. 56 is a schematic front-view structural diagram of another display apparatus according to embodiments of the disclosure.
Figure 57:
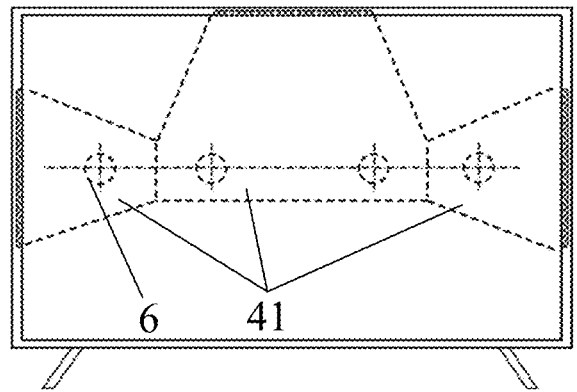
FIG. 57 is a schematic front-view structural diagram of another display apparatus according to embodiments of the disclosure.

FIG. 56 is a schematic front-view structural diagram of another display apparatus according to embodiments of the disclosure. FIG. 57 is a schematic front-view structural diagram of another display apparatus according to embodiments of the disclosure. With reference to FIGS. 55 to 57, the back radiation superposition cavity 41 can have a horn-like shape to improve the propagation efficiency of sound in the back radiation superposition cavity 41.

Figure 58:
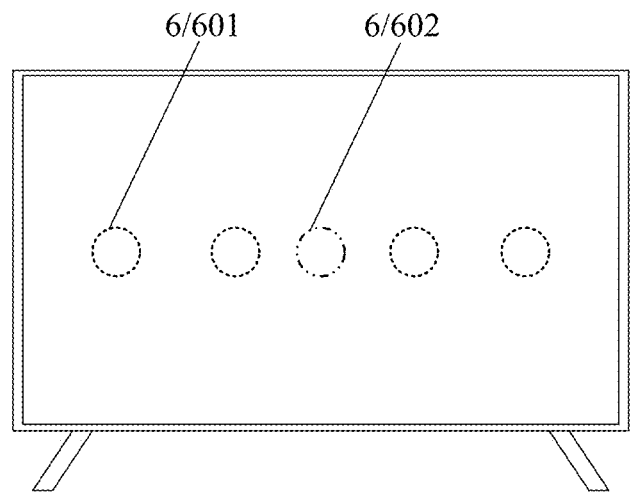
FIG. 58 is a schematic front-view structural diagram of another display apparatus according to embodiments of the disclosure.
Figure 59:
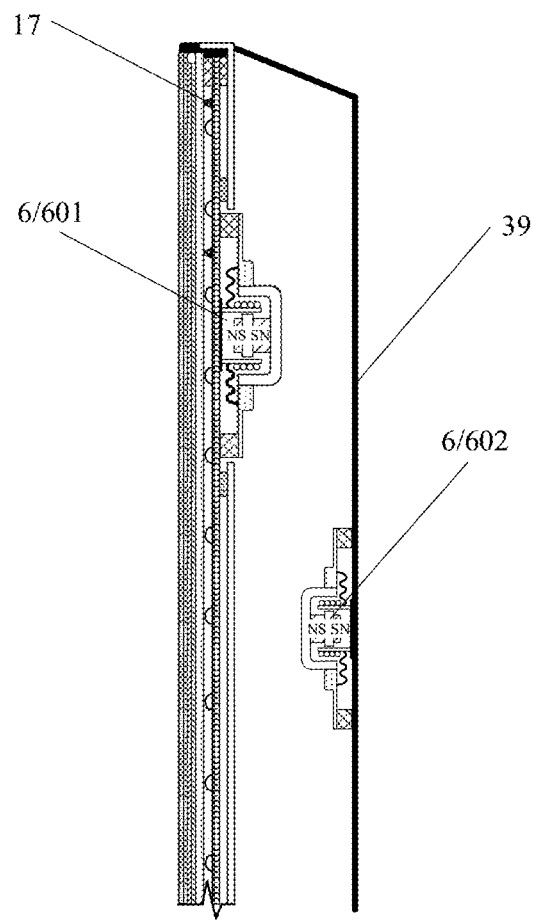
FIG. 59 is a schematic three-dimensional structural diagram of another display apparatus according to embodiments of the disclosure.

FIG. 58 is a schematic front-view structural diagram of another display apparatus according to embodiments of the disclosure. FIG. 59 is a schematic three-dimensional structural view of a display apparatus according to embodiments of the disclosure. With reference to FIG. 58 and FIG. 59, based on the above embodiments, the display apparatus further includes a rear shell 39 and a second sound driver 602. A second vibration output terminal of the second sound driver 602 is fixed to the rear shell 39. The second sound driver 602 is configured to excite the rear shell 39 to vibrate through the second vibration output terminal.

In some embodiments, the display apparatus is in a vibration state when making sound. When the case of the display apparatus is an integral rear shell 39, because the area of the rear shell 39 is equivalent to the screen area, a certain resonance will inevitably occur. A frequency of the resonance is the same as a frequency of the screen and is also in an audible frequency band, so the sound produced by the rear shell 39 will also be heard by people, resulting in similar noise. In order to eliminate this noise, in some embodiments of the disclosure, a second sound driver 602 is provided on the rear shell 39. The second sound driver 602 is configured to excite the rear shell 39 to vibrate. Distinguishing from the first sound driver 601 that drives the screen to make sounds and the second sound driver 602 that drives the screen to make sounds, the first sound driver 601 and the second sound driver 602 are arranged in opposite directions to each other, that is, the first sound driver 601 is attached to the sound board 5 for screen vibration, and the second sound driver 602 is attached to the rear shell 39 for the vibration of the rear shell 39. Therefore, using different sound drivers to target the reverse vibrations of the sound board 5 and the rear shell 39 reduces the noise caused by the resonance between the rear shell 39 and the display apparatus.

When the vibration of the screen causes the vibration of the rear shell 39, a larger or maximum vibration point is found and a driving force of reverse vibration is applied at the vibration point, to reduce the vibration amount of the rear shell 39. The vibration mode of the panel vibration transmitted to the rear shell 39 is not linear, which is reflected in two aspects. One is the amplitude. For example, a vibration amplitude of a 100 Hz panel is 0.2 mm, and a vibration amplitude of a 1000 Hz is 0.05 mm, while the vibration amplitude of 100 Hz transmitted to the rear shell 39 can be amplified to 0.4 mm by resonance, and the resonance of the rear shell 39 is mainly concentrated at the low frequency end, so the vibration amplitude of 1000 Hz can be attenuated to 0.02 mm. Because the transmission from the screen to the rear shell 39 passes through the middle frame backplane, screws and other complex relationships, in addition to the above-mentioned amplitude differences, there are also phase changes. For example, a phase difference at 100 Hz is 180°, that is, the rear shell 39 and the screen are opposite, while a phase difference at 1000 Hz is only 120°.

The above-mentioned vibration amplitude and phase relationships are not certain and will change with the structures and materials of the display apparatus. A maximum amplitude area is obtained through testing, and the correlation between the amplitude and phase of the maximum vibration area and the screen vibration is determined. Thus, a correlation function F(x) between the second sound driver 602 of the rear shell 39 and the first sound driver 601 of the screen is obtained, and F(x) is applied to a signal processing link where the second sound driver 602 that vibrates the rear shell 39 is located. For F(x), frequency points of vibration of the rear shell 39 are obtained through testing. It is assumed that n frequency points with the largest vibration amount are taken, and the filters f0, f1, f2, ..., fn are set with a vibration frequency as a center, and a difference between a vibration spectrum characteristic of the rear shell 39 in each frequency band and a signal characteristic of the second sound driver 602 at the same frequency is obtained, and a vibration frequency domain transfer function of the vibration from the second sound driver 602 to the rear shell 39 in this frequency band is obtained, and a time delay from the second sound driver 602 to the vibration of the rear shell 39 passing through the center frequency point of the frequency band of the test center, is Δt. By accumulating multiple frequency bands in this way, the vibration transfer function from the second sound driver 602 to the rear shell 39 within the entire frequency response range is obtained.

Figure 60:
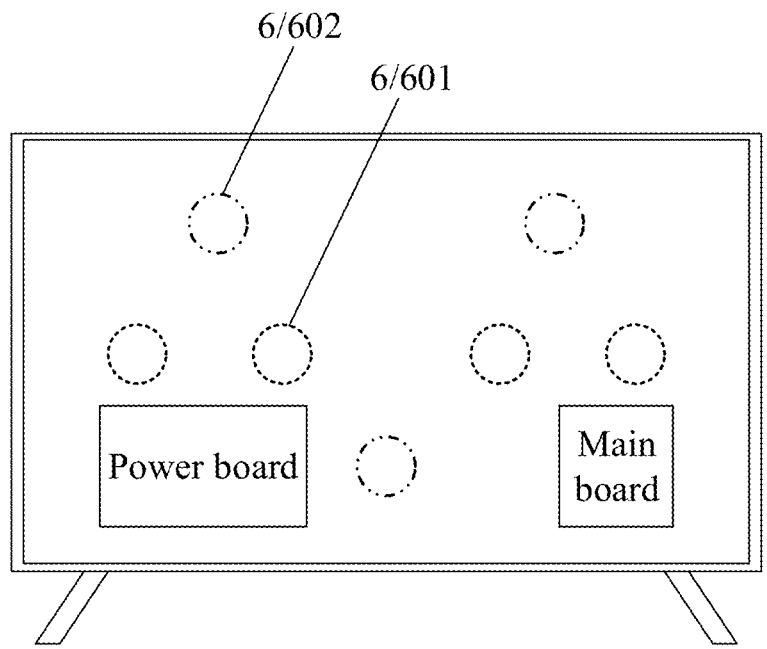
FIG. 60 is a schematic front-view structural diagram of another display apparatus according to embodiments of the disclosure.
Figure 61:
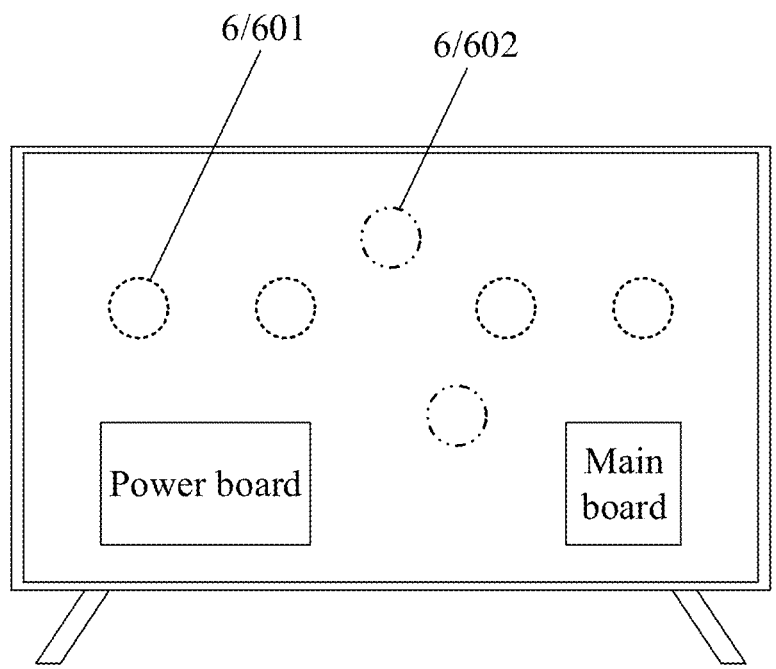
FIG. 61 is a schematic front-view structural diagram of another display apparatus according to embodiments of the disclosure.

FIG. 60 is a schematic front-view structural diagram of another display apparatus according to embodiments of the disclosure. FIG. 61 is a schematic front-view structural diagram of another display apparatus according to embodiments of the disclosure. In some embodiments, the sound driver 602 is arranged near the maximum vibration area based on the determination of an actual maximum vibration area. In some embodiments, with reference to FIG. 60 and FIG. 61, the second sound driver 602 can be disposed at a preset position on the rear shell 39. A test value of vibration amplitude at the preset position is greater than a preset test value.

In some embodiments, only the first sound driver 601 can be configured to excite the sound board 5 to vibrate, and no sound driver is provided on the rear shell 39. At this time, vibration amplitudes of different areas on the rear shell 39 are tested to obtain a specific position on the rear shell 39 where the test value of the vibration amplitude is greater than the preset test value, and the second sound driver 602 is set at the specific position. It should be noted that, the preset test value is not limited in some embodiments of the disclosure, and the preset test value can be set according to specific sound generation requirements of the display apparatus. Therefore, by arranging the second sound driver 602 at the preset position on the rear shell 39, the test value of the vibration amplitude of the preset position is greater than the preset test value, so that the second sound driver 602 is arranged at an area with a larger vibration amplitude and an area with the largest vibration amplitude, different sound drivers can be used for the reverse vibration of the sound board 5 and the rear shell 39, thereby minimizing the noise generated by the resonance of the rear shell 39 and the screen.

In some embodiments, an arrangement area of the second sound driver 602 on the rear shell 39 can be a single point as shown in FIG. 58, or an arrangement area of the second sound driver 602 on the rear shell 39 can be multi-point as shown in FIGS. 60 and 61. The arrangement areas in a plane where the screen is located can be symmetrical or asymmetrical, which is not specifically limited in some embodiments of the disclosure.

Figure 62:
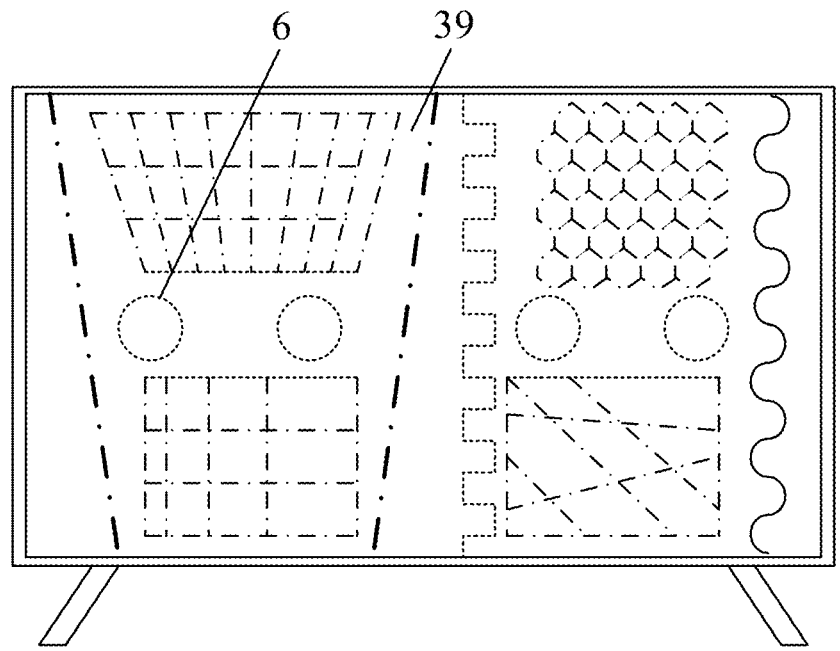
FIG. 62 is a schematic front-view structural diagram of another display apparatus according to embodiments of the disclosure.
Figure 63:
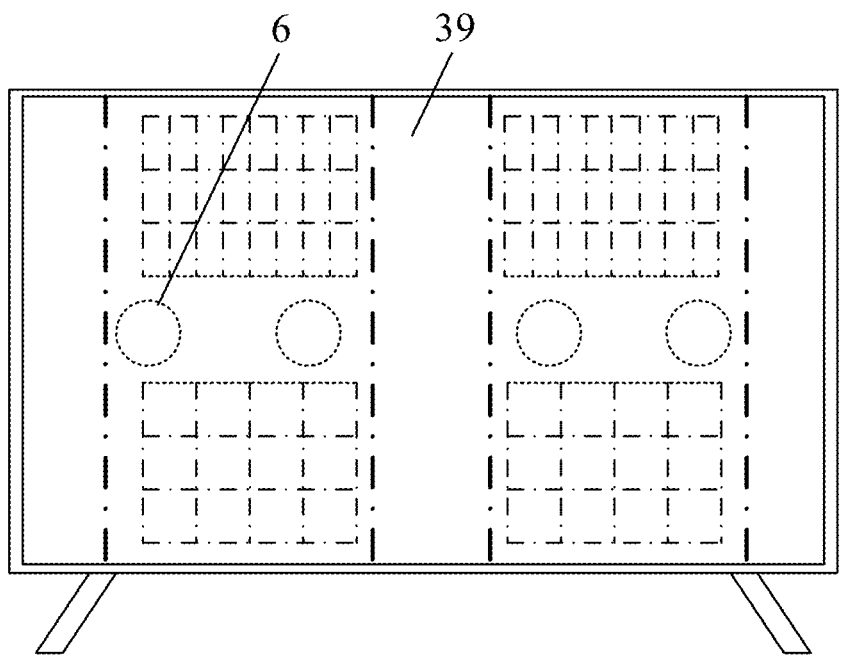
FIG. 63 is a schematic front-view structural diagram of another display apparatus according to embodiments of the disclosure.

In some embodiments, FIG. 62 is a schematic front-view structural diagram of another display apparatus according to embodiments of the disclosure. As shown in FIG. 62, a plurality of reinforcing ribs are provided on the surface of the rear shell 39 adjacent to the middle frame backplane. That is, a plurality of reinforcing ribs are provided on the surface of the rear shell 39 adjacent to the sound board 5. The reinforcing ribs are non-uniformly distributed. Specifically, in order to ensure smaller vibration of the rear shell 39, some processing needs to be done on the rear shell 39 to limit the rear shell 39 from generating larger resonance. FIG. 63 is a schematic front-view structural diagram of another display apparatus according to embodiments of the disclosure. In order to meet the requirements of flatness and rigidity, mesh-like reinforcing ribs are added to a large area of the same thickness inside a traditional rear shell 39. As shown in FIG. 63, the thick dot-dashed line represents reinforcing ribs with a higher height, while the thin dot-dashed line represents reinforcing ribs with a smaller height. The traditional reinforcing ribs adopt a continuous grid structure with a regular square or rectangular, such that the design of the reinforcing ribs is simple and can ensure the uniformity of the thickness of the rear shell 39. However, due to the use of fixed equal-spaced divisions, the rear shell 39 is prone to produce a fixed loudness resonant frequency.

In order to reduce this resonance, in some embodiments of the disclosure, a reinforcing rib structure with a non-equally spaced fixed-shape is proposed. As shown in FIG. 62, the lines corresponding to the area of the rear shell in FIG. 62 all represent reinforcing ribs. The reinforcing ribs arranged in a trapezoidal manner in the upper left corner area as shown in FIG. 62 can be provided in the area of the rear shell 39. Or, the reinforcement ribs arranged in a honeycomb shape in the upper right corner area as shown in FIG. 62 are provided in the area of the rear shell 39, where the areas of different hexagons can be different. Or, the reinforcing ribs arranged in a non-equally spaced rectangular shape in the lower left corner area as shown in FIG. 62 are provided in the area of the rear shell 39. Or, the reinforcing ribs arranged in an irregular polygonal shape in the lower right corner area as shown in FIG. 62 are provided in the area of the rear shell 39.

In addition, the higher reinforcing ribs can also be designed obliquely. For example, the higher reinforcing ribs can also be in an oblique linear shape or in a zigzag or wavy shape as shown in FIG. 62. In some embodiments of the disclosure, the specific details of the non-uniform arrangement of the reinforcing ribs are not limited. The use of non-uniformly distributed reinforcing ribs can destroy the vibration mode of the rear shell 39 to the maximum extent, reducing the resonance amplitude of the rear shell 39, and improving the fixed loudness resonance frequency generated by the rear shell 39, thereby reducing vibration noise. Referring to the above embodiments, the maximum vibration amplitude point can also be tested through simulation or actual prototypes. At the position where the vibration amplitude is large or the maximum, the shape of the reinforcing rib of the rear shell and the height or width of the reinforcement rib can be changed, and the reinforcing rib can even be made into a convex and concave gear shape, the vibration mode of the rear shell 39 is destroyed to the maximum extent, and the resonance amplitude of the rear shell 39 is reduced, thereby reducing vibration noise.

In some embodiments, as shown in FIG. 62, at least part of the reinforcing ribs are arranged according to the change of heights of the rear shell 39; and/or, at least part of the reinforcing ribs are arranged according to the change of widths of the rear shell 39 in a direction perpendicular to an extension direction of the reinforcing ribs 39. That is, only at least part of the reinforcing ribs are arranged according to the change of heights of the rear shell 39, or only at least part of the reinforcing ribs are arranged according to the change of widths of the rear shell 39 in a direction perpendicular to an extension direction of the reinforcing ribs 39, or at least part of the reinforcing ribs are arranged according to the change of heights and widths of the rear shell 39. Here, for example, the change of the height of the reinforcing rib is a height change of an obliquely arranged reinforcing rib relative to the rear shell 39 in FIG. 62, that is, the height of the reinforcing rib is undulating relative to the edge of the rear shell 39. For example, the change of the width of the reinforcing rib is that the width of an obliquely arranged reinforcing rib changes continuously in a direction perpendicular to an extension direction of the obliquely arranged reinforcing rib.

The reinforcing ribs with fixed spacing, fixed height or fixed width have a certain resonant frequency. When the resonant frequency is within an audible audio range and is excited by screen vibration, resonant noise is likely to occur. Through the design of the reinforcing rib shown in FIG. 62, at least part of the reinforcing ribs are arranged according to the change of heights of the rear shell 39; and/or, at least part of the reinforcing ribs are arranged according to the change of widths of the rear shell 39 in a direction perpendicular to an extension direction of the reinforcing ribs 39, which can use the reinforcing ribs with varying heights or widths to destroy or reduce a fixed resonant frequency of the rear shell 39, so that the resonant frequency of the rear shell 39 is relatively dispersed and does not produce a maximum value at a certain frequency point, thereby achieving the purpose of reducing resonance noise and reducing the requirements of the second sound driver 602 of the rear shell 39 and a software algorithm F(x) to a chip audio processor of the display apparatus. It should be noted that the reinforcing ribs can be in rectangular wave shape, wavy shape, or inclined straight line shape, etc. The shapes of the reinforcing ribs are not specifically limited in some embodiments of the disclosure.

Figure 64:
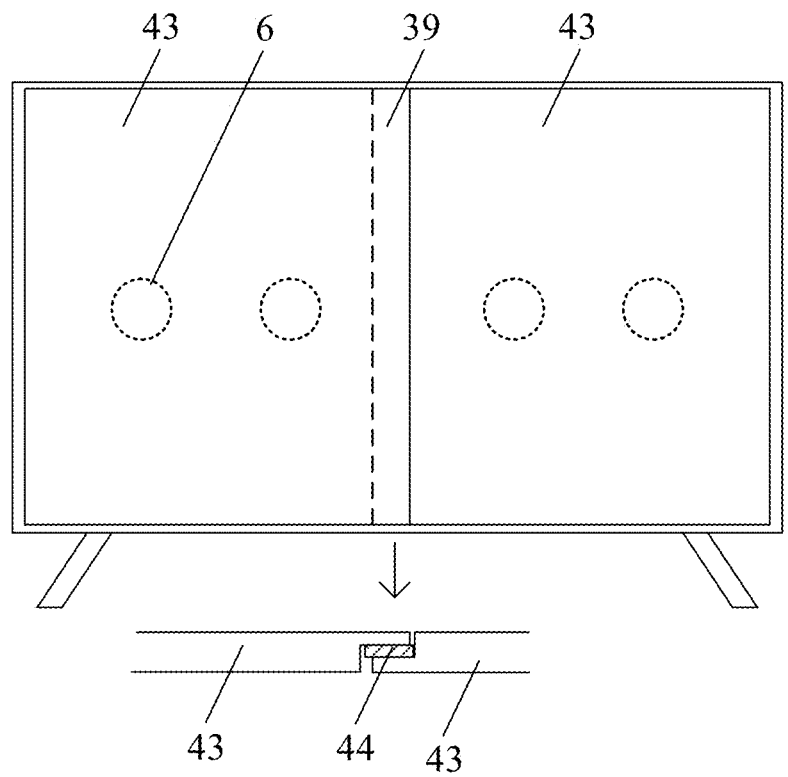
FIG. 64 is a schematic front-view structural diagram of another display apparatus according to embodiments of the disclosure.
Figure 65:
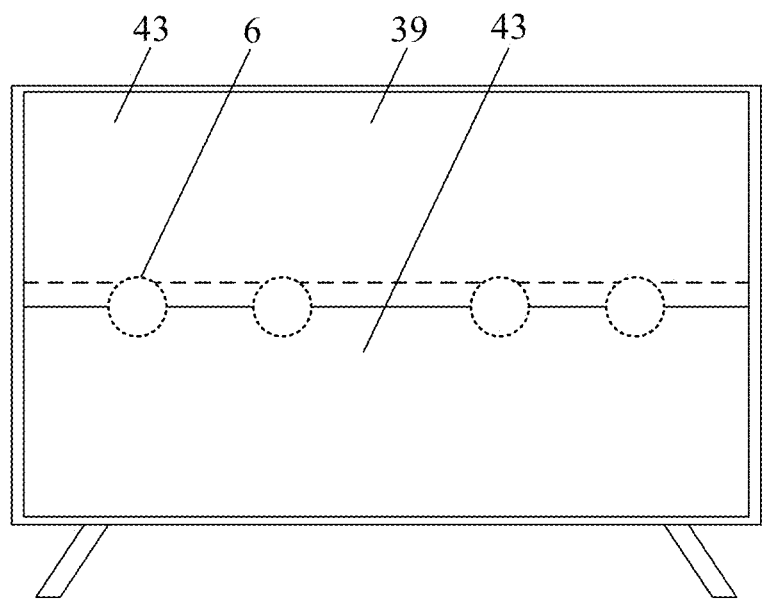
FIG. 65 is a schematic front-view structural diagram of another display apparatus according to embodiments of the disclosure.

In some embodiments, FIG. 64 is a schematic front-view structural diagram of another display apparatus according to embodiments of the disclosure. FIG. 65 is a schematic front-view structural diagram of another display apparatus according to embodiments of the disclosure. With reference to FIG. 64 and FIG. 65, the rear shell 39 is non-uniformly divided into multiple shells 43, and adjacent shells 43 are fixed by a third adhesion buffer structure 44.

Specifically, the vibration of the rear shell 39 mostly occurs in the low-frequency band. However, the rear shell 39 of a general display apparatus adopts an overall design, and the area is equivalent to the screen, so low-frequency resonance is easily generated. In some embodiments of the disclosure, the rear shell 39 is designed in segments. As shown in FIG. 64, the rear shell 39 is divided into two sections. The two sections of the rear shell 39 adopt a staggered connection method and are fixed through a third adhesion buffer structure 44, such as double coated foam tapes, so that the rear shell 39 is divided into two areas, and the area is reduced by half compared with the original area, so that the rear shell 39 as a whole cannot achieve unified resonance, and resonance cannot be formed in a center area where the rear shell 39 has the weakest vibration. In this way, the rear shell 39 can also be divided into two sections in a horizontal direction, as shown in FIG. 65. The rear shell 39 can also be divided into multiple sections, such as three sections or four sections, etc.

Figure 66:
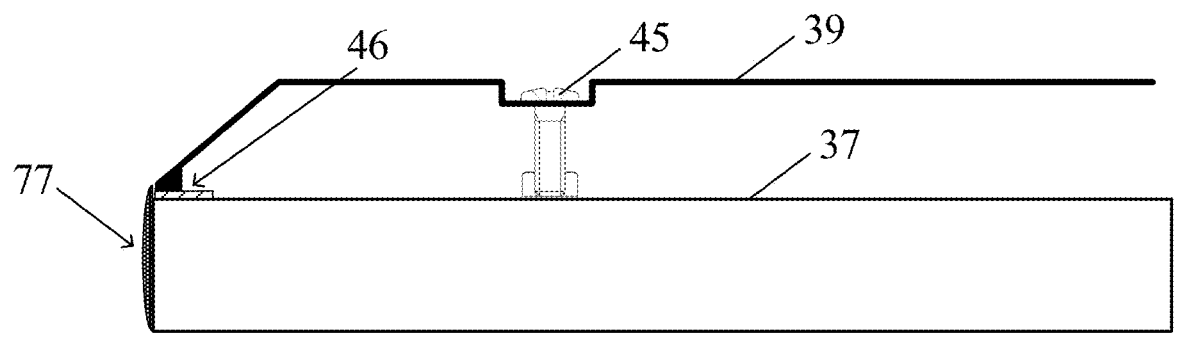
FIG. 66 is a schematic cross-sectional structural diagram of another display apparatus according to embodiments of the disclosure.

In some embodiments, FIG. 66 is a schematic cross-sectional structural diagram of another display apparatus according to embodiments of the disclosure. As shown in FIG. 66, the rear shell 39 is suspended relative to the middle frame backplane 37 through a hard fixing structure 45. The hard fixing structure 45 is configured to fix the rear shell 39. A third buffer structure 46 is arranged between the rear shell 39 and the middle frame backplane 37 corresponding to a frame position of the rear shell 39. Specifically, part of the noise in the display apparatus is caused by friction at a contact position between the rear shell 39 and the middle frame backplane 37. In some embodiments of the disclosure, the rear shell 39 is suspended relative to the middle frame backplane 37 through a hard fixing structure 45. The hard fixing structure 45 is, for example, a screw, and a third buffer structure 46 is provided between the rear shell 39 and the middle frame backplane 37 corresponding to the frame position of the rear shell 39. The third buffer structure 46 is, for example, foam, which can effectively prevent the rear shell 39 from being in rigid contact with the middle frame backplane 37.

Figure 67:
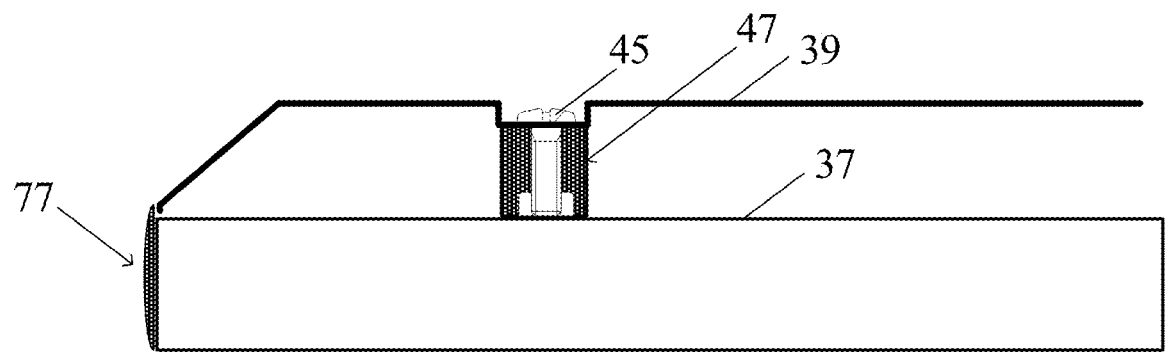
FIG. 67 is a schematic cross-sectional structural diagram of another display apparatus according to embodiments of the disclosure.
Figure 68:
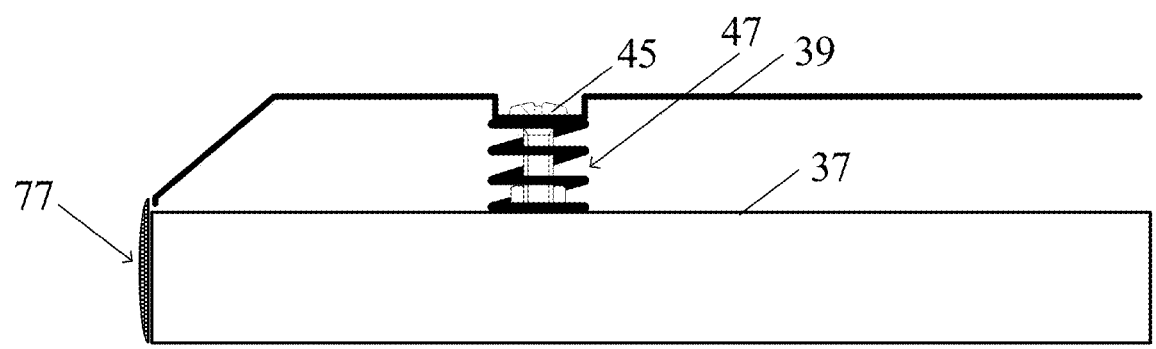
FIG. 68 is a schematic cross-sectional structural diagram of another display apparatus according to embodiments of the disclosure.
Figure 69:
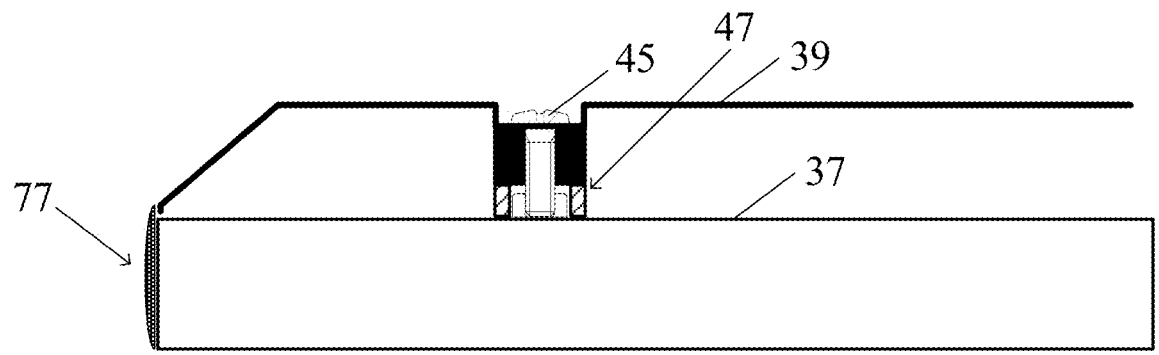
FIG. 69 is a schematic cross-sectional structural diagram of another display apparatus according to embodiments of the disclosure.

In some embodiments, FIG. 67 is a schematic cross-sectional structural diagram of another display apparatus according to embodiments of the disclosure. FIG. 68 is a schematic cross-sectional structural diagram of another display apparatus according to embodiments of the disclosure. FIG. 69 is a schematic cross-sectional structural diagram of another display apparatus according to embodiments of the disclosure. With reference to FIGS. 67 to 69, the rear shell 39 is suspended relative to the middle frame backplane 37 through a hard fixing structure 45 and an elastic structure 47. The hard fixing structure 45 is configured to fix the rear shell 39. The elastic structure 47 is interferingly designed with respect to the position where the hard fixing structure 45 is located, and the elastic structure 47 is configured to exert pressure on the rear shell 39 in a direction away from the middle frame backplane 37.

Specifically, the hard fixing structure is, for example, a screw. The elastic structure 47 as shown in FIG. 67 can be a damping sleeve. The rear shell 39 is fixed on the middle frame backplane 37 through the damping sleeve added to the screw. The damping sleeve adopts silicone material, and the damping sleeve is in an interference state when the screw is tightened to make the rear shell 39 suspend relative to the middle frame backplane 37, effectively preventing the rear shell 39 from being in rigid contact with the middle frame backplane 37. Alternatively, the spring shown in FIG. 68, the foam shown in FIG. 69 and other materials can also be configured to achieve a function similar to a damping sleeve to reduce the transmission of vibration between the rear shell 39 and the backplane. In addition, with reference to FIGS. 67 to 69, the floating or suspending solution will cause a certain gap between the backplane and the rear shell 39, which is contrary to the safety regulations of the display apparatus. For example, coins can be inserted into the gap to cause a short circuit in the internal circuit. For this reason, in some embodiments of the disclosure, a layer of decorative part 77 is provided on the frame of the display apparatus. The decorative part 77 can be integrally formed with the frame, or can be adhered to the frame in an adhesive manner. The decorative part 77 is higher than a plane of the middle frame backplane 37 in an opposite direction of the screen. The decorative part 77 is higher than the gap between the rear shell 39 and the backplane, so as to meet safety regulations and ensure that the appearance of the whole machine is aesthetically pleasing.

Figure 70:
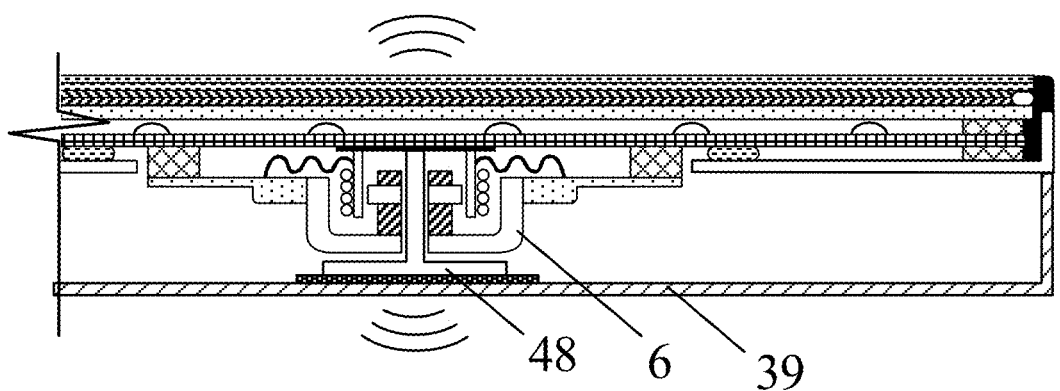
FIG. 70 is a schematic cross-sectional structural diagram of another display apparatus according to embodiments of the disclosure.

In some embodiments, FIG. 70 is a schematic cross-sectional structural diagram of another display apparatus according to embodiments of the disclosure. As shown in FIG. 70, the sound driver 6 includes a vibration transmission structure 48, and is configured to excite the rear shell 39 to vibrate. Specifically, the sound driver 6 vibrates forward and backward when working, and the vibration transmission structure 48 is fixed to the rear shell 39 to excite the rear shell 39 to vibrate, and the vibration energy of the sound driver 6 is transmitted to the rear shell 39. The rear shell 39 vibrates to produce sound waves. Since the low-frequency sound has no directionality, the sound waves can be superimposed and enhanced with the forward sound of the display apparatus, thereby achieving the purpose of increasing the intensity of the low-frequency sound.

In some embodiments, the vibration transmission structure 48 can be fixed to the rear shell 39 through a adhesion buffer structure (not shown in FIG. 70), such as but not limited to double-sided tape. To ensure the transmission of vibration to the rear shell 39, the vibration transmission structure 48 is generally made of hard materials. If the vibration transmission structure 48 and the rear shell 39 are both of hard structure, direct contact will cause the hard structure at the contact position to collide and generate noise. The setting of the adhesion buffer structure can effectively avoid the problem that the direct contact between the two hard structures, i.e., the vibration transmission structure 48 and the rear shell 39, causes the collision of the hard structures at the contact position to produce noise.

Figure 71:
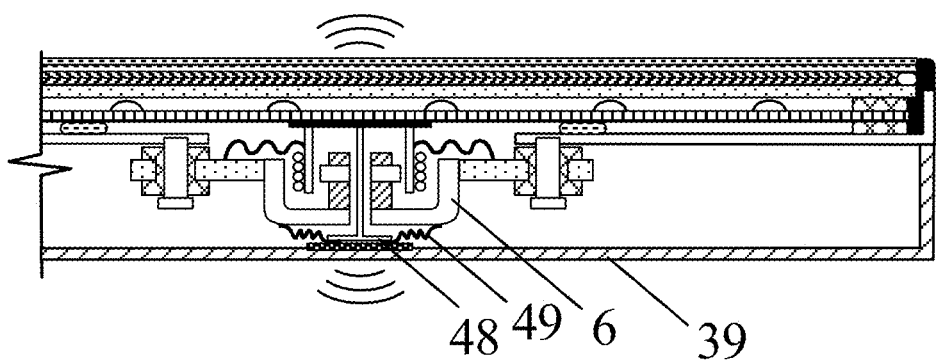
FIG. 71 is a schematic cross-sectional structural diagram of another display apparatus according to embodiments of the disclosure.

In some embodiments, FIG. 71 is a schematic cross-sectional structural diagram of another display apparatus according to embodiments of the disclosure. As shown in FIG. 71, the vibration transmission structure 48 is provided with a vibration stabilizing structure 49. The vibration stabilizing structure 49 is configured to balance a reaction force applied by the rear shell 39 to the vibration transmission structure 48, so that the vibration transmission structure 48 vibrates along a central axis of the sound driver 6.

In some embodiments, when the vibration transmission structure 48 vibrates up and down, due to problems such as assembly deviation of the rear shell 39, assembly deviation of the sound driver 6, uneven force after the rear shell 39 cooperates with the sound driver 6, etc., the reaction force given by the rear shell 39 to the sound driver 6 is uneven, causing the vibration transmission structure 48 to be unable to vibrate vertically up and down, resulting in vibration noise. In some embodiments of the disclosure, the vibration stabilizing structure 49 is used to balance the reaction force exerted by the rear shell 39 to the vibration transmission structure 48, so that the vibration transmission structure 48 vibrates along the central axis of the sound driver 6, that is, ensuring that the vibration transmission structure 48 can vibrate vertically up and down along a vertical direction, effectively avoiding the problem of noise caused by the vibration transmission structure 48 colliding with structures such as the sound driver 6 when the vibration transmission structure 48 vibrates obliquely up and down.

Figure 72:
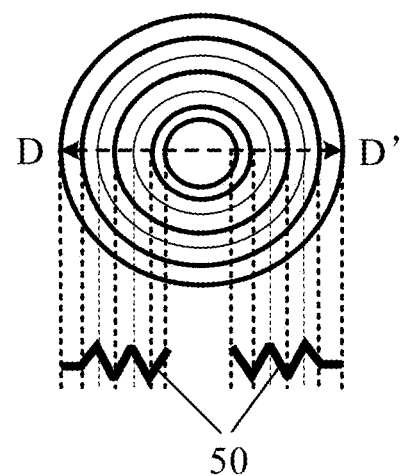
FIG. 72 is a schematic top-view structural diagram of a vibration stabilizing structure according to embodiments of the disclosure.

In some embodiments, FIG. 72 is a schematic top-view structural diagram of a vibration stabilizing structure according to embodiments of the disclosure. With reference to FIG. 71 and FIG. 72, the vibration stabilizing structure 49 includes a plurality of first spring structures 50. The plurality of first spring structures 50 form a corrugated concentric structure. One end of the first spring structure 50 is fixed to the vibration transmission structure 48, the other end of the first spring structure 50 is fixed to the sound driver 6. As shown in FIG. 72, two first spring structures 50 are located corresponding to two radiuses of DD'. Different first spring structures 50 extend along radiuses in different directions, to form a corrugated concentric structure.

In some embodiments, the vibration stabilizing structure 49 is provided between the vibration transmission structure 48 and a magnetic circuit of the sound driver 6. The vibration stabilizing structure 49 can be, for example, a corrugated concentric structure as shown in FIG. 72, such as a centering support piece, including a plurality of first spring structures 50 arranged in rings. The material of the vibration stabilizing structure 49 can be, for example, rubber, plastic material or fiber material that can be hot-pressed or injection molded. A center of the vibration stabilizing structure 49 overlaps with a center of the vibration transmission structure 48. The extension of the vibration stabilizing structure 49 is installed with the magnetic circuit of the sound driver 6, or the extension of the vibration stabilizing structure 49 is installed with other parts of the sound driver 6 outside the magnetic circuit, so that the vibration stabilizing structure 49 can ensure that the vibration transmission structure 48 is located at a central axis position of the sound driver 6, that is, the vibration transmission structure 48 can vibrate up and down in the vertical direction, avoiding friction with the sound driver 6 and the like when the vibration transmission structure vibrates up and down to result in noise. The vibration stabilizing structure 49 adopts a corrugated concentric structure, that is, including a plurality of spring structures arranged in rings.

Figure 73:
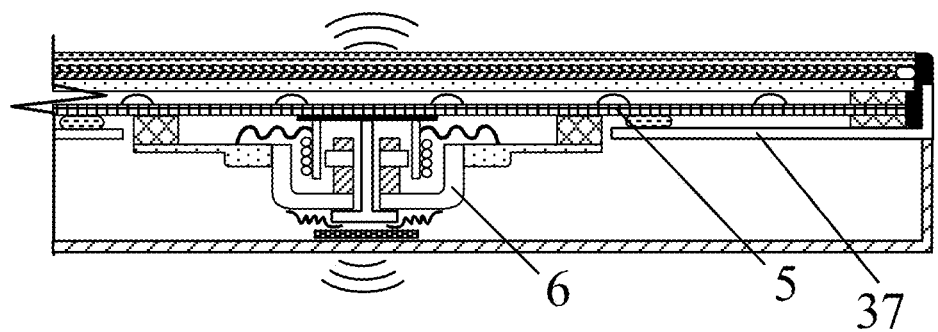
FIG. 73 is a schematic cross-sectional structural diagram of another display apparatus according to embodiments of the disclosure.

In some embodiments, the vibration stabilizing structure 49 can be an asymmetric structure. Since the sound driver 6 is not installed at a center of the display apparatus, two sides or upper and lower sides of the sound driver 6 is subjected to different reaction forces from the rear shell 39, which can easily cause the vibration transmission structure 48 to vibrate obliquely due to the asymmetric force. Therefore, the vibration stabilizing structure 49 is set to an asymmetric design that compensates for the reaction force of the rear shell 39, thereby offsetting the reaction force of the rear shell 39 on the vibration transmission structure 48 and ensuring the vertical downward vibration of the vibration transmission structure 48. The asymmetric design of the vibration stabilizing structure 49 can be achieved through differences in corrugation width, material thickness, material hardness, etc., of the first spring structure 50 at different positions. In addition, the sound driver 6 can also be directly attached to the sound board 5 as shown in FIG. 73 instead of being directly installed with the middle frame backplane 37. This avoids the problem that the vibration of the sound driver 6 is transmitted to the middle frame backplane 37, which leads to abnormal vibration of the middle frame backplane 37 and sound resonance of a circuit board installed on the middle frame backplane 37.

Figure 74:
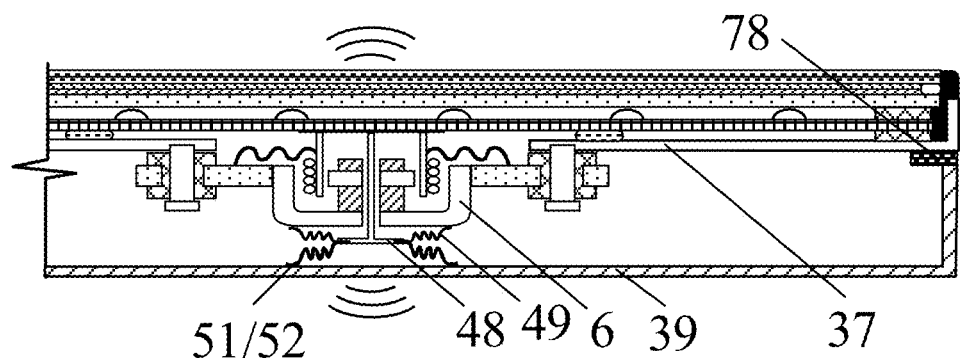
FIG. 74 is a schematic cross-sectional structural diagram of another display apparatus according to embodiments of the disclosure.

In some embodiments, FIG. 74 is a schematic cross-sectional structural diagram of another display apparatus according to embodiments of the disclosure. As shown in FIG. 74, the vibration transmission structure 48 is provided with a high-frequency filter structure 51 correspondingly. The high-frequency filter structure 51 is configured to filter out a high-frequency vibration transmitted from the vibration transmission structure 48 to the rear shell 39.

In some embodiments, the vibration transmission structure 48 of the sound driver 6 transmits a full-frequency vibration to the rear shell 39, which can easily cause the rear shell 39 to vibrate abnormally the mid and high frequency and cause noise; and high-frequency sound waves have strong directivity, which is easy to produce a phase difference with the forward sound wave, causing a sound field to be disordered. In this case, in some embodiments of the disclosure, a high-frequency filter structure 51 is provided between the sound driver 6 and the rear shell 39, so that the high-frequency vibration of the sound driver 6 cannot be transmitted to the rear shell 39. In addition, the rear shell 39 is located on the side of the middle frame backplane 37 away from the sound board 5 and forms a cavity with the middle frame backplane 37 for accommodating the sound driver 6, and a buffer part 78 can be provided between the rear shell 39 and the middle frame backplane 37, which can prevent the high-frequency vibration of the middle frame backplane 37 from being transmitted to the rear shell 39, avoid the impact of the low-frequency vibration of the rear shell 39 on the middle frame backplane 37, and avoid the resonance of the middle frame backplane 37 and the abnormal vibration caused by devices, such as a circuit board, on the middle frame backplane 37.

Figure 75:
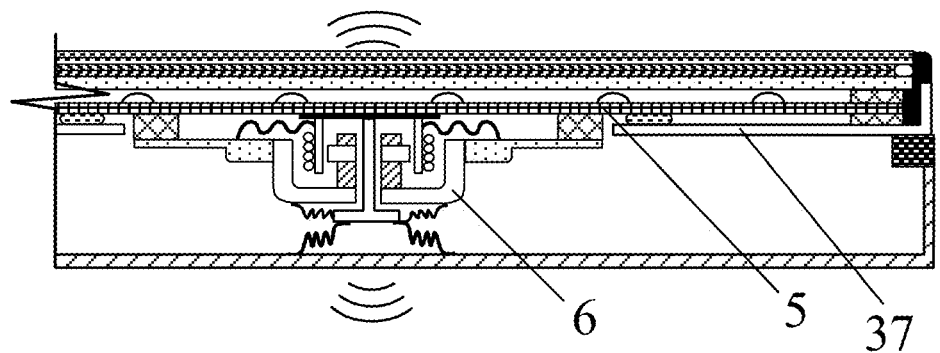
FIG. 75 is a schematic cross-sectional structural diagram of another display apparatus according to embodiments of the disclosure.

Illustratively, as shown in FIG. 74, the high-frequency filter structure 51 includes a plurality of second spring structures 52. One end of the second spring structure 52 is fixed to the vibration transmission structure 48, and the other end of the second spring structure 52 is fixed to the rear shell 39. In some embodiments, the high-frequency filter structure 51 can be a single corrugated structure or multiple corrugated structures and have a certain elasticity, such as the second spring structure 52. When a high-frequency small-amplitude vibration passes through the high-frequency filter structure 51, the small-amplitude vibration energy is absorbed by the high-frequency filter structure 51 and will not be transmitted to the rear shell 39. When a low-frequency large-amplitude vibration occurs, the vibration amplitude is greater than the vibration absorption degree of the high-frequency filter structure 51, so the low-frequency vibration can be transmitted to the rear shell 39 to generate a low-frequency response. In addition, the sound driver 6 can also be directly attached to the sound board 5 as shown in FIG. 75 instead of being directly installed with the middle frame backplane 37, to avoid the problem that the vibration of the sound driver 6 is transmitted to the middle frame backplane 37, which leads to abnormal vibration of the middle frame backplane 37 and sound resonance of a circuit board installed on the middle frame backplane 37. Alternatively, the sound driver 6 can also be fixed to the middle frame backplane 37 as shown in FIG. 75, so that the sound can be transmitted to the base of the display apparatus and then to the furniture on which the display apparatus is placed to enhance the sound.

In some embodiments, a plurality of second spring structures 52 can be provided to form a corrugated concentric structure similar to that shown in FIG. 72. In some embodiments, referring to the description of the vibration stabilizing structure 49 in the above embodiments, the plurality of second spring structures 52 are provided to form a corrugated concentric structure similar to that shown in FIG. 72, which can play the same role as the vibration stabilizing structure 49, which will not be repeated herein. In addition, the plurality of second spring structures 52 are provided to form a corrugated concentric structure similar to that shown in FIG. 72, and the plurality of second spring structures 52 are dispersed, which can effectively eliminate the high-frequency vibration transmitted from the vibration transmission structure 48 to the rear shell 39.

Figure 76:
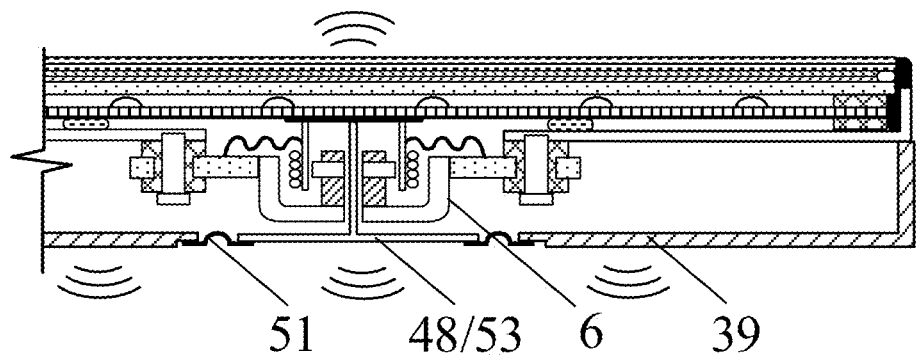
FIG. 76 is a schematic cross-sectional structural diagram of another display apparatus according to embodiments of the disclosure.

In some embodiments, FIG. 76 is a schematic cross-sectional structural diagram of another display apparatus according to embodiments of the disclosure. As shown in FIG. 76, the rear shell 39 is provided with a first through hole 53 corresponding to the position of the sound driver 6, a part of the vibration transmission structure 48 is located in the first through hole 53, the high-frequency filter structure 51 is a mechanically compliant structure, and the vibration transmission structure 48 is fixed to the rear shell 39 at an edge of the first through hole 53 through the mechanically compliant structure. Specifically, the high-frequency filter structure 51 can be made of soft rubber or other materials that can provide mechanical compliance. The high-frequency filter structure 51 can also achieve that when a high-frequency small-amplitude vibration passes through the high-frequency filter structure 51, the small-amplitude vibration energy is absorbed by the high-frequency filter structure 51 and will not be transmitted to the rear shell 39; and when a low-frequency large-amplitude vibration occurs, the vibration amplitude is greater than the vibration absorption degree of the high-frequency filter structure 51, so the low-frequency vibration can be transmitted to the rear shell 39 to generate a low-frequency response. In addition, a part of the vibration transmission structure 48 is arranged in the first through hole 53, which can reduce the impact of the high-frequency filter structure 51 on the thickness of the entire machine, and the high-frequency filter structure 51 and the vibration transmission structure 48 form a diaphragm-like structure and are exposed at the rear shell 39, which can be used as an acoustics explicit feature.

Figure 77:
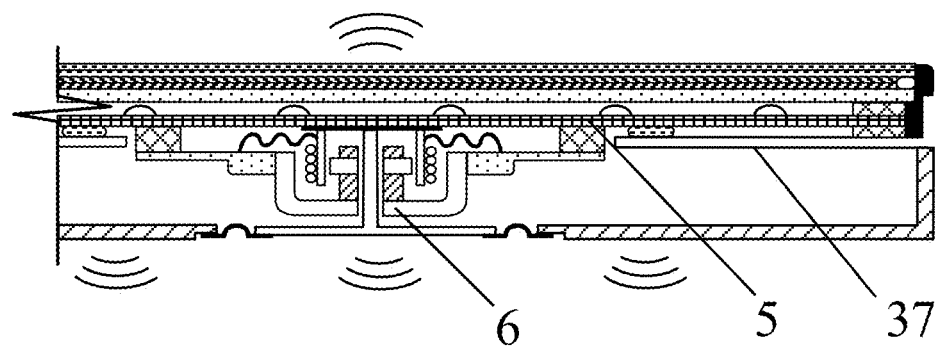
FIG. 77 is a schematic cross-sectional structural diagram of another display apparatus according to embodiments of the disclosure.

In some embodiments, the high-frequency filter structure 51 can also be configured as the structure shown in FIG. 72. In this case, the high-frequency filter structure 51 also has a function similar to the vibration stabilizing structure 49, that is, based on the asymmetric reaction force of the rear shell 39 on the sound driver 6, the high-frequency filter structure 51 can be designed to be asymmetrically supported and counteract the asymmetry of the reaction with the rear shell 39 to ensure the vertical downward movement of the vibration transmission structure 48. Asymmetry can be achieved through different R-ring sizes, different materials, and different hardness settings. In addition, the sound driver 6 can also be directly attached to the sound board 5 as shown in FIG. 77 instead of being directly installed with the middle frame backplane 37 to avoid the problem that the vibration of the sound driver 6 is transmitted to the middle frame backplane 37, which leads to abnormal vibration of the middle frame backplane 37 and sound resonance of a circuit board installed on the middle frame backplane 37.

Figure 78:
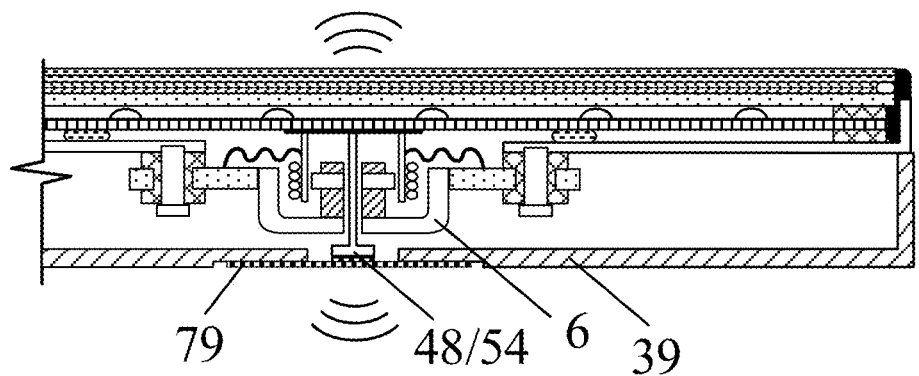
FIG. 78 is a schematic cross-sectional structural diagram of another display apparatus according to embodiments of the disclosure.

In some embodiments, FIG. 78 is a schematic cross-sectional structural diagram of another display apparatus according to embodiments of the disclosure. As shown in FIG. 78, the rear shell 39 is provided with a second through hole 54 corresponding to the position of the sound driver 6. The vibration transmission structure 48 sinks into the second through hole 54. The vibration transmission structure 48 is fixed to the rear shell 39 on the edge of the second through hole 54 through an auxiliary fixing plate 79.

In some embodiments, the vibration transmission structure 48 of the sound driver 6 will occupy the entire thickness of the display apparatus, resulting in an increase in the thickness of the entire apparatus. In some embodiments of the disclosure, the rear shell 39 is provided with one or more openings, the vibration transmission structure 48 sinks to an opening area of the rear shell 39, and the vibration transmission structure 48 and the rear shell 39 are fixed as a whole through the auxiliary fixing plate 79. In addition, the sound driver 6 can also be directly attached to the sound board 5 as shown in FIG. 79 instead of being directly installed with the middle frame backplane 37, to avoid the problem that the vibration of the sound driver 6 is transmitted to the middle frame backplane 37, which leads to abnormal vibration of the middle frame backplane 37 and sound resonance of a circuit board installed on the middle frame backplane 37.

Figure 79:
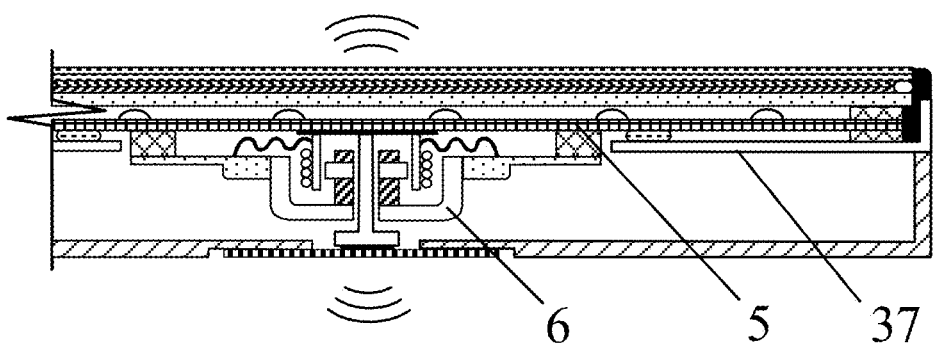
FIG. 79 is a schematic cross-sectional structural diagram of another display apparatus according to embodiments of the disclosure.

It should be noted that, the specific shape of the mechanically compliant structure is not limited in some embodiments of the disclosure, and the specific fixing method of the vibration transmission structure 48 and the rear shell 39 in FIG. 78 and FIG. 79 is not limited in some embodiments of the disclosure.

Figure 80:
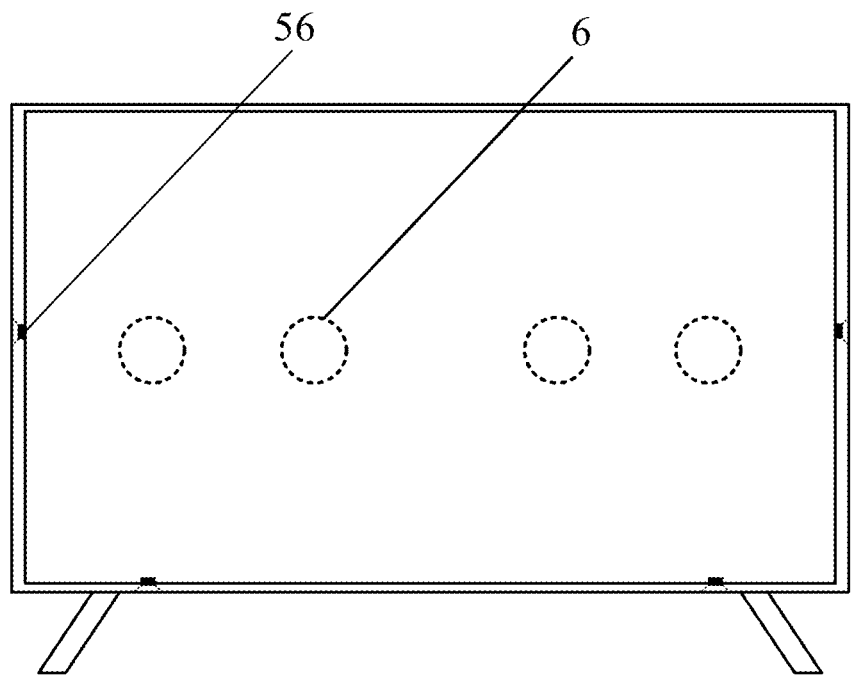
FIG. 80 is a schematic front-view structural diagram of another display apparatus according to embodiments of the disclosure.
Figure 81:
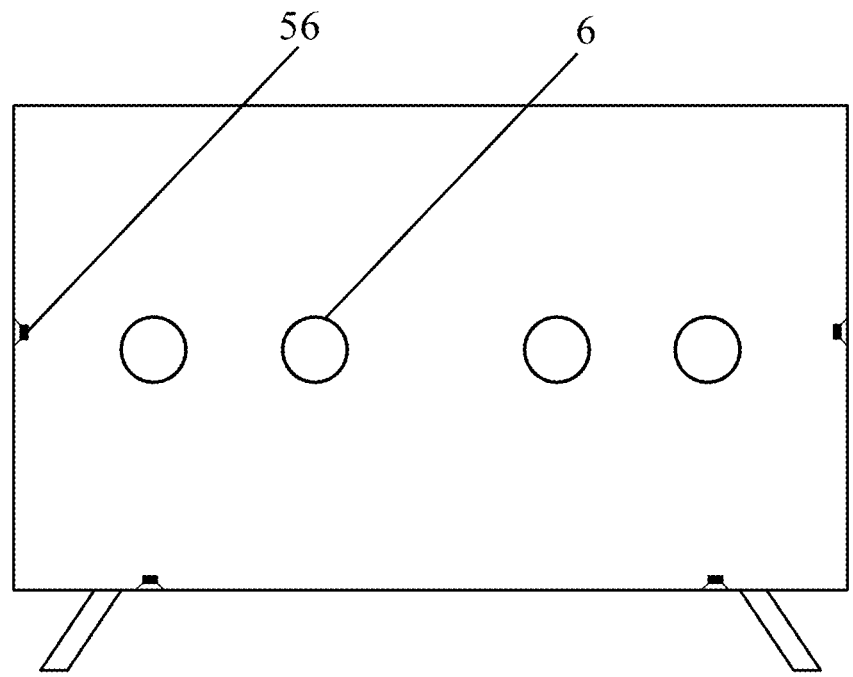
FIG. 81 is a schematic structural diagram of a rear view of a display apparatus according to embodiments of the disclosure.

In some embodiments, FIG. 80 is a schematic front-view structural diagram of another display apparatus according to embodiments of the disclosure. FIG. 81 is a schematic structural diagram of a rear view of a display apparatus according to embodiments of the disclosure. With reference to FIG. 80 and FIG. 81, a plurality of high-frequency speakers 56 are provided on the frame of the display apparatus, and the high-frequency speakers 56 are symmetrically distributed about a central axis of the display apparatus.

In some embodiments, due to differences in a space between the backlight module and the screen caused by light mixing distances of different models, there will also be some differences in screen sound effects. The larger the space is, the worse the high-frequency effect is, for example, a light mixing distance of a model is 6 mm, the upper limit of the vibration frequency of the screen is 1.5 kHz, in order to achieve the full-band sound effect of the display apparatus, other methods or sound devices need to compensate the lack of high-frequency sound effects of the display apparatus. In some embodiments of the disclosure, multiple high-frequency speakers 56 are provided on the frame of the display apparatus. A frequency of the sound emitted by the high-frequency speakers 56 is greater than or equal to a preset frequency. The preset frequency is, for example, but not limited to, 3 MHz, which makes up for the lack of high-frequency sound effect of the display apparatus, effectively improves the sound effect in the high-frequency band of the display apparatus, and is conducive to the realization of the sound effect of the full frequency band of the display apparatus. For example, a high-frequency speaker 56 of upward sounding, that is, a high-frequency speaker unit, can be added to the top frame of the display apparatus, or a high-frequency speaker 56 of downward sounding can be added to the bottom frame of the display apparatus, or several high-frequency speakers 56 of left sounding or right sounding are respectively provided on the left and right sides of the display apparatus. The specific positions of the high-frequency speakers 56 on the frame of the display apparatus are not limited in some embodiments of the disclosure, which effectively improves the high-frequency sound effect of the display apparatus.

In some embodiments, the above-mentioned high-frequency speakers 56 are symmetrically distributed along the central axis of the display apparatus. Specifically, with reference to FIG. 80 and FIG. 81, the high-frequency speakers 56 can be symmetrically distributed about the central axis of the display apparatus. For example, in FIG. 80 and FIG. 81, the high-frequency speakers 56 on the left and right sides of the frame are symmetrically distributed about a longitudinal central axis of the display apparatus, the two high-frequency speakers 56 on the lower frame are also symmetrically distributed about the longitudinal center axis of the display apparatus, and the high-frequency speakers 56 can also be symmetrically distributed about a horizontal center axis of the display apparatus, which are not limited in some embodiments of the disclosure. Therefore, by arranging the high-frequency speakers 56 to be symmetrically distributed about the central axis of the display apparatus, the sound effects of the high-frequency speakers 56 on the display apparatus are more uniform, and the sound effects of the display apparatus are further optimized.

Figure 82:
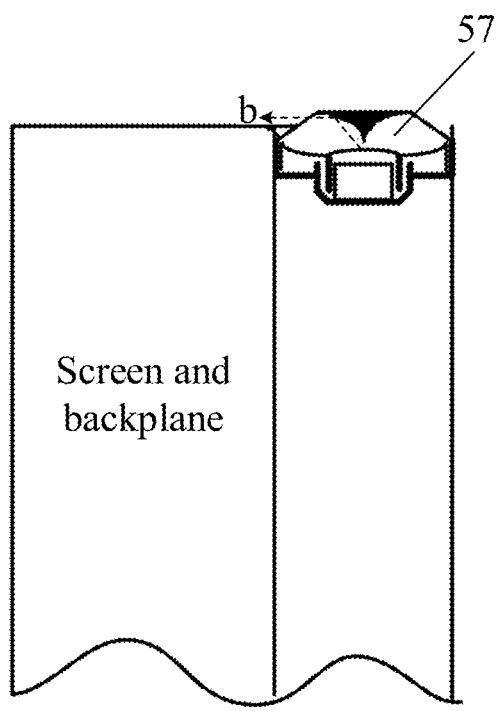
FIG. 82 is a schematic structural diagram of a phase plug according to embodiments of the disclosure.

In some embodiments, a sound output surface of the high-frequency speaker 56 is provided with a phase plug. FIG. 82 is a schematic structural diagram of a phase plug according to embodiments of the disclosure. As shown in FIG. 82, the phase plug 57 is configured to make the high-frequency speaker 56 produce sound in a direction away from the rear shell 39 of the display apparatus, that is, the high-frequency speaker 56 produces sound toward a display side of the display apparatus, that is, the high-frequency speaker 56 produces sound toward the left side in FIG. 82.

Figure 83:
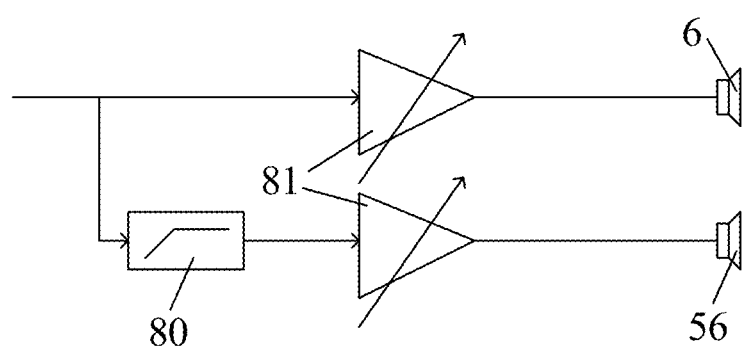
FIG. 83 is a schematic structural diagram of a driving circuit in a display apparatus according to embodiments of the disclosure.

FIG. 83 is a schematic structural diagram of a driving circuit in a display apparatus according to embodiments of the disclosure. As shown in FIG. 83, a full-frequency signal is configured to drive the sound driver 6 for screen sound, and the signal passes through a high-pass filter and then is sent to the high-frequency speaker 56. Although this can supplement the high-frequency sound effect in the display apparatus, there is still a problem that because a screen sound frequency is less than 2 kHz, and sound signals less than 5 kHz will have a significant impact on sound positioning of the display apparatus, and a directivity axis of the upward speaker in FIG. 80 and FIG. 81 is in a vertical direction, which will cause a sound image of the display apparatus to be weak, that is, the high-frequency speakers 56 at different positions cannot be focused relative to the sound direction of the display apparatus. Similar problems will occur when the high-frequency speaker 56 makes sound downward, leftward, or rightward, causing the sound produced by the display apparatus to be scattered, resulting in poor sound effect, and affecting the user experience.

To address these problems, in some embodiments of the disclosure, a phase plug 57 is provided on a sound output surface of the high-frequency speaker 56. The phase plug 57 is configured to make the high-frequency speaker 56 produce sound in a direction of the display panel away from the rear shell 39, that is, make the high-frequency speaker 56 produce sound toward the front of the display apparatus. In some embodiments, the phase plug 57 is a high-frequency speaker unit with extended directivity. The high-frequency speaker unit is different from an ordinary high-frequency speaker unit. A phase plug 57 is added to a sound output surface of the speaker. As shown in FIG. 82, when sound waves from the high-frequency speaker 56 hit the phase plug 57, due to the design of the arc structure of the phase plug 57, the sound waves from the high-frequency speaker 56 can be reflected from another direction, for example, the dotted line b in FIG. 82 indicates a direction of the sound wave. By reasonably designing an angle and a shape of the phase plug 57 and a curvature relationship with the diaphragm, it can be realized that sound waves from the high-frequency speaker 56 originally facing upward can be turned to sound forward, and similarly, it can be realized that sound waves from the high-frequency speaker 56 originally facing downward, leftward or rightward can be turned to sound forward, i.e., sounding toward the display side of the display device, thus alleviating the problems of the scattered sound of the display apparatus, poor sound effect, and poor user experience as described in the above embodiments, so that the high-frequency speakers 56 at different locations on the frame of the display device can be forward and focused on sounding, which improves the sounding effect of the high-frequency frequency band of the display device while further optimizing the sounding focused effect of the high-frequency speaker 56.

It should be noted that, in order to make the speaker of sounding forward on the entire display apparatus radiate sound, the phase plug 57 can be configured to change a direction of sounding of the high-frequency speaker 56. That is, the phase plug can radiate sound toward the front, the phase plug 57 needs to be arranged protruding from the display apparatus, as shown in FIG. 83, the phase plug 57 is arranged protruding from the top of the display apparatus. 80 in FIG. 83 is a high-pass filter and 81 is an amplifier.

Figure 84:
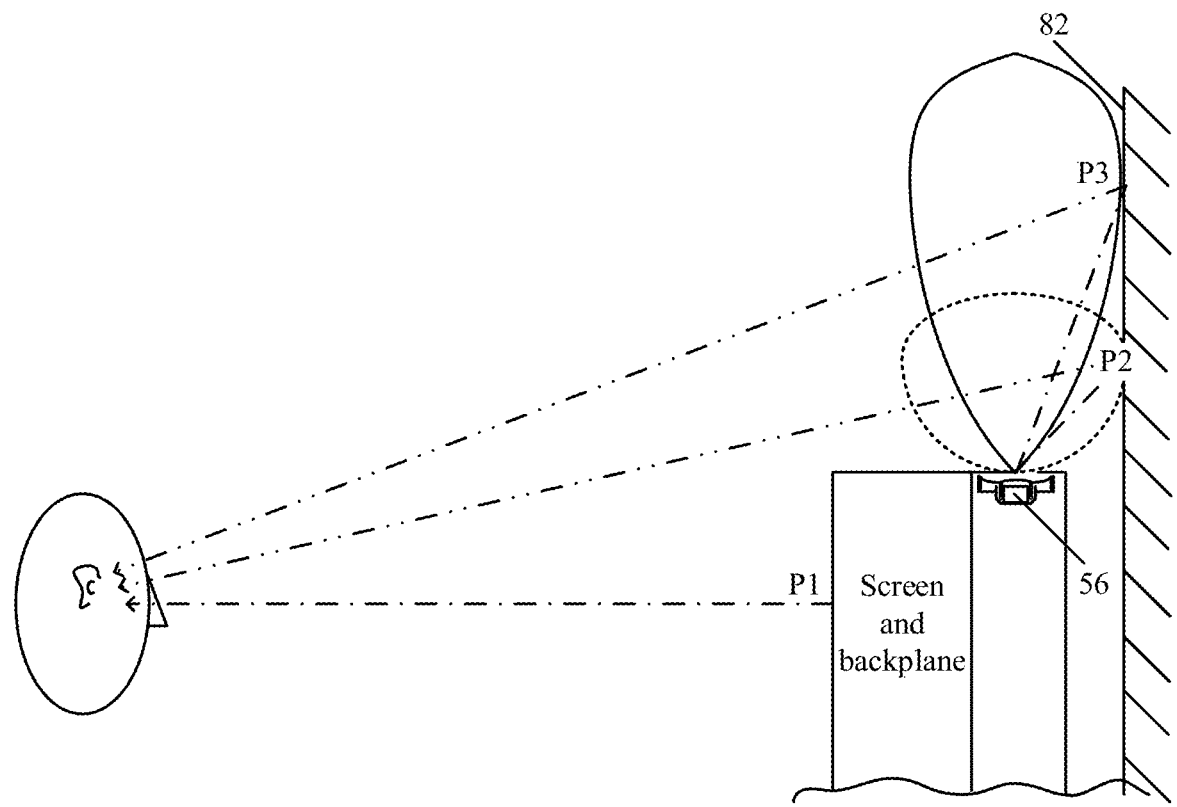
FIG. 84 is a schematic diagram of an application scenario of a display apparatus according to embodiments of the disclosure.

FIG. 84 is a schematic diagram of an application scenario of a display apparatus according to embodiments of the disclosure. As shown in FIG. 84, taking the high-frequency speaker 56 that sounds upward as an example. There are certain differences in the directivity of sounds of different frequencies. The screen sound is assumed to be at P1. The high-frequency speaker 56 is responsible for sounds above 2 kHz. It is assumed that the sound directivity of 4 kHz is shown as the dotted line in FIG. 85, the emission position point on the wall is P2, the directivity of 6 kHz is more sharp, and the emission position point on the wall 82 is P3. The sound should originally be emitted from a high-frequency speaker 56, because the sound is emitted from the front of the screen, the high sound is emitted from the side and there are multi-point sound reflection areas with different frequencies and locations, the distance from each location point, i.e., the sound source point P1, P2, or P3, to ears of a user is different. P1 is direct, that is, directly from a screen surface to the ears of the user, while the distance of 4 kHz is from the top high-frequency speaker 56 to the point P2 and then to the ears of the user and the distance of 6 kHz is from the high-frequency speaker 56 to the point P3 and then to the ears of the user. Sounds of different frequencies have different delays. As a result, when high-frequency sounds are played, the sound heard by the user appears to be at the point P3, when mid-frequency sounds are played, the sound heard by the user appears to be at the point P2, and when low-frequency sounds are played, the sound heard by the user appears to be at the point P1 on the screen. When a signal that combines high, middle and low frequencies is emitted, there are multiple sound sources, which results in the sound not being able to feel like it is all coming from the screen. There is a big gap with the sound produced by OLED, laser TV, etc.

Figure 85:
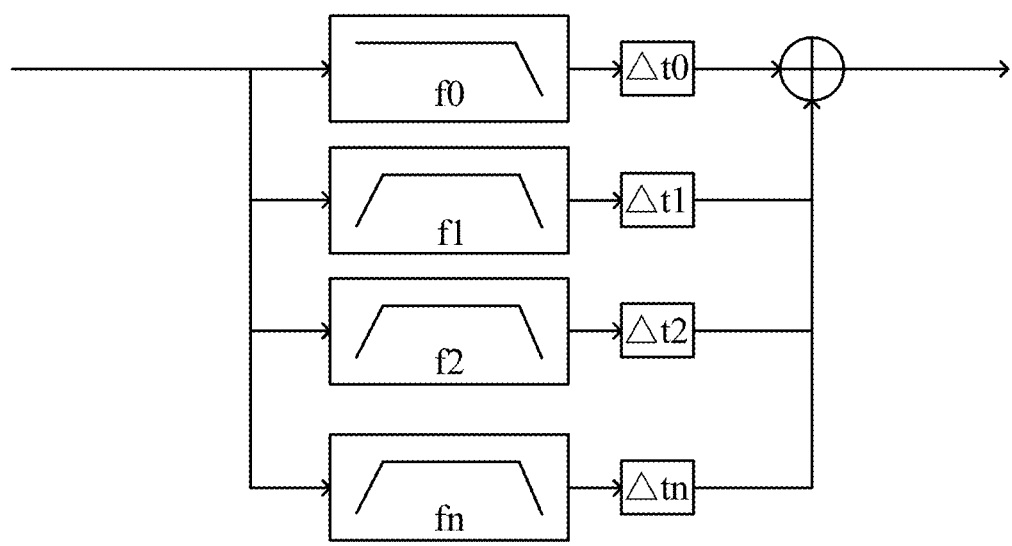
FIG. 85 is a schematic diagram of a processing process of a frequency division delay algorithm according to embodiments of the disclosure.

In some embodiments of the disclosure, a new algorithm is proposed. FIG. 85 is a schematic diagram of a processing process of a frequency division delay algorithm according to embodiments of the disclosure. As shown in FIG. 85, the entire sound frequency band is divided into N segments, and each segment is given a different delay. In this way, the time for the sound of each frequency segment to reach the ears of the user can be adjusted, a certain point on the screen can be set, such as quarter of horizontal centerline, the certain point is taken as a virtual sound and image point, and then use the virtual sound and image point as a starting point to calculate the paths for sounds of different frequencies to reach the ears of the user and then calculate the delays of each frequency band, so that the sounds heard by the ears of the user seem to come from the virtual sound and image point, which can be used for the form of upward sounding, downward sounding, leftward sounding, rightward sounding, etc. Here, f0 corresponds to a low-frequency band, which corresponds to a frequency band for screen sounding, f1, f2, . . . , fn are high-frequency bands, and the overall sum corresponds to the working frequency band of the high-frequency speaker. The farthest point P1 is taken as a reference, the sound delays of the frequency bands corresponding to the point P2 and P3 to reach the ears of the user are tested and recorded as t0, t1, t2 respectively. If the frequency band is n+1, it is necessary to calculate the sound delay tn corresponding to the frequency band fn. Because the higher the frequency is, the farther the sound reflection point from the display apparatus is, the greater the delay is. After obtaining the delay of each frequency band by test, the maximum delay is recorded as tmax, concluding that Δtn=tmax−tn.

Figure 86:
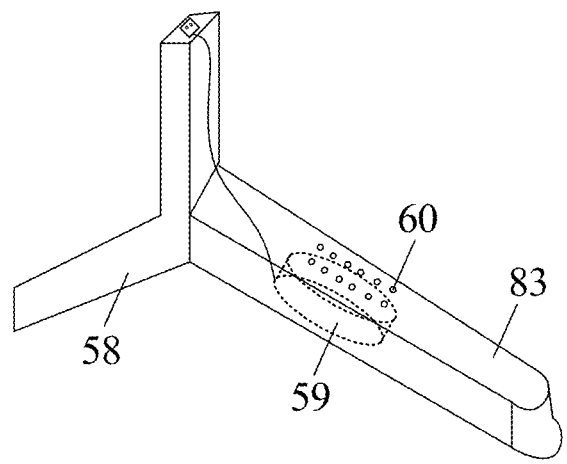
FIG. 86 is a schematic three-dimensional structural diagram of a base according to embodiments of the disclosure.

In some embodiments, the display apparatus further includes a base. FIG. 86 is a schematic three-dimensional structural diagram of a base according to embodiments of the disclosure. As shown in FIG. 86, the base 58 includes an inclined portion 83 facing away from the rear shell 39 of the display apparatus, a sound structure 59 is provided inside the inclined portion 83, and a plurality of sound holes 60 are provided in a surface of the inclined portion 83 corresponding to a position where the sound structure 59 is located.

In some embodiments, since the requirement for front sound is reduced from a full-frequency speaker to a high-frequency speaker 56, a sound structure 59, such as a high-frequency speaker, in the base 58 can be considered. In some embodiments, as shown in FIG. 86, a sound structure 59 can be provided inside the inclined portion 83 of the base 58, the base 58 has a plurality of sound holes 60 on its surface, and the inclined portion 83 faces away from the rear shell 39 of the display apparatus, that is, tilting toward the display side of the display apparatus, the sound structure 59 can produce sound through the plurality of sound holes 60 in a direction of the display panel away from the rear shell 39, i.e., can produce sound toward the display side of the display apparatus, which is conducive to further optimizing the forward sound effect of the display apparatus. In addition, on the basis of setting the high-frequency speaker 56 and correspondingly setting the phase plug in the above embodiments, the sound structure 59 in the base 58 can be superimposed to achieve forward sounding of the display apparatus.

In some embodiments, as shown in FIG. 86, the sound structure 59 can include a high-frequency speaker. In some embodiments, the frequency of sound from the high-frequency speaker can also be greater than or equal to a preset frequency. The preset frequency is, for example, but is not limited to, 3 MHz. When the sound structure 59 placed inside the base 58 is a high-frequency speaker, the high-frequency speaker can be electrically connected with an interface between the base 58 and the display apparatus through wires, and electrically connected with the display apparatus through a socket to obtain power for operation. Therefore, the lack of high-frequency sound effect of the display apparatus can be further compensated for by setting a high-frequency speaker in the base 58, effectively improving the sound effect of the high-frequency band of the display apparatus, which is conducive to realizing the sound effect of the display apparatus in the full-frequency band. In addition, if the display apparatus uses an ultra-thin base 58, the high-frequency speaker can be a ceramic speaker, and the ceramic speaker can be arranged on the surface of the base 58, or the base 58 can be made into a hollow structure and the ceramic speaker can be embedded in the base 58, so that the base 58 has the same thickness in appearance.

In addition, in some embodiments, the sound structure 59 can also include a vibrating sheet structure. The sound driver in the display apparatus is mechanically connected with the vibrating sheet structure and is configured to drive the vibrating sheet structure to produce sound. In some embodiments, a middle area of the base 58 can also be hollowed out. For example, after forming the sound holes 60 in the surface of the base 58, the vibrating sheet structure is used, for example, a thin metal sheet is embedded in the base 58. When the base 58 is installed on the display apparatus, the sound driver arranged inside the display apparatus is mechanically connected with the vibrating sheet structure, driving the thin metal sheet embedded inside the base 58 to vibrate and produce sound, thereby achieving the effect of the internal driver driving an external device to produce sound, thus achieving the effect of forward sound, optimizing the effect of sound in front of the display apparatus. It should be noted that the disclosure does not limit the specific location of the sound driver in the display apparatus. For example, the sound driver can be disposed in a cavity between the rear shell 39 and the display apparatus.

Figure 87:
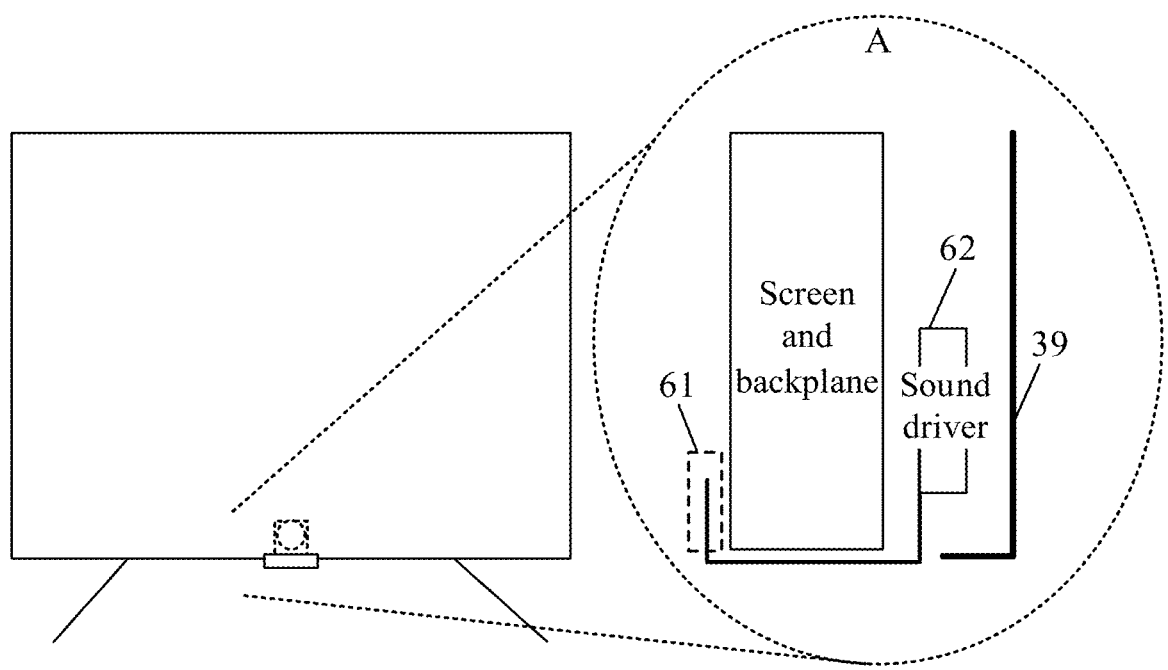
FIG. 87 is a perspective structural schematic diagram of a display apparatus according to embodiments of the disclosure.

In some embodiments, FIG. 87 is a perspective structural schematic diagram of a display apparatus according to embodiments of the disclosure. As shown in FIG. 87, A is a local enlarged area. The display apparatus further includes a metal sheet decorative part 61. The metal sheet decorative part 61 is located on the side of the display apparatus away from the rear shell 39. A sound driver 62 is provided in the rear shell 39. The sound driver 62 in the display apparatus is connected with the metal sheet decorative part 61 through the bottom space of the display apparatus and is configured to drive the metal sheet decorative part 61 to emit sound. For example, the sound driver 62 can be disposed in a cavity between the rear shell 39 and the display apparatus.

In some embodiments, the decorative parts at the bottom of the display apparatus, such as an area where a brand Logo is located, can be made into a thin metal sheet to form a metal sheet decorative part 61, which extends to the front of the display apparatus through the hollow of the rear shell 39 at the bottom of the display apparatus, the sound driver 62 placed in the cavity between the rear shell 39 and the display panel of the display apparatus, such as an electromagnetic actuator, a ceramic vibrator, a magnetostrictive driver, etc., drives the metal sheet decorative part 61 to produce sound, thereby realizing the effect that the internal drive of the machine is transferred to be the front of the external device for sound. The material of the metal sheet decorative part 61 can be other materials such as plastic, metal and plastic two-color injection molding, and the shape of the metal sheet decorative part 61 needs to be designed in a reasonable shape according to the frequency characteristics, for example, it can be small in the middle and large on both sides, which facilitates the formation of resonance of the same frequency on both sides of a U-shaped metal sheet.

As can be seen from the above embodiments, in some embodiments of the disclosure, the sound board and two sealed air cavities with viscous internal air are used, so that the sound driver can pass through the sound board, the backlight module, the second sealed air cavity and the first sealed air cavity to transmit vibration to the liquid crystal display panel, causing the liquid crystal display panel to vibrate and produce sound. Since the vibration output terminal of the sound driver is fixed to the surface of the sound board away from the backlight module, the setting of the sound driver does not affect the display of the display apparatus, which makes it possible for the screen of the traditional liquid crystal display apparatus to produce sound, giving users an audio-visual experience where the sound comes from the image, and overcoming the industry bottleneck that makes it difficult to produce sound on the liquid crystal display screen. In addition, the plurality of high-frequency speakers are installed on the frame of the display apparatus, which makes up for the lack of high-frequency sound effects of the display apparatus, effectively improves the sound effect of the high-frequency band of the display apparatus, and is conducive to realizing the full-frequency sound effect of the display apparatus. In addition, elastic supports are configured to avoid abnormal collision noise and improve vibration transmission efficiency. In addition, elastic supports are configured to avoid abnormal collision noise and improve vibration transmission efficiency, and a vibration transmission structure is fixed to the rear shell to excite the vibration of the rear shell, the vibration energy of the sound driver is transmitted to the rear shell, and the vibration of the rear shell generates sound waves, and since low-frequency sound has no directionality, it can be superimposed and enhanced with the forward sound of the display apparatus to achieve the purpose of increasing the intensity of low-frequency sound.

It should be noted that, the display apparatus in some embodiments of the disclosure can be applied to a curved screen. In addition, the same and similar parts between the various embodiments of the disclosure can be referred to each other, and the relevant content will not be repeated. Moreover, some embodiments of the disclosure do not list all possible combinations. Among the technical features of each embodiment of the disclosure, any combination between the various embodiments also belongs to the protection scope of the disclosure. The characteristic combination methods include but are not limited to: the liquid crystal display panel 1 is combined with MiniLED; the sound driver 6 is combined with MiniLED; the sound driver 6 is combined with MiniLED and combined with the elastic support 17; the sound driver 6 is combined with the sound board 5 and combined with the backlight plate 30; the sound driver 6 is combined with the sound board 5 and with the light bar; the sound driver 6 is combined with the sound board 5, and the backlight plate 30 is combined with the elastic support 17; the high-frequency and low-frequency speakers are combined into different embodiments.

In specific implementations, the disclosure also provides a non-transitory storage medium. The non-transitory storage medium can be a magnetic disk, an optical disk, or a read-only memory (ROM) or a random access memory (RAM), etc. The non-transitory storage medium can store programs, and when the programs are executed, the programs can include some or all of the steps in each embodiment of the method according to the disclosure.

For convenience of explanation, the above description has been made in conjunction with specific implementations. But the above illustrative discussion is not intended to be exhaustive or to limit the embodiments to the specific forms disclosed. Various modifications and variations are possible in light of the above teachings. The above embodiments are selected and described to better explain the principles and practical applications, thereby enabling those skilled in the art to better use the embodiments and various modified embodiments suitable for specific use considerations.

What is claimed is:

1. A display apparatus, comprising:
    a liquid crystal display panel and a backlight module, wherein a first sealed air cavity is formed inside the liquid crystal display panel, and the backlight module is located on a side of the liquid crystal display panel and forms a second sealed air cavity with the liquid crystal display panel;
    a sound board and a sound driver, wherein the sound board is fixed to a surface of the backlight module away from the liquid crystal display panel, and a vibration output terminal of the sound driver is fixed to a surface of the sound board away from the backlight module, and the sound driver is configured to drive the sound board to vibrate through the vibration output terminal to drive the backlight module to vibrate.

2. The display apparatus according to claim 1, wherein the sound board is fixed to the backlight module through a first adhesion buffer structure, and the vibration output terminal is fixed to the sound board through a second adhesion buffer structure.

3. The display apparatus according to claim 1, wherein the liquid crystal display panel comprises a liquid crystal film layer and an optical diffusion film layer, a frame position of the liquid crystal display panel between the liquid crystal film layer and the optical diffusion film layer is provided with a first annular sealed structure, and the liquid crystal film layer and the optical diffusion film layer form the first sealed air cavity through the first annular sealed structure;
- a frame position of the liquid crystal display panel between the backlight module and the liquid crystal display panel is provided with a second annular sealed structure, and the backlight module and the liquid crystal display panel form the second sealed air cavity through the second annular sealed structure;
- wherein the first annular sealed structure comprises a plurality of low-frequency airflow channels, and the plurality of low-frequency airflow channels are configured to connect the first sealed air cavity with an external environment where the display apparatus is located;
- wherein along a plane parallel to the liquid crystal display panel, the first annular sealed structure comprises a plurality of rows of channel forming structures arranged along a first direction, and each row of channel forming structures comprises a plurality of barrier structures arranged at intervals of a set distance, and the barrier structures in different rows of channel forming structures are staggered; wherein the first direction is perpendicular to an extension direction of a frame of the liquid crystal display panel.

4. The display apparatus according to claim 1, further comprising:
- a plurality of elastic supports, arranged between the backlight module and the liquid crystal display panel in an interference manner, wherein a side of the backlight module adjacent to the liquid crystal display panel comprises a plurality of light-emitting structures, and the plurality of elastic supports are located between the light-emitting structures; and/or further comprising:
- a plurality of elastic supports, arranged between the sound board and the liquid crystal display panel in an interference manner, wherein a side of the backlight module adjacent to the liquid crystal display panel comprises a plurality of light-emitting structures, and the plurality of elastic supports are located between the light-emitting structures.

5. The display apparatus according to claim 4, further comprising: a rear shell;
- wherein the rear shell is located on a side of the sound driver away from the sound board, the sound driver comprises a vibration transmission structure, and the sound driver is configured to drive the rear shell to vibrate through the vibration transmission structure.

6. The display apparatus according to claim 5, wherein the vibration transmission structure is provided with a vibration stabilizing structure, the vibration stabilizing structure is configured to balance a reaction force exerted by the rear shell to the vibration transmission structure to drive the vibration transmission structure to vibrate along a central axis of the sound driver;
- the vibration stabilizing structure comprises a plurality of first spring structures, the plurality of first spring structures form a corrugated concentric structure, one end of the first spring structure is fixed to the vibration transmission structure, the other end of the first spring structure is fixed to the sound driver.

7. The display apparatus according to claim 5, wherein the vibration transmission structure is provided with a high-frequency filter structure, and the high-frequency filter structure is configured to filter out high-frequency vibration transmitted from the vibration transmission structure to the rear shell;
- the high-frequency filter structure comprises a plurality of second spring structures, one end of the second spring structures is fixed to the vibration transmission structure, and the other end of the second spring structures is fixed to the rear shell.

8. The display apparatus according to claim 5, wherein the vibration transmission structure is provided with a high-frequency filter structure, and the high-frequency filter structure is configured to filter out high-frequency vibration transmitted from the vibration transmission structure to the rear shell;
- the rear shell is provided with a first through hole corresponding to a position of the sound driver, a part of the vibration transmission structure is located in the first through hole, the high-frequency filter structure is a mechanical compliance structure and the vibration transmission structure is fixed to the rear shell at an edge of the first through hole through the mechanical compliance structure.

9. The display apparatus according to claim 4, further comprising: a rear shell;
- wherein a frame of the display apparatus is provided with a plurality of high-frequency speakers, and the plurality of high-frequency speakers are symmetrically distributed about a central axis of the display apparatus.

10. The display apparatus according to claim 4, further comprising: a rear shell;
- wherein a frame of the display apparatus is provided with a plurality of high-frequency speakers, and the plurality of high-frequency speakers are symmetrically distributed about a central axis of the display apparatus.

11. The display apparatus according to claim 9, wherein a sound output surface of the high-frequency speaker is provided with a phase plug, and the phase plug is configured to make the high-frequency speaker produce sound in a direction where the liquid crystal display panel is away from the rear shell.

12. The display apparatus according to claim 9, further comprising: a base;
- wherein the base comprises an inclined portion facing a direction where the liquid crystal display panel is away from the rear shell, a sound structure is provided inside the inclined portion, and a surface of the inclined portion corresponding to a position where the sound structure is located is provided with a plurality of sound holes.

13. The display apparatus according to claim 9, further comprising:
- a second sound driver, wherein a second vibration output terminal of the second sound driver is fixed to the rear shell, and the second sound driver is configured to drive the rear shell to vibrate through the second vibration output terminal.

14. The display apparatus according to claim 9, wherein the rear shell is provided with a plurality of reinforcing ribs on a surface of the rear shell adjacent to a middle frame backplane, and the plurality of reinforcing ribs are non-uniformly distributed; the middle frame backplane is located away from a side of the sound board away from the backlight module.

15. The display apparatus according to claim 4, wherein the plurality of elastic supports are fixed to the backlight module through a first adhesive structure; or, one side of each of the plurality of elastic supports adjacent to the backlight module are provided with a welding structure, and the plurality of elastic supports are welded and fixed to the backlight module through the welding structure; or, both ends of each of the plurality of elastic supports are provided with a suction cup structure, and the each elastic support is fixed to the backlight module and the liquid crystal display panel respectively through the suction cup structure at the both ends of the each elastic support; or, one end of each of the plurality of elastic supports is fixed to the backlight module through a first adhesive structure, the other end of the each elastic support is provided with a suction cup structure, and the each elastic support is fixed to the liquid crystal display panel through the suction cup structure.

16. The display apparatus according to claim 15, wherein the plurality of elastic supports are distributed in multiple circles with the sound driver as a center, and a distribution density of the plurality of elastic supports decreases in a direction away from the sound driver.

17. The display apparatus according to claim 15, wherein the backlight module comprises a plurality of backplanes, a first buffer structure is provided between adjacent backplanes, the first buffer structure is located on the sound board and configured to space adjacent backplanes;

the first buffer structure is in a strip shape, and the first buffer structure is configured to connect the plurality of elastic supports as a whole.

18. The display apparatus according to claim 5, wherein a side of the backlight module adjacent to the display panel comprises a plurality of light-emitting structures, the plurality of light-emitting structures are covered with the plurality of elastic supports, and the plurality of elastic supports are light-guiding elastic supports;

wherein the display panel comprises a display film layer and an optical diffusion film layer, the display film layer is located on a side of the optical diffusion film layer away from the backlight module, the optical diffusion layer comprises an optical film and a diffusion plate, and the diffusion plate is located on a side of the optical film away from the display film layer;

at least one multifunctional optical glue structure is provided between the optical film and the diffusion plate, and the multifunctional optical glue structure comprises a protrusion structure and/or a large-angle reflective film;

wherein the multifunctional optical glue structure is arranged corresponding to at least one of the plurality of light-emitting structures.

19. The display apparatus according to claim 5, wherein a plurality of sound channel isolation structures is provided between adjacent sound drivers, the plurality of sound channel isolation structures are provided on the backlight module, the plurality of sound channel isolation structure are configured to connect the plurality of elastic supports as a whole, and the plurality of elastic supports on different sound channel isolation structures are arranged in a staggered manner.

20. The display apparatus according to claim 4, wherein a side of the backlight module adjacent to the liquid crystal display panel is provided with a fixing plate, the fixing plate is provided with a plurality of clamping holes, the backlight structure is provided with a plurality of penetration installation holes, and the plurality of clamping holes are configured to fix the plurality of elastic supports in the plurality of penetration installation holes and on the sound board; or, the backlight structure comprises a plurality of counterbores, and the plurality of counterbores are configured to fix the plurality of elastic supports on the sound board;

wherein a side of the backlight module adjacent to the display panel comprises a plurality of light-emitting structures; and the elastic supports are located between the plurality of light-emitting structures.

* * * * *